US012128389B2

(12) United States Patent
Gounder et al.

(10) Patent No.: US 12,128,389 B2
(45) Date of Patent: Oct. 29, 2024

(54) CHABAZITE SYNTHESIS METHOD INCLUDING ORGANIC AND INORGANIC STRUCTURE DIRECTING AGENTS AND CHABAZITE ZEOLITE WITH FLAKE-LIKE MORPHOLOGY

(71) Applicants: BASF MOBILE EMISSIONS CATALYSTS LLC, Iselin, NJ (US); PURDUE RESEARCH FOUNDATION, West Lafayette, IN (US)

(72) Inventors: Rajamani P. Gounder, Lafayette, IN (US); John Rocco Di Iorio, Cambridge, MA (US); Casey Benjamin Jones, West Lafayette, IN (US); Claire Townsend Nimlos, West Lafayette, IN (US); Vivek Vattipalli, Florham Park, NJ (US); Subramanian Prasad, Florham Park, NJ (US); Eduard L. Kunkes, Florham Park, NJ (US); Ahmad Moini, Florham Park, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 0 days.

(21) Appl. No.: 17/630,535

(22) PCT Filed: Jul. 31, 2020

(86) PCT No.: PCT/IB2020/057297
§ 371 (c)(1),
(2) Date: Jan. 27, 2022

(87) PCT Pub. No.: WO2021/024142
PCT Pub. Date: Feb. 11, 2021

(65) Prior Publication Data
US 2022/0266228 A1     Aug. 25, 2022

Related U.S. Application Data

(60) Provisional application No. 63/002,595, filed on Mar. 31, 2020, provisional application No. 62/882,108, filed on Aug. 2, 2019.

(51) Int. Cl.
| | | |
|---|---|---|
| B01J 29/78 | (2006.01) |
| B01D 53/94 | (2006.01) |
| B01J 29/70 | (2006.01) |
| B01J 29/74 | (2006.01) |
| B01J 29/76 | (2006.01) |
| B01J 35/30 | (2024.01) |
| B01J 37/00 | (2006.01) |
| B01J 37/03 | (2006.01) |
| B01J 37/04 | (2006.01) |
| B01J 37/08 | (2006.01) |
| F01N 3/20 | (2006.01) |
| F01N 3/28 | (2006.01) |

(52) U.S. Cl.
CPC ........ B01J 29/783 (2013.01); B01D 53/9418 (2013.01); B01J 29/7015 (2013.01); B01J 29/74 (2013.01); B01J 29/763 (2013.01); B01J 35/393 (2024.01); B01J 37/0018 (2013.01); B01J 37/036 (2013.01); B01J 37/04 (2013.01); B01J 37/08 (2013.01); B01D 2255/20761 (2013.01); B01D 2255/50 (2013.01); F01N 3/2066 (2013.01); F01N 3/2803 (2013.01); F01N 2370/04 (2013.01)

(58) Field of Classification Search
None
See application file for complete search history.

(56) References Cited

U.S. PATENT DOCUMENTS

| | | |
|---|---|---|
| 3,030,181 A | 4/1962 | Milton |
| 4,148,713 A | 4/1979 | Rollmann |
| 4,394,362 A | 7/1983 | Miller |
| 4,544,538 A | 10/1985 | Zones |
| 6,709,644 B2 | 3/2004 | Zones et al. |
| 9,981,852 B2 | 5/2018 | Choi et al. |
| 2011/0020204 A1 | 1/2011 | Bull et al. |
| 2011/0251048 A1 | 10/2011 | Ariga et al. |
| 2012/0184429 A1 | 7/2012 | Andersen et al. |

(Continued)

FOREIGN PATENT DOCUMENTS

| | | |
|---|---|---|
| CN | 102215960 A | 10/2011 |
| CN | 102285666 A | 12/2011 |

(Continued)

OTHER PUBLICATIONS

First Office Action dated Jul. 17, 2023, of counterpart Chinese Patent Application No. 202080061420.4, along with an English machine translation.
Wang et al, "Syntheses of Metal Supported Zeolites and SAPO-34 Zeolites with High Catalytic Performance," Number of Full Texts of Doctoral Dissertations in China, Database Engineering Technology Series I, 2017, Abstract only in English.
Partial Supplementary European Search Report dated Jul. 31, 2023, of counterpart European Patent Application No. 20849641.4.
International Search Report dated Nov. 6, 2020, PCT/IB2020/057297.

(Continued)

*Primary Examiner* — Sheng H Davis
(74) *Attorney, Agent, or Firm* — DLA Piper LLP (US)

(57) ABSTRACT

The disclosure generally provides zeolites having the CHA crystalline framework and methods of preparing the same. Provided herein are CHA zeolites containing intergrowths, a controlled framework aluminum distribution, or both. Further provided are CHA zeolites wherein crystals of the zeolite material have a predominantly flake-like morphology as determined by scanning electron microscopy (SEM). Further provided are catalyst compositions, articles, and systems including CHA zeolites promoted with a metal.

17 Claims, 28 Drawing Sheets

(56) References Cited

U.S. PATENT DOCUMENTS

| | | | |
|---|---|---|---|
| 2013/0280160 A1 | 10/2013 | Ariga et al. | |
| 2014/0147378 A1* | 5/2014 | Davis | C01B 39/48 |
| | | | 423/703 |
| 2015/0118150 A1 | 4/2015 | Yang et al. | |
| 2015/0151287 A1 | 6/2015 | Rivas-Cardona et al. | |
| 2017/0096922 A1 | 4/2017 | Bergeal et al. | |
| 2017/0107114 A1 | 4/2017 | Gounder et al. | |
| 2018/0237307 A1* | 8/2018 | Nakao | B01J 35/0013 |
| 2018/0250663 A1 | 9/2018 | Hotta et al. | |

FOREIGN PATENT DOCUMENTS

| | | | |
|---|---|---|---|
| CN | 103328385 | A | 9/2013 |
| CN | 104129801 | A | 11/2014 |
| CN | 105314648 | A | 2/2016 |
| CN | 105921033 | A | 9/2016 |
| CN | 107673369 | * | 2/2018 |
| CN | 106365175 | B | 7/2018 |
| CN | 108349742 | A | 7/2018 |
| EP | 0 976 440 | A1 | 2/2000 |
| EP | 3323785 | | 5/2018 |
| GB | 868846 | | 5/1961 |
| WO | 2015001123 | * | 1/2015 |
| WO | 2016/070090 | | 5/2016 |
| WO | 2019/122121 | A1 | 6/2019 |

OTHER PUBLICATIONS

Jiang et al., "Effects of Si/Al ratio in the framework on the pervaporation properties of hollow fiber . . . ," Microporous and Mesoporous Materials, vol. 273, Jul. 9, 2018.

Di Iorio et al., "Cooperative and competitive occlusion of organic and inorganic. . . . ," Journal of the American Chemical Society, vol. 142, No. 10, pp. 4807-4819, Feb. 10, 2020.

Chen, H.-Y., "Cu/Ziolite SCR Catalysts for Automotive Diesel NOx Emission Control" in Urea-SCR Technology for deNOx after Treatment of Diesel Exhausts, Nova, I., Tronconi, E., Eds., Springer New York: New York, NY, pp. 123-147, 2014, Abstract only.

Di Iorio, J. R.; Gounder, R. "Controlling the Isolation and Pairing of Aluminum in Chabazite Zeolites Using Mixtures of Organic and Inorganic Structure-Directing Agents," Chem. Mater. 2016, 28, pp. 2236-2247, Abstract only.

Di Iorio et al., "Introducing Catalytic Diversity into Single-Site Chabazite Zeolites of Fixed Composition via Synthetic Control of Active Site Proximity," ACS Catal. 2017, 7, pp. 6663-6674.

Blackwell et al., "Open-Framework Materials Synthesized in the TMA+/TEA+Mixed-Template System: The New Low Si/Al Ratio Zeolites UZM-4 and UZM5," Angew. Chem. Int. Ed. 2003, 42, pp. 1737-1740.

Lewis et al., "Experimental charge density matching approach to zeolite synthesis," Studies in Surface Science and Catalysis 2004, 154, pp. 364-372, Abstract only.

Park et al., "Zeolite Synthesis from a Charge Density Perspective: The Charge Density Mismatch Synthesis of UZM-5 and UZM-9," Chem. Mater. 2014, 26, pp. 6684-6694, Abstract only.

Kumar et al., "SSZ-13-Crystallization by Particle Attachment and Deterministic Pathways to Crystal Size Control," J. Am. Chem. Soc. 2015, 137, pp. 13007-13017, Abstract only.

Bohström et al., "Preparation of high silica chabazite with controllable particle size," Microporous and Mesoporous Materials 2014, 195, pp. 294-302, Abstract only.

Guo et al., "Cost-effective synthesis of CHA zeolites with controllable morphology and size," Chemical Engineering Journal 2019, 358, pp. 331-339, Abstract only.

Zones, S.I., "Conversion of Faujasites to High-silica Chabazite SSZ-13 in the Presence of N,N,N-Trimethyl-1-adamantammonium Iodide", J. Chem. Soc. Faraday Tans., 1991, 87(22), 3709-3716.

Anderson, Michael W., et al., "Intergrowths of Cubic and Hexagonal Polytypes of Faujasitic Zeolites", J. Chem. Soc. Chem. Commun. 1991, 1660-1664.

Treacy, M.M.J., et al., "Intergrowth segregation in FAU-EMT zeolite materials", Proc. R. Soc. Lond. A-Math. Phys. Eng. Sci., 1996, 452, 813- 840.

Thomas, John M. et al., "Direct, Real-space Determination of Intergrowths in ZSM-5/ZSM-11 Catalysts", J. Chem. Soc., Chem. Commun., 1982, 1380-1383.

Millward, Robert G., et al., "Evidence for Semi-regularly Ordered Sequences of Mirror and Inversion Symmetry Planes in ZSM-5/ZSM-11 Shape-selective Zeolitic Catalysts", J. Chem. Soc. Faraday Trans., 1983, 79, 1075-1082.

Yakubovich, O.V. et al., "Crystal Structure of Chabazite K", Crystallography Reports, vol. 50, No. 4, 2005, pp. 595-604.

Nishitoba, Toshiki et al., "Control of AI Distribution in the CHA-Type Aluminosilicate Zeolites and Its Impact on the Hydrothermal Stability and Catalytic Properties", Ind. Eng. Chem. Res., 2018, 57, 3914-3922.

Snyder, Benjamin E.R., et al., Iron and Copper Active Sites in Zeolites and Their Correlation to Metalloenzymes:, Chem Rev., 2018, 118, 2718-2768.

Li, Sichi, et al., "First-Principles Analysis of Site- and Condition-Dependent Fe Speciation in SSZ-13 and Implications for Catalyst Optimization", ACS Catal., 2018, 8, 10119-10130.

Newtown, Mark A. et al., "On the Mechanism Underlying the Direct Conversion of Methane to Methanol by Copper Hosted in Zeolites; Braiding Cu K-Edge Xanes and Reactivity Studies", J. Am. Chem. Soc., 2018, 140, 10090-10093.

Lobo, Raul F., et al., "Structure-Direction in Zeolite Synthesis", Journal of Inclusion Phenomena and Molecular Recognition in Chemistry, 21, 1995, 47-78.

Muraoka, Koki et al., "Directing Aluminum Atoms into Energetically Favorable Tetrahedral Sites in a Zeolite Framework by Using Organic Structure-Directing Agents", Angewandte Chemie International Edition, 2018, 130, 3804-3808.

Di Iorio, John R. et al., "Introducing Catalytic Diversity into Single-Site Chabazite Zeolites of Fixed Composition via Synthetic Control of Active Site Proximity", ACS Catalysis, 2017, 7, 6663-6674.

Baddiley, J., et al., "Chemical Studies in the Biosynthesis of Prine Nucleotides. Part I. The Preparation of N-Glycylglycosylamines", Journal of Chemical Society, 1956, pp. 2818-2823.

Rao, C.N.R. et al., "Intergrowth Structures: The Chemistry of Solid-Solid Interfaces", Acc. Chem. Res., 1985, 18, 113-119.

Burchart, E. de Vos, et al., "Ordered overgrowth of zeolite X onto crystals of zeolite A", Zeolites, 1989, vol. 9 September. 423-435.

Goossens, Ann M., et al., "Synthesis and Characterization of Epitaxial FAU-on-EMT Zeolite Overgrowth Materials", Eur. J. Inorg. Chem., 2001, 1167-1181.

Database of Zeolite Structures at http://america.iza-structure.org.

Gallego, Eva M. et al., "Making Nanosized CHA Zeolites with Controlled AI Distribution for Optimizing Methanol-to-Olefin Performance", Chemistry A European Journal, Oct. 1, 2018, 24 (55), 14631-14635.

Deimund, Mark A. et al., "Effect of Heteroatom Concentration in SSZ-13 on the Methanol-to-Olefins Reaction", ACS Catalysis, 2016, 6, 542- 550.

Treacy, M.M.J., et al., "A general recursion method for calculating diffracted intensities from crystals containing planar faults", Proceedings of the Royal Chemical Society, 1991, 433: 499-520.

Díaz-Cabañas, María-José, et al., "Synthesis and structure of pure $SiO_2$ chabazite: the $SiO_2$ polymorph with the lowest framework density", Chemical Communications, 1998, pp. 1881-1882.

Harris, T.V. et al., "A Study of Guest/Host Energetics for the Synthesis of Cage Structures NON and CHA", Zeolites and Related Microporous Material: State of the Art 1994, Studies of Surface Science and Catalysis, vol. 84, p. 29-36.

Treacy, M.M.J., et al., "Collection of Simulated XRD Powder Patterns for Zeolites", Fifth Edition, Elsevier 2007, cover, copyright page and Table of Contents only.

Baker, R. Terry K., et al., "Novel Materials in Heterogenous Catalysis", May 1990, Chapter 2, p. 14-24.

Breck, Donald W., "Zeolite Molecular Sieves", 1973, John Wiley & Sons, cover, copyright page, and Table of Contents only.

(56) References Cited

OTHER PUBLICATIONS

Breck, Donald W., "Molecular Sieves: Structure, Chemistry and Use", included in previous listed publication.
Wagner, Paul et al., "Guest/Host Relationships in Synthesis of the Novel Cage-Based Zeolites SSZ-35, SSZ-36, and SSZ-39", *J. Am. Chem. Soc.*, 2000, 122, 263-273.
Leonowicz, M.E. et al., "Proposed synthetic zeolite ECR-1 structure gives a new zeolite framework topology", *Nature*, vol. 329, Oct. 29, 1987, pp. 819-821.
Paolucci, Christopher et al., "Dynamic multinuclear sites formed by mobilized copper ions in $No_x$ selective catalytic reduction", *Science*, 2017, 357, 898-903.
Heck, Ronald et al., "The Preparation of Catalytic Materials: Carriers, Active Components, and Monolithic Substrates", *Catalytic Air Pollution Control Commercial Technology, New York: Wiley-Intersciences*, 2002, pp. 18-19.

\* cited by examiner

Scale bar in SEM images in 50 μm.

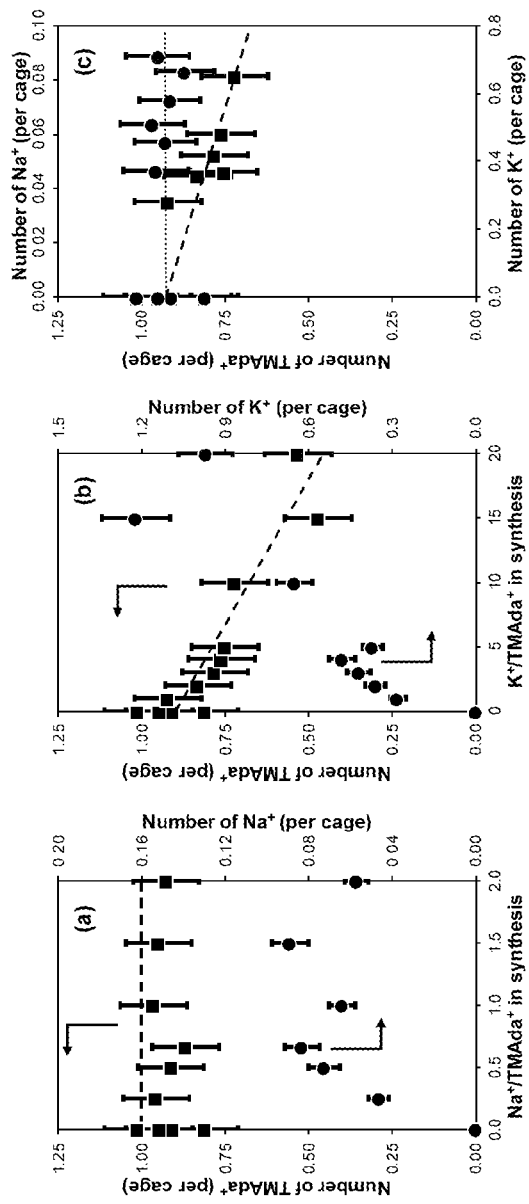

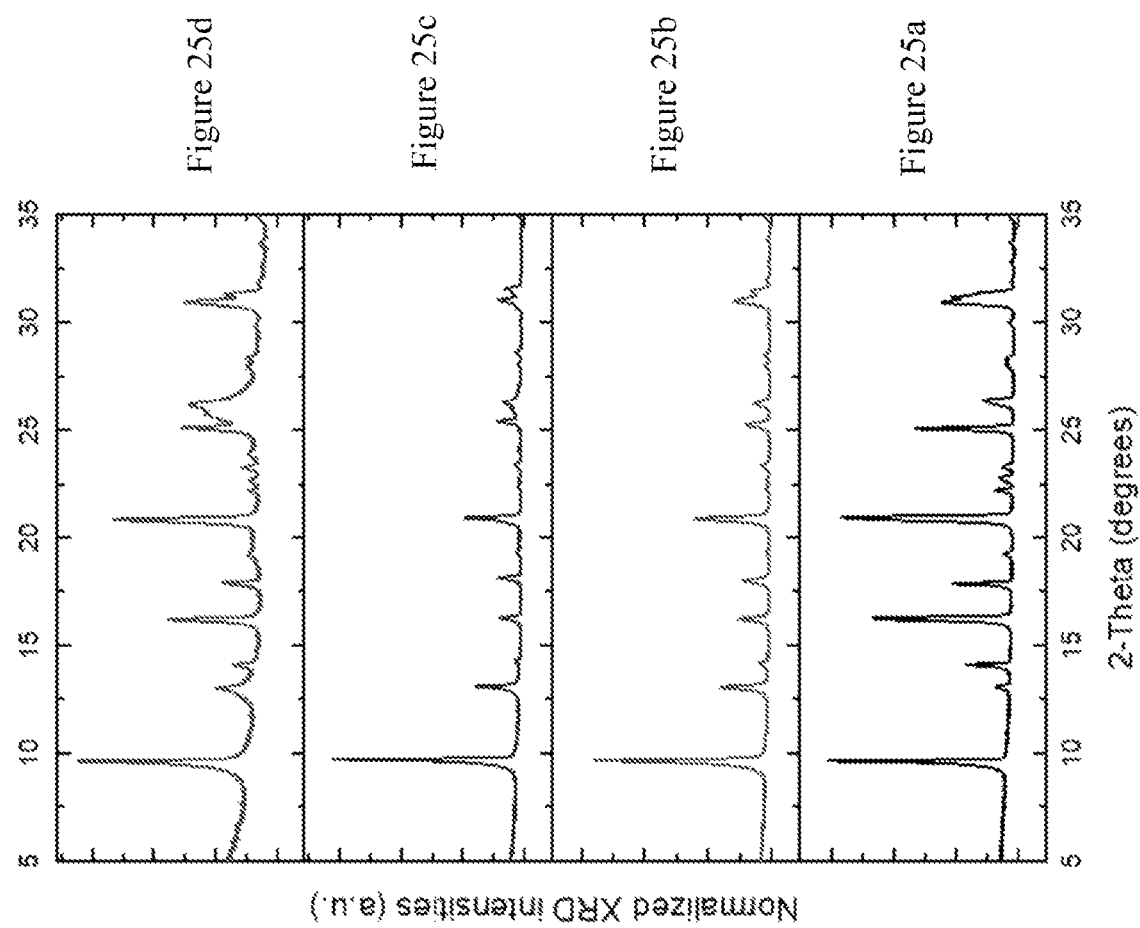

CHABAZITE SYNTHESIS METHOD INCLUDING ORGANIC AND INORGANIC STRUCTURE DIRECTING AGENTS AND CHABAZITE ZEOLITE WITH FLAKE-LIKE MORPHOLOGY

This application is a national stage filing under 35 U.S.C. § 371 of International Application No. PCT/I62020/057297, filed on Jul. 31, 2020, which claims the benefit of priority to U.S. Provisional Application No. 62/882,108, filed on Aug. 2, 2019, and to U.S. Provisional Application No. 63/002,595, filed on Mar. 31, 2020; the disclosure of each of these applications are each incorporated herein by reference in their entirety.

FIELD OF THE DISCLOSURE

The present disclosure relates to methods for the preparation of CHA zeolites, catalyst compositions comprising such zeolites, and to catalyst articles and systems employing such catalyst compositions.

BACKGROUND OF THE DISCLOSURE

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent, resulting in the formation predominantly of nitrogen and steam according to the following equations:

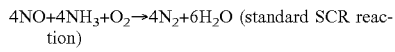
$4NO+4NH_3+O_2 \rightarrow 4N_2+6H_2O$ (standard SCR reaction)

$2NO_2+4NH_3 \rightarrow 3N_2+6H_2O$ (slow SCR reaction)

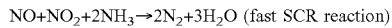
$NO+NO_2+2NH_3 \rightarrow 2N_2+3H_2O$ (fast SCR reaction)

Catalysts employed in the SCR process ideally should be able to retain good catalytic activity over a wide range of temperature conditions of use, for example, 200° C. to 600° C. or higher, under hydrothermal conditions. SCR catalysts are commonly employed in hydrothermal conditions, such as during the regeneration of a soot filter, a component of the exhaust gas treatment system used for the removal of particles.

Current catalysts employed in the SCR process include molecular sieves, such as zeolites, ion-exchanged with a catalytic metal such as iron or copper. Zeolites are crystalline materials having rather uniform pore sizes, which depending upon the type of zeolite and the type and amount of cations included in the zeolite, range from about 3 to about 10 Angstroms in diameter. Zeolites having 8-member ring pore openings and double-six ring secondary building units, particularly those having cage-like structures, are particularly well-suited for use as SCR catalysts. Metal-promoted zeolite catalysts including, among others, iron-promoted and copper-promoted zeolite catalysts are known for the selective catalytic reduction of nitrogen oxides with ammonia.

One exemplary zeolite that has been shown to be an effective catalyst for selective catalytic reduction of $NO_x$ with $NH_3$ when metal-exchanged (e.g., copper-exchanged) is a zeolite with a chabazite (CHA) framework. CHA zeolites are small pore zeolites with 8 member-ring pore openings (~3.8 Angstroms) accessible through their 3-dimensional porosity. A cage-like structure results from the connection of double six-ring building units by 4 rings. Zeolites having a CHA structure may be prepared, for instance, according to methods disclosed in U.S. Pat. Nos. 4,544,538 and 6,709,644, which are incorporated herein by reference.

The catalytic properties of zeolites are defined not only by their framework connectivity, but also by the microscopic atomic arrangement of framework aluminum (Al) atoms that generate catalytic active sites. In the case of CHA zeolites, which are high-symmetry frameworks comprised of a single unique tetrahedral-site (T-site), distinct arrangements of framework Al atoms (i.e., Al—O(—Si—O)$_x$—Al) can be defined as isolated (x≥3) or paired (x=1, 2) configurations in a six-membered ring (6-MR), and the latter have been quantified by exchange of divalent $Co^{2+}$ and $Cu^{2+}$ cations. These different framework Al ensembles in CHA have been linked to differences in turnover rates for methanol dehydration to dimethyl ether, time-on-stream stability for methanol-to-olefins catalysis, $CO_2$ adsorption equilibrium constants, and the speciation of extra-framework cationic Cu and Fe complexes that mediate partial methane oxidation (PMO) to methanol, and selective catalytic reduction (SCR) of $NO_x$ with $NH_3$. (Chen, H.-Y., in "Urea-SCR Technology for Denox after Treatment of Diesel Exhausts"; Nova, I., Tronconi, E., Eds.; Springer New York: New York, NY, 2014, p 123-147).

Zeolite materials provide a convenient platform for tailored materials design efforts because of their well-defined crystalline frameworks, which facilitate connecting data and insights from experimental and theoretical assessments of catalyst structure and function. Synthetic protocols that purposefully influence the arrangement of heteroatoms substituted in zeolite frameworks, and theoretical models of structure-directing agent (SDA)-framework interactions that can aid in development of such protocols, would provide avenues to prepare zeolites with tailored catalytic and adsorption properties. Cationic SDA molecules facilitate the substitution of anionic $AlO_{4/2}^-$ tetrahedral units for framework $SiO_{4/2}$ tetrahedral units during zeolite crystallization and have been proposed to influence the siting of Al at specific T-site locations based on the proximity of the charged portion of the SDA and the anionic lattice Al site. When considering a single type of extra-framework cation, either an organic molecule (e.g., trimethyl-1-adamantylammonium ion (TMAda$^+$)), inorganic cation (e.g., $Cu^{2+}$) or protons, first-principles density functional theory (DFT) and molecular dynamics (MD) simulations to model interactions between these cations and Al sites in the CHA framework have provided evidence for the dominant role of electrostatic interactions on the stability of various framework Al arrangements. The effects of mixtures of cationic organic and inorganic SDAs on the energetics of framework Al arrangements, however, are not as well understood. Crystallization of high-silica (Si/Al>7) zeolites typically relies on the presence of organic SDA molecules in order to balance the anionic lattice charges via electrostatic interactions, and to stabilize the siliceous portions of the zeolite lattice via dispersive interactions, which can be tailored to selectively guide crystallization towards the desired crystal phase. Incorporation of alkali cations during zeolite crystallization has been used to control the crystal morphology of MFI, spatially bias Al incorporation in FAU, and to influence the arrangement of Al sites in MFI zeolites among differently sized voids (straight and sinusoidal channels and their intersections) and between isolated and paired configurations.

Previously, it has been reported that CHA zeolites (Si/Al=15) crystallized from synthesis media containing only low charge-density organic TMAda$^+$ as the SDA contain predominantly isolated Al sites, (Di Iorio, J. R.; Gounder, R. Chem. Mater. 2016, 28, 2236-2247), perhaps a consequence of adamantyl groups (~0.7 nm diam.) that impose steric constraints to limit the occupation of each CHA cage (~0.7 nm diam.) to only one TMAda$^+$ molecule (Zones, S. I., Journal of the Chemical Society, Faraday Transactions 1991, 87, 3709-3716). The partial substitution of Na$^+$ for TMAda$^+$ in CHA synthesis media (0<Na$^+$/TMAda$^+$<2), while holding all other synthesis variables constant, crystallized CHA zeolites (Si/Al=15) that contained one TMAda$^+$ molecule per CHA cage, but varying amounts of Na$^+$ that correlated with the total number of paired Al sites as measured by saturation Co$^{2+}$ ion-exchange levels (Di Iorio, J. R.; Gounder, R. Chem. Mater. 2016, 28, 2236-2247; Di Iorio et al., ACS Catal. 2017, 7, 6663-6674). Increasing the Na$^+$/TMAda$^+$ above 2 resulted in a phase transformation to MOR, likely reflecting a preference to form a higher density framework to satisfy electrostatic constraints imposed by the charge density of the synthesis media (Di Iorio, J. R.; Gounder, R. Chem. Mater. 2016, 28, 2236-2247; Blackwell et al., Angewandte Chemie International Edition 2003, 42, 1737-1740; Lewis et al., Studies in Surface Science and Catalysis 2004, 154, 364-372; Park et al., Chemistry of Materials 2014, 26, 6684-6694). Preparation of CHA zeolites using a Na$^+$/TMAda$^+$-containing synthesis gel is further disclosed in U.S. Patent Application Publication No. 2017/0107114, the disclosure of which is incorporated by reference herein in its entirety.

Increasingly stringent emissions regulations have driven the need for developing SCR catalysts with improved capacity to manage NO$_x$ emissions, particularly under lean, low engine exhaust temperature conditions, while also exhibiting sufficient high temperature thermal stability. There is a need for zeolitic materials with tailored adsorption and catalytic functions, and for methods of making small pore zeolites, such as CHA, that are efficient and low cost, but that also provide materials with suitable properties, for example, for SCR catalysis. Particularly, there is a continuing need in the art for SCR catalysts effective to abate NO$_x$ emissions from exhaust gas streams efficiently and effectively. The Al distribution in zeolites has been linked to structural stability, deactivation and coking in acid catalysis with hydrocarbons and alcohols, so manipulating this distribution can benefit those technologies. Aluminum distribution in zeolites has also been linked to the numbers and structures of extra-framework metal ions (e.g., Cu$^{2+}$, (CuOH)$^+$) that can be exchanged onto the zeolite, and because these ions are catalytic sites in selective catalytic reduction of NO$_x$ with ammonia, manipulating this distribution can benefit those technologies. Accordingly, there is a significant unmet need in the art for synthetic procedures that directly and systematically control the Al distribution in chabazite zeolites at fixed Si/Al ratios by manipulating only the type and amount of structure-directing agents used.

Chabazite, an example of a zeolite having the CHA framework, is typically found in a limited range of morphologies, for example, cubic crystals, cubic crystals with truncated corners, spherical/ellipsoidal crystals, and worm-like crystals. See, for example, Kumar et al., *J. Am. Chem. Soc.* 137 (2015), 13007-13017; Bohström et al., *Microporous and Mesoporous Materials* 195 (2014) 294-302; and Guo et al., *Chemical Engineering Journal* 358 (2019), 331-339, each of which is incorporated by reference herein in its entirety. Certain morphologies may exhibit different behavior during, for example, substrate coating or under catalytic conditions, each of which may prove advantageous in terms of catalytic performance (e.g., SCR performance). Accordingly, synthetic protocols that purposefully influence zeolite morphology may provide avenues to prepare catalyst materials having tailored catalytic properties and improved performance.

SUMMARY OF THE DISCLOSURE

The present disclosure generally provides methods for producing chabazite zeolites.

In some aspects, a method is provided for producing chabazite zeolites with controlled aluminum distribution. For purposes of this disclosure, a zeolite structure with controlled aluminum distribution is one in which the placement and arrangement (i.e. distribution) of aluminum atoms in its framework is controlled through method of preparation. The combined experimental and theoretical approach disclosed herein have revealed the different interactions between mixtures of organic and inorganic structure-directing agents (SDAs) used in the crystallization of CHA zeolites, providing a framework to design zeolites with tailored adsorption and catalytic function. Surprisingly, according to the present disclosure, it has been found that using mixtures of organic and inorganic cations that differ in charge density as SDAs during zeolite crystallization enabled the arrangement of anionic framework Al centers (Al—O(—Si—O)$_x$—Al) to be influenced between isolated (x≥3) and paired (x=1, 2) arrangements. Specifically, CHA zeolites crystallized from mixtures of K$^+$ and TMAda$^+$ showed that K$^+$ cations displaced TMAda$^+$ from CHA cages, leading to the formation of predominantly isolated Al sites within the same composition range. Further, CHA zeolites were able to crystallize from synthesis media containing more than an order-of-magnitude higher inorganic-to-organic SDA ratio with K$^+$ (K$^+$/TMAda$^+$<50) than with Na$^+$ (Na$^+$/TMAda$^+$<2), which has favorable cost implications. Finally, according to the present disclosure, it was surprisingly found that the organic and inorganic cations cooperated or competed for occupancy within void spaces of CHA zeolites, resulting in some embodiments in intergrowth (mixed domains) of crystalline phases.

Accordingly, in one aspect, the disclosure provides a method of synthesizing a zeolite having the CHA crystalline framework, the method comprising preparing a mixture of water, an aluminum source, a silica source, a source of an organic structure directing agent, and an inorganic structure-directing agent to form a synthesis gel, wherein the inorganic structure-directing agent is a source of potassium cations; and subjecting the synthesis gel to a crystallization process to crystallize a chabazite zeolite.

In some embodiments, the source of the potassium cations is potassium hydroxide.

In some embodiments, preparing comprises a first mixing step comprising adding the source of the organic structure-directing agent, the source of the inorganic structure-directing agent, and the source of aluminum to the water to form an aluminum-containing aqueous solution; mixing the aqueous solution for a first time period; and a second mixing step comprising adding the source of silicon to the aluminum-containing aqueous solution and mixing for a second time period to form an aluminosilicate-containing solution.

In some embodiments, the first and second time periods are each independently from about 1 second to about 24 hours.

In some embodiments, the first and second mixing steps are performed at a temperature of from about 20° C. to about 100° C.

In some embodiments, the crystallization process comprises mixing the synthesis gel at a temperature of from about 140° C. to about 200° C. for a time period of from about 24 hours to about 6 days.

In some embodiments, the method further comprises filtering the crystals formed during the heating step.

In some embodiments, the source of the organic structure-directing agent is N,N,N-trimethyl-1-adamantylammonium hydroxide (TMAda).

In some embodiments, the amount of TMAda and the amount of the potassium cation source is such that the molar ratio of potassium cations to N,N,N-trimethyl-1-adamantylammonium cations are in a molar ratio in the range of about 1 to about 20.

In some embodiments, the source of aluminum is aluminum hydroxide, aluminum nitrate, aluminosilicate, aluminum chloride, aluminum phosphate, or aluminum isopropoxide. In some embodiments, the source of aluminum is aluminum hydroxide or aluminum isopropoxide. In some embodiments, the source of aluminum is aluminum hydroxide.

In some embodiments, the source of silicon is colloidal silica, a silicon alkoxide compound, fumed silica, amorphous silica, or aluminosilicate. In some embodiments, the source of silicon is colloidal silica.

In some embodiments, a OH/Si ratio of the synthesis gel is from about 0.1 to about 0.5.

In some embodiments, the CHA zeolite has a controlled aluminum distribution, the controlled aluminum distribution comprising an arrangement of anionic framework Al centers according to the formula (Al—O(—Si—O)x-Al), wherein x=1 or 2, wherein the anionic framework Al centers are in a paired arrangement; or x≥3, wherein the anionic framework Al centers are in an isolated arrangement.

In some embodiments, a silica-to-alumina ratio (SAR) of the synthesis gel is selected to provide a CHA zeolite having an SAR of from about 2 to about 60. In some embodiments, a silica-to-alumina ratio (SAR) of the synthesis gel is selected to provide a CHA zeolite having an SAR of from about 6 to about 20.

In some embodiments, a ratio of the silicon source to the aluminum source to TMAda to the potassium cation source to the water is represented by the formula: $1SiO_2/0.033Al_2O_3/X$ $TMAdaOH/0.5*(0.5-X)$ $K_2O/44H_2O$; wherein the value of X is from 0.01 to 0.25.

In some embodiments, the zeolite CHA crystalline framework according to the disclosed method is an intergrowth zeolite comprising a first CHA phase and a second CHA phase.

In some embodiments, the intergrowth zeolite has a crystal size of from about 0.1 μm to about 15 μm.

In some embodiments, the intergrowth zeolite comprises a first CHA phase and a second CHA phase; wherein the first CHA phase and the second CHA phase each independently have a unit cell volume of from about 2338 $Å^3$ to 2489 $Å^3$; and the unit cell volume of the first CHA phase is different from the unit cell volume of the second CHA phase. In some embodiments, the unit cell volume for first CHA phase and the second CHA phase is in the range from 2353 $Å^3$ to 2411 $Å^3$.

In some embodiments, the first CHA phase and the second CHA phase each independently have a silica-to-alumina ratio (SAR) of from about 4 to about 100, and the SAR of the first CHA phase is different from the SAR of the second CHA phase.

In some embodiments, the first CHA phase comprises a higher SAR than the second CHA phase. In some embodiments, the SAR of the first CHA phase is from about 10 to about 40, and the SAR of the second CHA phase is from about 6 to about 8. In some embodiments, the SAR of the first CHA phase is from about 10 to about 20. In some embodiments, the SAR of the first CHA phase is from about 10 to about 15.

In some embodiments, the first CHA phase represents from about 5% to about 95% of the intergrowth zeolite; the first CHA phase has a potassium cation to aluminum ratio of greater than 0.5; and the second CHA phase has a potassium cation to aluminum ratio of less than about 0.5.

In some embodiments, the first CHA phase, the second CHA phase, or both, comprise a silicoaluminophosphate (SAPO) composition. In some embodiments, the SAPO composition is SAPO-34 or SAPO-44.

In another aspect is provided an intergrowth zeolite having the chabazite (CHA) crystalline framework, wherein the CHA crystalline framework comprises a first CHA phase and a second CHA phase; wherein the first CHA phase and the second CHA phase each independently have a unit cell volume of from about 2338 $Å^3$ to 2489 $Å^3$; and the unit cell volume of the first CHA phase is different from the unit cell volume of the second CHA phase. In some embodiments, the unit cell volume for first CHA phase and the second CHA phase is in the range from 2353 $Å^3$ to 2411 $Å^3$.

In some embodiments, the first CHA phase and the second CHA phase each independently have a silica-to-alumina ratio (SAR) of from about 4 to about 100; and the SAR of the first CHA phase is different from the SAR of the second CHA phase.

In some embodiments, the first CHA phase comprises a higher SAR than the second CHA phase. In some embodiments, the SAR of the first CHA phase is from about 10 to about 40, and the SAR of the second CHA phase is from about 6 to about 8. In some embodiments, the SAR of the first CHA phase is from about 10 to about 20. In some embodiments, the SAR of the first CHA phase is from about 10 to about 15.

In some embodiments, the first CHA phase represents from about 5% to about 95% of the intergrowth zeolite; the first CHA phase has a potassium cation to aluminum ratio of greater than 0.5; and the second CHA phase has a potassium cation to aluminum ratio of less than about 0.5.

In some embodiments, the first CHA phase, the second CHA phase, or both, comprise a silicoaluminophosphate (SAPO) composition. In some embodiments, the SAPO composition is SAPO-34 or SAPO-44.

In some embodiments, the fraction of the aluminum atoms in the crystal lattice framework positions of the CHA zeolite framework in an isolated configuration is in the range of from about 0.90 to about 1.00. In some embodiments, the fraction of the aluminum atoms in the crystal lattice framework positions of the CHA zeolite framework in an isolated configuration is from about 0.95 to about 1.00.

In another aspect is provided a selective catalytic reduction (SCR) catalyst effective for the abatement of nitrogen oxides ($NO_x$) in an exhaust gas stream, the SCR catalyst comprising the zeolite material as disclosed herein, promoted with a promoter metal.

In some embodiments, the promoter metal is present in an amount of about 1.0 wt % to about 10 wt %, based on the total weight of the SCR catalyst, and calculated as the metal oxide. In some embodiments, the promoter metal is present in an amount of about 4 to about 6 wt %. In some embodiments, the promoter metal is selected from iron, copper, and combinations thereof.

In another aspect is provided an SCR catalyst article effective to abate nitrogen oxides ($NO_x$) from an engine exhaust gas, the SCR catalyst article comprising a substrate having the selective catalytic reduction (SCR) catalyst as disclosed herein disposed on at least a portion thereof.

In some embodiments, the substrate is a honeycomb substrate. In some embodiments, the honeycomb substrate is a flow-through substrate or a wall-flow filter.

In another aspect is provided an exhaust gas treatment system comprising an engine that produces an exhaust gas stream; and the SCR catalyst article as disclosed herein, positioned downstream from the engine and in fluid communication with the exhaust gas stream.

In another aspect is provided a low temperature $NO_x$ adsorption (LT-NA) catalyst effective for the abatement of nitrogen oxides ($NO_x$) in an exhaust gas stream, the LT-NA catalyst comprising the intergrowth zeolite material as disclosed herein, promoted with a platinum group metal.

In another aspect is provided a catalyst composition effective for one or more transformations selected from olefin formation, hydrocarbon cracking, elimination of an alcohol to form an olefin, formation of methylamine from methanol and ammonia, and the partial oxidation of methane to methanol, the catalyst composition comprising the intergrowth zeolite material as disclosed herein.

In some aspects, a method is provided for producing chabazite zeolites having a predominantly flake-like morphology. Surprisingly, according to the present disclosure, it has been found that using synthesis gel compositions having a high ratio of potassium ions to organic structure directing agent (OSDA) enabled the synthesis of CHA zeolites having a predominantly flake-like morphology.

In a further aspect, the disclosure provides a zeolite material having a CHA crystalline framework, wherein crystals of the zeolite material have a predominantly flake-like morphology as determined by scanning electron microscopy (SEM) Energy Dispersive X-Ray Spectroscopy (SEM/EDS). In some embodiments, at least about 40% of the crystals have the flake-like morphology as determined by SEM/EDS. In some embodiments, at least about 70% by weight of the crystals have the flake-like morphology.

In some embodiments, an average length and width of the crystals is from about 0.3 to about 1.5 µm, and an average thickness is less than about 0.050 µm. In some embodiments, the average thickness is less than about 0.025 µm.

In some embodiments, the aspect ratio of the crystals is greater than about 20. In some embodiments, the aspect ratio of the crystals is from about 20 to about 40.

In some embodiments, a silica-to-alumina (SAR) molar ratio of the zeolite material is from about 2 to about 60. In some embodiments, the SAR is from about 10 to about 30.

In some embodiments, a silica-to-potassium molar ratio of the zeolite material is less than about 20. In some embodiments, the silica-to-potassium molar ratio is from about 12 to about 17.

In another aspect is provided method of synthesizing a zeolite material having a CHA crystalline framework and a predominantly flake-like morphology, the method comprising: preparing a mixture of water, an aluminum source, a silicon source, an organic structure directing agent, and an inorganic structure directing agent to form a synthesis gel, wherein the inorganic structure directing agent comprises potassium cations; and subjecting the synthesis gel to a crystallization process to crystallize the zeolite material.

In some embodiments, preparing comprises: a first mixing step comprising adding the organic structure-directing agent, the inorganic structure-directing agent, and the source of aluminum to the water to form an aluminum-containing aqueous solution; mixing the aqueous solution for a first time period; and a second mixing step comprising adding the source of silicon to the aluminum-containing aqueous solution and mixing for a second time period to form an aluminosilicate-containing solution. In some embodiments, the first and second time periods are each independently from about 1 second to about 24 hours. In some embodiments, the first and second mixing steps are performed at a temperature of from about 20° C. to about 100° C.

In some embodiments, the crystallization process comprises mixing the synthesis gel at a temperature of from about 100° C. to about 200° C. for a time period of from about 12 hours to about 6 days. In some embodiments, the temperature is from about 160° C. to about 180° C.

In some embodiments, the method further comprises filtering the crystals formed during the heating step.

In some embodiments, the organic structure-directing agent is selected from the group consisting of N,N,N-trimethyl-1-adamantylammonium hydroxide (TMAdaOH), trimethylcyclohexylammonium hydroxide, tetraethylammonium hydroxide, benzyltrimethylammonium hydroxide, 1,1, 3,5-tetramethylpiperidinium hydroxide, choline hydroxide, N,N-dimethyl piperidinium hydroxide, trimethyl-2-ammonium exo-norbornane, and N-methyl-3-quinuclidinol. In some embodiments, the organic structure-directing agent is TMAdaOH.

In some embodiments, the inorganic structure directing agent is potassium hydroxide. In some embodiments, the amount of TMAdaOH and the amount of potassium cations present in the synthesis gel is such that a molar ratio of potassium cations to TMAdaOH is about 10 or greater. In some embodiments, the molar ratio of potassium cations to TMAdaOH is from about 15 to about 50. In some embodiments, the amount of TMAdaOH and the amount of silicon source present in the synthesis gel is such that a molar ratio of TMAdaOH to silicon atoms is less than about 0.05. In some embodiments, the molar ratio of TMAdaOH to silicon atoms is from about 0.05 to about 0.01.

In some embodiments, the source of aluminum is a zeolite, aluminum isopropoxide, or aluminum hydroxide. In some embodiments, the source of aluminum is aluminum hydroxide.

In some embodiments, the source of silicon is colloidal silica, a silicon alkoxide, fumed silica, amorphous silica, or an aluminosilicate. In some embodiments, the source of silicon is colloidal silica.

In some embodiments, a silica-to-alumina ratio (SAR) of the synthesis gel is selected to provide a zeolite material having an SAR of from about 2 to about 60. In some embodiments, a silica-to-alumina ratio (SAR) of the synthesis gel is selected to provide a zeolite material having an SAR of from about 10 to about 30.

In a still further aspect is provided a zeolite material having a CHA crystalline framework and a predominantly flake-like morphology as determined by scanning electron microscopy/Energy Dispersive X-Ray Spectroscopy (SEM/EDS), prepared by the method disclosed herein.

In yet another aspect is provided a selective catalytic reduction (SCR) catalyst effective for the abatement of nitrogen oxides (NO$_x$) in an exhaust gas stream, the SCR catalyst comprising the zeolite material as disclosed herein, promoted with a promoter metal.

In some embodiments, the promoter metal is present in an amount of from about 1.0 wt % to about 10 wt %, based on the total weight of the SCR catalyst, and calculated as the promoter metal oxide. In some embodiments, the promoter metal is present in an amount of about 4 to about 6 wt %. In some embodiments, the promoter metal is a transition metal. In some embodiments, the promoter metal is selected from iron, copper, manganese, and combinations thereof. In some embodiments, the promoter metal is selected from iron, copper, and combinations thereof.

The invention includes, without limitation, the following embodiments.

Embodiment 1: A method of synthesizing a zeolite having the CHA crystalline framework, the method comprising: preparing a mixture of water, an aluminum source, a silica source, a source of an organic structure directing agent, and an inorganic structure-directing agent to form a synthesis gel, wherein the inorganic structure-directing agent is a source of potassium cations; and subjecting the synthesis gel to a crystallization process to crystallize the zeolite having the CHA crystalline framework.

Embodiment 2: The method of embodiment 1, wherein the source of the potassium cations is potassium hydroxide.

Embodiment 3: The method of embodiment 1 or 2, wherein preparing comprises: a first mixing step comprising adding the source of the organic structure-directing agent, the source of the inorganic structure-directing agent, and the source of aluminum to the water to form an aluminum-containing aqueous solution; mixing the aqueous solution for a first time period; and a second mixing step comprising adding the source of silicon to the aluminum-containing aqueous solution and mixing for a second time period to form an aluminosilicate-containing solution.

Embodiment 4: The method of any one of embodiments 1-3, wherein the first and second time periods are each independently from about 1 second to about 24 hours.

Embodiment 5: The method of any one of embodiments 1-4, wherein the first and second mixing steps are performed at a temperature of from about 20° C. to about 100° C.

Embodiment 6: The method of any one of embodiments 1-5, wherein the crystallization process comprises mixing the synthesis gel at a temperature of from about 140° C. to about 200° C. for a time period of from about 24 hours to about 6 days.

Embodiment 7: The method of any one of embodiments 1-6 further comprising filtering the crystals formed during the heating step.

Embodiment 8: The method of any one of embodiments 1-7, wherein the source of the organic structure-directing agent is N,N,N-trimethyl-1-adamantylammonium hydroxide (TMAda).

Embodiment 9: The method of any one of embodiments 1-8, wherein the amount of TMAda and the amount of the potassium cation source is such that the molar ratio of potassium cations to N,N,N-trimethyl-1-adamantylammonium cations are in a molar ratio in the range of about 1 to about 20.

Embodiment 10: The method of any one of embodiments 1-9, wherein the source of aluminum is aluminum hydroxide, aluminum nitrate, aluminosilicate, aluminum chloride, aluminum phosphate, or aluminum triisopropoxide.

Embodiment 11: The method of any one of embodiments 1-10, wherein the source of aluminum is aluminum hydroxide or aluminum triisopropoxide.

Embodiment 12: The method of any one of embodiments 1-11, wherein the source of aluminum is aluminum hydroxide.

Embodiment 13: The method of any one of embodiments 1-12, wherein the source of silicon is colloidal silica, a silicon alkoxide compound, fumed silica, amorphous silica, or aluminosilicate.

Embodiment 14: The method of any one of embodiments 1-13, wherein the source of silicon is colloidal silica.

Embodiment 15: The method of any one of embodiments 1-14, wherein a OH/Si ratio of the synthesis gel is from about 0.1 to about 0.5.

Embodiment 16: The method of any one of embodiments 1-15, wherein the CHA zeolite has a controlled aluminum distribution, the controlled aluminum distribution comprising an arrangement of anionic framework Al centers according to the formula (Al—O(—Si—O)$_x$—Al), wherein: x=1 or 2, wherein the anionic framework Al centers are in a paired arrangement; or x≥3, wherein the anionic framework Al centers are in an isolated arrangement.

Embodiment 17: The method of any one of embodiments 1-16, wherein a silica-to-alumina ratio (SAR) of the synthesis gel is selected to provide a CHA zeolite having an SAR of from about 2 to about 60.

Embodiment 18: The method of any one of embodiments 1-17, wherein a silica-to-alumina ratio (SAR) of the synthesis gel is selected to provide a CHA zeolite having an SAR of from about 6 to about 20.

Embodiment 19: The method of any one of embodiments 1-18, wherein a ratio of the silicon source to the aluminum source to TMAda to the potassium cation source to the water is represented by the formula: 1SiO$_2$/0.033Al$_2$O$_3$/X TMAd-aOH/0.5*(0.5−X) K$_2$O/44H$_2$O; wherein the value of X is from 0.01 to 0.25.

Embodiment 20: The method of any one of embodiments 1-19, wherein: the zeolite having the CHA crystalline framework is an intergrowth zeolite comprising a first CHA phase and a second CHA phase; the first CHA phase and the second CHA phase each independently have a unit cell volume of from about 2338 Å$^3$ to 2489 Å$^3$; and the unit cell volume of the first CHA phase is different from the unit cell volume of the second CHA phase.

Embodiment 21: The method of any one of embodiments 1-20, wherein: the first CHA phase and the second CHA phase each independently have a silica-to-alumina ratio (SAR) of from about 4 to about 100; and the SAR of the first CHA phase is different from the SAR of the second CHA phase.

Embodiment 22: The method of any one of embodiments 1-21, wherein the first CHA phase comprises a higher SAR than the second CHA phase.

Embodiment 23: The method of any one of embodiments 1-22, wherein the SAR of the first CHA phase is from about 10 to about 40, and the SAR of the second CHA phase is from about 6 to about 8.

Embodiment 24: The method of any one of embodiments 1-23, wherein the SAR of the first CHA phase is from about 10 to about 20.

Embodiment 25: The method of any one of embodiments 1-24, wherein the SAR of the first CHA phase is from about 10 to about 15.

Embodiment 26: The method of any one of embodiments 1-25, wherein: the first CHA phase represents from about 5% to about 95% of the intergrowth zeolite; the first CHA phase has a potassium cation to aluminum ratio of greater than 0.5; and the second CHA phase has a potassium cation to aluminum ratio of less than about 0.5.

Embodiment 27: The method of any one of embodiments 1-26, wherein the first CHA phase, the second CHA phase, or both, comprises a silicoaluminophosphate (SAPO) composition.

Embodiment 28: The method of any one of embodiments 1-27, wherein the SAPO composition is SAPO-34 or SAPO-44.

Embodiment 29: The method of any one of embodiments 1-28, wherein the intergrowth zeolite crystal size is from about 0.1 to about 15 μm.

Embodiment 30: An intergrowth zeolite having the CHA crystalline framework, wherein: the CHA crystalline framework comprises a first CHA phase and a second CHA phase; the first CHA phase and the second CHA phase each independently have a unit cell volume of from about 2338 $Å^3$ to 2489 $Å^3$; and the unit cell volume of the first CHA phase is different from the unit cell volume of the second CHA phase.

Embodiment 31: The intergrowth zeolite of embodiment 30, wherein: the first CHA phase and the second CHA phase each independently have a silica-to-alumina ratio (SAR) of from about 4 to about 100; and the SAR of the first CHA phase is different from the SAR of the second CHA phase.

Embodiment 32: The intergrowth zeolite of embodiment 30 or 31, wherein the first CHA phase comprises a higher SAR than the second CHA phase.

Embodiment 33: The intergrowth zeolite of any one of embodiments 30-32, wherein the SAR of the first CHA phase is from about 10 to about 40, and the SAR of the second CHA phase is from about 6 to about 8.

Embodiment 34: The intergrowth zeolite of any one of embodiments 30-33, wherein the SAR of the first CHA phase is from about 10 to about 20.

Embodiment 35: The intergrowth zeolite of any one of embodiments 30-34, wherein the SAR of the first CHA phase is from about 10 to about 15.

Embodiment 36: The intergrowth zeolite of any one of embodiments 30-35, wherein: the first CHA phase represents from about 5% to about 95% of the intergrowth zeolite; the first CHA phase has a potassium cation to aluminum ratio of greater than 0.5; and the second CHA phase has a potassium cation to aluminum ratio of less than about 0.5.

Embodiment 37: The intergrowth zeolite of any one of embodiments 30-36, wherein the first CHA phase, the second CHA phase, or both, comprise a silicoaluminophosphate (SAPO) composition.

Embodiment 38: The intergrowth zeolite of any one of embodiments 30-37, wherein the SAPO composition is SAPO-34 or SAPO-44.

Embodiment 39: The intergrowth zeolite of any one of embodiments 30-38, wherein the intergrowth zeolite crystal size is from about 0.1 to about 15 μm.

Embodiment 40: The intergrowth zeolite of any one of embodiments 30-39, wherein the fraction of the aluminum atoms in the crystal lattice framework positions of the CHA crystalline framework in an isolated configuration is in the range of from about 0.90 to about 1.00.

Embodiment 41: The intergrowth zeolite of any one of embodiments 30-40, wherein the fraction of the aluminum atoms in the crystal lattice framework positions of the CHA crystalline framework in an isolated configuration is from about 0.95 to about 1.00.

Embodiment 42: A selective catalytic reduction (SCR) catalyst effective for the abatement of nitrogen oxides ($NO_x$) in an exhaust gas stream, the SCR catalyst comprising the intergrowth zeolite material according to any one of embodiments 30 to 41, promoted with a promoter metal.

Embodiment 43: The SCR catalyst of embodiment 42, wherein the promoter metal is present in an amount of about 1.0 wt % to about 10 wt %, based on the total weight of the SCR catalyst, and calculated as the metal oxide.

Embodiment 44: The SCR catalyst of embodiment 42 or 43, wherein the promoter metal is present in an amount of about 4 to about 6 wt %.

Embodiment 45: The SCR catalyst of any one of embodiments 42 to 44, wherein the promoter metal is selected from iron, copper, and combinations thereof Embodiment 46: An SCR catalyst article effective to abate nitrogen oxides ($NO_x$) from an engine exhaust gas, the SCR catalyst article comprising a substrate having the selective catalytic reduction (SCR) catalyst according to any one of embodiments 42 to 45 disposed on at least a portion thereof.

Embodiment 47: The SCR catalyst article of embodiment 46, wherein the substrate is a honeycomb substrate.

Embodiment 48: The SCR catalyst article of embodiment 47, wherein the honeycomb substrate is a flow-through substrate or a wall-flow filter.

Embodiment 49: An exhaust gas treatment system comprising: an engine that produces an exhaust gas stream; and the SCR catalyst article according to any of embodiments 46 to 48, positioned downstream from the engine and in fluid communication with the exhaust gas stream.

Embodiment 50: A low temperature $NO_x$ adsorption (LT-NA) catalyst effective for the abatement of nitrogen oxides ($NO_x$) in an exhaust gas stream, the LT-NA catalyst comprising the intergrowth zeolite material according to any one of embodiments 30 to 41, promoted with a platinum group metal.

Embodiment 51: A catalyst composition effective for one or more transformations selected from olefin formation, hydrocarbon cracking, elimination of an alcohol to form an olefin, formation of methylamine from methanol and ammonia, and the partial oxidation of methane to methanol, the catalyst composition comprising the intergrowth zeolite material according to any one of embodiments 30 to 41.

Embodiment 52: A zeolite material having a CHA crystalline framework, wherein crystals of the zeolite material have a predominantly flake-like morphology as determined by scanning electron microscopy (SEM).

Embodiment 53: The zeolite material of embodiment 52, wherein at least about 40% of the crystals have the flake-like morphology as determined by scanning electron microscopy/Energy Dispersive X-Ray Spectroscopy (SEM/EDS).

Embodiment 54: The zeolite material of embodiment 52 or 53, wherein at least about 70% by weight of the crystals have the flake-like morphology.

Embodiment 55: The zeolite material of any one of embodiments 52 to 54, wherein an average length and width of the crystals is from about 0.3 to about 1.5 μm, and an average thickness is less than about 0.050 μm.

Embodiment 56: The zeolite material of any one of embodiments 52 to 55, wherein the average thickness is less than about 0.025 μm.

Embodiment 57: The zeolite material of any one of embodiments 52 to 56, wherein the aspect ratio of the crystals is greater than about 20.

Embodiment 58: The zeolite material of any one of embodiments 52 to 57, wherein the aspect ratio of the crystals is from about 20 to about 40.

Embodiment 59: The zeolite material of any one of embodiments 52 to 58, wherein a silica-to-alumina (SAR) molar ratio of the zeolite material is from about 2 to about 60.

Embodiment 60: The zeolite material of any one of embodiments 52 to 59, wherein the SAR is from about 10 to about 30.

Embodiment 61: The zeolite material of any one of embodiments 52 to 60, wherein a silica-to-potassium molar ratio of the zeolite material is less than about 20.

Embodiment 62: The zeolite material of any one of embodiments 52 to 61, wherein the silica-to-potassium molar ratio is from about 12 to about 17.

Embodiment 63: A method of synthesizing a zeolite material having a CHA crystalline framework and a predominantly flake-like morphology, the method comprising: preparing a mixture of water, an aluminum source, a silicon source, an organic structure directing agent, and an inorganic structure directing agent to form a synthesis gel, wherein the inorganic structure directing agent comprises potassium cations; and subjecting the synthesis gel to a crystallization process to crystallize the zeolite material.

Embodiment 64: The method of embodiment 63, wherein preparing comprises: a first mixing step comprising adding the organic structure-directing agent, the inorganic structure-directing agent, and the source of aluminum to the water to form an aluminum-containing aqueous solution; mixing the aqueous solution for a first time period; and a second mixing step comprising adding the source of silicon to the aluminum-containing aqueous solution and mixing for a second time period to form an aluminosilicate-containing solution.

Embodiment 65: The method of embodiment 63 or 64, wherein the first and second time periods are each independently from about 1 second to about 24 hours.

Embodiment 66: The method of any one of embodiments 63-65, wherein the first and second mixing steps are performed at a temperature of from about 20° C. to about 100° C.

Embodiment 67: The method of any one of embodiments 63-66, wherein the crystallization process comprises mixing the synthesis gel at a temperature of from about 100° C. to about 200° C. for a time period of from about 12 hours to about 6 days.

Embodiment 68: The method of any one of embodiments 63-67, wherein the temperature is from about 160° C. to about 180° C.

Embodiment 69: The method of any one of embodiments 63-68, further comprising filtering the crystals formed during the heating step.

Embodiment 70: The method of any one of embodiments 63-69, wherein the organic structure-directing agent is selected from the group consisting of N,N,N-trimethyl-1-adamantylammonium hydroxide (TMAdaOH), trimethylcyclohexylammonium hydroxide, tetraethylammonium hydroxide, benzyltrimethylammonium hydroxide, 1,1,3,5-tetramethylpiperidinium hydroxide, choline hydroxide, N,N-dimethyl piperidinium hydroxide, trimethyl-2-ammonium exo-norbornane, and N-methyl-3-quinuclidinol.

Embodiment 71: The method of any one of embodiments 63-70, wherein the organic structure-directing agent is TMAdaOH.

Embodiment 72: The method of any one of embodiments 63-71, wherein the inorganic structure directing agent is potassium hydroxide.

Embodiment 73: The method of any one of embodiments 63-72, wherein the amount of TMAdaOH and the amount of potassium cations present in the synthesis gel is such that a molar ratio of potassium cations to TMAdaOH is about 10 or greater.

Embodiment 74: The method of any one of embodiments 63-73, wherein the molar ratio of potassium cations to TMAdaOH is from about 15 to about 50.

Embodiment 75: The method of any one of embodiments 63-74, wherein the amount of TMAdaOH and the amount of silicon source present in the synthesis gel is such that a molar ratio of TMAdaOH to silicon atoms is less than about 0.05.

Embodiment 76: The method of any one of embodiments 63-75, wherein the molar ratio of TMAdaOH to silicon atoms is from about 0.05 to about 0.01.

Embodiment 77: The method of any one of embodiments 63-76, wherein the source of aluminum is a zeolite, aluminum isopropoxide, or aluminum hydroxide.

Embodiment 78: The method of any one of embodiments 63-77, wherein the source of aluminum is aluminum hydroxide.

Embodiment 79: The method of any one of embodiments 63-78, wherein the source of silicon is colloidal silica, a silicon alkoxide, fumed silica, amorphous silica, or an aluminosilicate.

Embodiment 80: The method of any one of embodiments 63-79, wherein the source of silicon is colloidal silica.

Embodiment 81: The method of any one of embodiments 63-80, wherein a silica-to-alumina ratio (SAR) of the synthesis gel is selected to provide a zeolite material having an SAR of from about 2 to about 60.

Embodiment 82: The method of any one of embodiments 63-81, wherein a silica-to-alumina ratio (SAR) of the synthesis gel is selected to provide a zeolite material having an SAR of from about 10 to about 30.

Embodiment 83: A zeolite material having a CHA crystalline framework and a predominantly flake-like morphology as determined by scanning electron microscopy/Energy Dispersive X-Ray Spectroscopy (SEM/EDS), prepared by the method of any one of embodiments 63 to 84.

Embodiment 84: A selective catalytic reduction (SCR) catalyst effective for the abatement of nitrogen oxides ($NO_x$) in an exhaust gas stream, the SCR catalyst comprising the zeolite material according to any one of embodiments 52 to 62 or embodiment 83, promoted with a promoter metal.

Embodiment 85: The SCR catalyst of embodiment 84, wherein the promoter metal is present in an amount of from about 1.0 wt % to about 10 wt %, based on the total weight of the SCR catalyst, and calculated as the promoter metal oxide.

Embodiment 86: The SCR catalyst of embodiment 84 or 85, wherein the promoter metal is present in an amount of about 4 to about 6 wt %.

Embodiment 87: The SCR catalyst of any one of embodiments 84 to 86, wherein the promoter metal is a transition metal.

Embodiment 88: The SCR catalyst of any one of embodiments 84 to 87, wherein the promoter metal is selected from iron, copper, manganese, and combinations thereof.

Embodiment 89: The SCR catalyst of any one of embodiments 84 to 88, wherein the promoter metal is selected from iron, copper, and combinations thereof.

These and other features, aspects, and advantages of the disclosure will be apparent from the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIG. 21a is a graph of the number of TMAda$^+$ per CHA cage, measured by TGA, and amount of Na$^+$ retained per CHA cage, measured by AAS, as a function of the Na$^+$/TMAda$^+$ ratio in the synthesis media;

FIG. 21b is a graph of the number of TMAda$^+$ per CHA cage, measured by TGA, and amount of K$^+$ retained per CHA cage, measured by AAS, as a function of the K$^+$/TMAda$^+$ ratio in the synthesis media; and FIG. 21c is a graph of the number of TMAda$^+$ per CHA cage as a function of the amount of K$^+$ or Na$^+$ retained on the crystalline CHA product;

FIG. 25a is an X-ray diffraction patterns for a comparative example having a CHA framework structure;

FIG. 25b is an X-ray diffraction patterns for another comparative example having a CHA framework structure;

FIGS. 25c and 25d are X-ray diffraction patterns for embodiments of the disclosure.

DETAILED DESCRIPTION

Figure 1B:
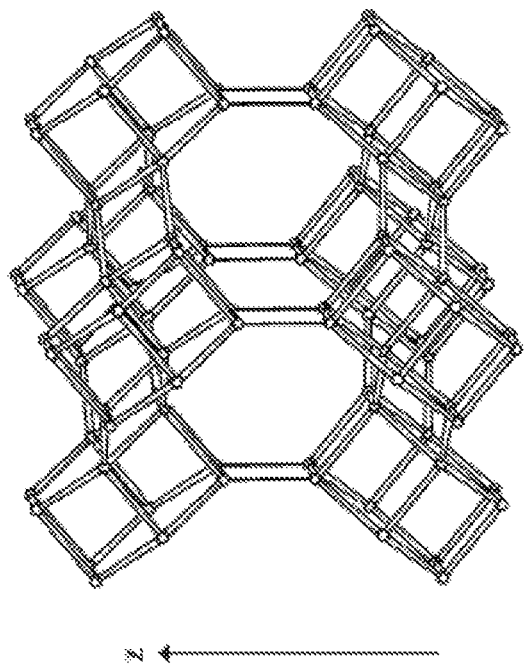
FIGS. 1a and 1b are depictions of the connection modes of CHA frameworks and AEI frameworks, respectively.

Before describing several exemplary embodiments of the invention, it is to be understood that the invention is not limited to the details of construction or process steps set forth in the following description. The invention is capable of other embodiments and of being practiced or being carried out in various ways. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

With respect to the terms used in this disclosure, the following definitions are provided.

The articles "a" and "an" are used herein to refer to one or to more than one (i.e., to at least one) of the grammatical object of the article.

Any ranges cited herein are inclusive.

The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

"AMOx" refers to a selective ammonia oxidation catalyst, which is a catalyst containing one or more metals (typically Pt, although not limited thereto) and an SCR catalyst suitable to convert ammonia to nitrogen.

The terms "catalyst" or "catalyst material" or "catalyst composition" or "catalytic material" refer to materials that promote a reaction. To produce catalytic articles, a substrate as disclosed herein below is coated with a catalyst composition. The coatings are "catalytic coating compositions" or "catalytic coatings." The terms "catalyst composition" and "catalytic coating composition" are synonymous.

"CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, A CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. A CSF, when positioned behind a LNT catalyst, can have a $H_2S$ oxidation functionality to suppress $H_2S$ emission during the LNT desulfation process.

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; zeolites for HC storage; and optionally promoters and/or stabilizers.

"GDI" refers to a gasoline direct injection gasoline engine, which operates under lean burn conditions.

"LNT" refers to a lean $NO_x$ trap, which is a catalyst containing a platinum group metal, ceria, and an alkaline earth trap material suitable to adsorb $NO_x$ during lean conditions (for example, BaO or MgO). Under rich conditions, $NO_x$ is released and reduced to nitrogen.

"Molecular sieves" are framework materials that may be used, e.g., in particulate form, in combination with one or more promoter metals, as catalysts. Molecular sieves are materials based on an extensive three-dimensional network of oxygen ions containing generally tetrahedral type sites and having a substantially uniform pore distribution, with the average pore size being no larger than 20 Angstroms (Å). The pore sizes are defined by the ring size.

The term "$NO_x$" refers to nitrogen oxide compounds, such as NO or $NO_2$.

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

As used herein, the term "selective catalytic reduction" (SCR) refers to the catalytic process of reducing oxides of nitrogen to dinitrogen ($N_2$) using a nitrogenous reductant. As used herein, the terms "nitrogen oxides" or "$NO_x$" designate the oxides of nitrogen.

"SCRoF" refers to an SCR catalyst composition coated directly onto a wall-flow filter.

As used herein, the term "structure-directing agent" is a compound that is present during crystallization of the zeolite and helps guide the formation of the desired crystal structure (e.g., CHA).

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. A washcoat is formed by preparing a slurry containing a specified solids content (e.g., 30-90% by weight) of catalyst in a liquid, which is then coated onto a substrate and dried to provide a washcoat layer.

Reference to "monolithic substrate" means a unitary structure that is homogeneous and continuous from inlet to outlet.

"Washcoat" has its usual meaning in the art of a thin, adherent coating of a material (e.g., a catalyst) applied to a "substrate", such as a honeycomb flow-through monolith substrate or a filter substrate which is sufficiently porous to permit the passage therethrough of the gas stream being treated. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions.

Zeolites are a type of "molecular sieve," which are framework materials that may be used, e.g., in particulate form, in combination with one or more promoter metals, as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size.

As used herein, the term "zeolite" refers to a specific example of a molecular sieve, including silicon and aluminum atoms. Zeolites are crystalline materials having rather uniform pore sizes which, depending upon the type of zeolite and the type and amount of cations included in the zeolite lattice, range from about 3 to 10 Angstroms in diameter.

Zeolites are understood to be aluminosilicates with open 3-dimensional framework structures composed of corner-sharing $TO_4$ tetrahedra, where T is Al or Si. Cations that balance the charge of the anionic framework are loosely associated with the framework oxygens, and the remaining pore volume is filled with water molecules. The non-framework cations are generally exchangeable, and the water molecules removable.

In specific embodiments, reference may be made to an "aluminosilicate zeolite" framework type, which limits the material to zeolites that do not include phosphorus or other metals substituted in the framework, while the broader term "zeolite" is intended to include aluminosilicates and aluminophosphates. In some embodiments, the zeolite is an aluminosilicate zeolite. The term "aluminophosphates" refers to another specific example of a zeolite, including aluminum and phosphate atoms. Aluminophosphates are crystalline materials having rather uniform pore sizes. In some embodiments, the zeolite is a silicoaluminophosphate. Silicoaluminophosphate zeolites comprise $SiO_4/AlO_4/PO_4$ tetrahedra, and are referred to as "SAPOs." Non-limiting examples of SAPOs include SAPO-34 and SAPO-44.

Zeolites generally comprise silica to alumina (SAR) molar ratios of 2 or greater. Zeolites for use in the disclosed catalyst compositions are not particularly limited in terms of SAR values, although the particular SAR value associated with a zeolite may, in some embodiments, affect the SCR performance of the catalyst composition into which it is incorporated (e.g., particularly after aging). In some embodiments, the SAR values of the zeolites are in the range of from about 5 to about 100, or from about 5 to about 50. In some embodiments, the SAR is from about 5 to about 25 and, in other embodiments, the SAR is from about 10 to about 15.

Zeolites can be classified by means of the framework topology by which the structures are identified. As referenced herein above, the present disclosure relates specifically to materials prepared from zeolites having the chabazite (CHA) framework. Zeolitic CHA-framework type molecular sieves include a zeolite group with approximate formula: $(Ca, Na_2, K_2, Mg)Al_2Si_4O_{12} \cdot 6H_2O$ (e.g., hydrated calcium aluminum silicate). Three synthetic forms of zeolitic CHA-framework type molecular sieves are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic CHA framework type, SSZ-13, is described in U.S. Pat. No. 4,544,538, which is hereby incorporated by reference. In particular embodiments, CHA framework zeolites are selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. CHA frameworks have a "double 6-ring" (d6r) secondary building unit. A d6r secondary building unit has twelve tetrahedral atoms, and is created by joining two "single s6r units" where the "6" denotes the positions of tetrahedral silicon and aluminum atoms, and the oxygen atoms are located between tetrahedral atoms).

Figure 1A:
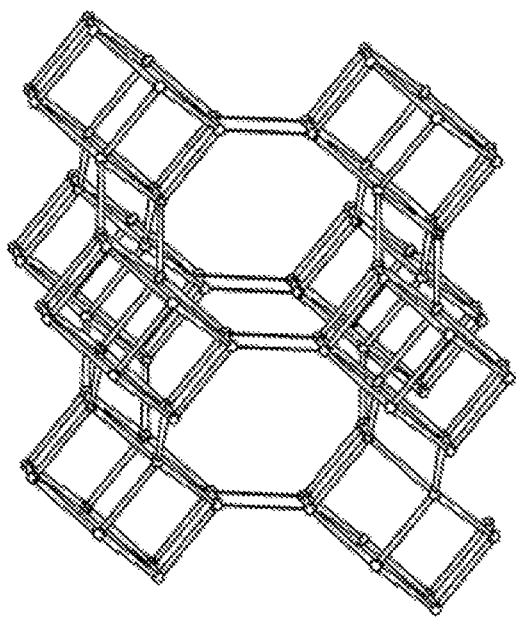

CHA framework zeolites, including chabazite, can also be described as "small pore zeolites". A small pore zeolite contains channels defined by up to eight tetrahedral atoms. The phrase "8-ring" zeolite refers to a zeolite having 8-ring pore openings and double-six ring (d6r) secondary building units and having a cage-like structure resulting from the connection of double six-ring building units by 4 rings. The framework structure type can be confirmed via scanning electron microscopy (SEM) or transmission electron microscopy (TEM). A given type of zeolite has a particular arrangement of such building units. For example, in the case of regular CHA framework zeolites, the periodic building unit is a double six ring (d6r) layer, as referenced above. These layers, referred to herein as "A" and "B", are topologically identical except that "B" is the mirror image of "A." When layers of the same type stack on top of one another, e.g., forming an AAAAAA stack or a BBBBBB stack, a zeolite with a CHA framework is generated. When layers "A" and "B" alternate, i.e., forming an ABABABAB stack, a zeolite with a different framework (AEI) is generated. This distinction between CHA and AEI frameworks can be understood by reference to FIGS. 1a and 1b. FIG. 1a depicts the connection mode of d6r units in a CHA framework, and FIG. 1b depicts the connection mode of d6r units in an AEI framework, viewed along the x axis. See Database of Zeolite Structures at http://america.iza-structure.org, which is incorporated herein by reference.

Zeolites of the present disclosure may contain intergrowths. An "intergrowth" of a zeolite may comprise at least two different zeolite framework types or two different zeolite compositions of the same framework type. Two different types of intergrowths relevant to zeolites, according to the classification proposed by Rao and Thomas, are epitaxial and polytypical intergrowths. See, e.g., Rao, C. N. R. and Thomas, J. M.: "Intergrowth Structures: The Chemistry of Solid-Solid Interfaces", Acc. Chem. Res. 1985, 13, 113-119. Epitaxy involves the oriented overgrowth of a zeolite crystal by a compositional or structurally different zeolite phase, whereas polytypism arises when individual sheets in a layered material are stacked in different sequences. In an "overgrowth" zeolite, one framework structure grows on top of the other one. Thus, "overgrowth" represents a species of "intergrowth", and "intergrowth" is the genus.

Examples of epitaxy reported in literature are the structural overgrowth of zeolite X on zeolite A (de Vos Burchart, et al., "Ordered overgrowth of zeolite X onto crystals of zeolite A", Zeolites 1989, 9, 423-435); zeolite P on zeolite A (Breck, Zeolite Molecular Sieves: Structure, Chemistry and Use, John Wiley & Sons, New York, 1974); or FAU/EMT overgrowth materials (Goossens et al., "Synthesis and Characterization of Epitaxial FAU-on-EMT Zeolite Overgrowth Materials", Eur. J. Inorg. Chem. 2001, 1167-1181). Examples of a compositional overgrowth can be found in the combination of ZSM-5 or ZSM-11 and silicalite-1 as disclosed in U.S. Pat. No. 4,148,713, and crystalline silicate particles having an inner portion comprising an intermediate pore size crystalline silicate such as ZSM-5 or ZSM-11 which is substantially free of aluminum and an aluminum-containing isostructural outer shell, as disclosed in U.S. Pat. No. 4,394,362.

Polytypism is a more common intergrowth phenomenon in zeolite crystallization. It can be pictured as a stacking of different structurally uniform domains in each individual crystal, without any mismatch of bonds. The two, or more, types of domains can be structurally related, for example when they represent a different periodicity. This most often occurs as an alternative stacking of a common sheet, such as in FAU/EMT (disclosed in, for example, Anderson et al., "Intergrowths of Cubic and Hexagonal Polytypes of Faujasitic Zeolites", J. Chem. Soc. Chem. Commun. 1991, 1660-1664; and Treacy et al., "Intergrowth Segregation in FAU-EMT Zeolite Materials", Proc. R. Soc. Lond. A-Math. Phys. Eng. Sci. 1996, 452, 813-840) or MFI/MEL (disclosed in, for example, Thomas et al., "Direct, Real-space Determination of Intergrowths in ZSM-5/ZSM-11 Catalysts", J. Chem. Soc. Chem. Commun. 1982, 1380-1383; and Millward et al., "Evidence for Semi-regularly Ordered Sequences of Mirror and Inversion Symmetry Planes in ZSM-5/ZSM11 Shape-selective Zeolitic Catalysts", J. Chem. Soc. Faraday Trans. 1983, 79, 1075-1082). Sometimes they have substantially different structures such as in MAZ/MOR (disclosed in, for example, Leonowicz et al., "Proposed synthetic zeolite ECR-1 structure gives a new zeolite framework topology", Nature 1987, 329, 819-821). The stacking pattern can then vary from a strict alternation to domain arrangements with no periodicity at all.

Specifically for the ABC-6 zeolite family of materials, polytypism as an intergrowth is well known. Materials belonging to the ABC-6 family are, for example chabazite, offretite, erionite, gmelinite, sodalite and levynite. The structure of zeolite materials in the ABC-6 family can be represented as a stacking of layers containing planar six-rings (6Rs), as described above. The 6Rs in one layer can be connected to the next layers of 6Rs in different ways. The three different locations of the 6Rs in a layer can be given as A, B or C. The 6Rs in the different layers can be connected parallel to each other (position A) or by a shift (position B and C), resulting in different frameworks belonging to the ABC-6 family. For example, offretite can be represented by three connecting layers with a stacking sequence of AAB, whereas the erionite contains 6 unique layers with a sequence of AABAAC. A stacking fault between one of these layers, where the stacking sequence is slightly altered at some places, easily occurs and results in intergrowths of different framework types. An example where the AAB stacking sequence of OFF zeolite is randomly replaced by AABAAC, or vice versa, is called an ERI/OFF intergrowth with the ERI and OFF framework type the end members of the ingrowth series. Zeolite T and ZSM-34 are the most common examples. Examples of materials that can make intergrowths with chabazite are zeolites with the GME and AEI framework type. Another example is CHA/AEI intergrowths, disclosed in, for example US Patent Application Publication No. 2012/0184429, which is incorporated by reference herein in its entirety. Another example is CHA/ERI intergrowths, disclosed in, for example EP Patent Application Publication No. 3323785, which is incorporated by reference herein in its entirety.

The presence of intergrowths and characterization of their frameworks can be confirmed via scanning electron microscopy (SEM) or transmission electron microscopy (TEM). Typically, CHA-based material, whereas, for example. For example, in an SEM of an intergrowth material in a CHA-based material (which typically exhibits a cubic habit) an increasing amount of another geometry (for example, prismatic structures as seen AEI-based materials) can indicate the presence of another character (in this example, a CHA/AEI intergrowth) and quantitation of the individual framework types may be obtained from the SEM or TEM image.

Unless otherwise indicated, all parts and percentages are by weight. "Weight percent (wt %)," if not otherwise indicated, is based on an entire composition free of any volatiles, that is, based on dry solids content.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

All U.S. patent applications, published patent applications, and patents referred to herein are hereby incorporated by reference.

Chabazite Synthesis Method

As a non-limiting example description, the zeolitic materials disclosed herein are prepared from a reaction mixture containing a source of an organic structure-directing agent (SDA), a source of an inorganic structure-directing agent, a source of silicon, a source of aluminum, and water.

Accordingly, in one aspect is provided a method of synthesizing a zeolite having the CHA crystalline framework, the method comprising preparing a mixture of water, an aluminum source, a silica source, a source of an organic structure directing agent, and an inorganic structure-directing agent to form a synthesis gel, wherein the inorganic structure-directing agent is a source of potassium cations; and subjecting the synthesis gel to a crystallization process to crystallize a chabazite zeolite.

In another aspect is provided a method of synthesizing a CHA zeolite having a predominantly flake-like morphology, the method comprising preparing a mixture of water, an aluminum source, a silicon source, an OSDA, and an inorganic structure-directing agent comprising potassium cations to form a synthesis gel; and subjecting the synthesis gel to a crystallization process to crystallize the CHA zeolite having a predominantly flake-like morphology.

Each component of the foregoing methods is described more fully herein below.

Organic Structure Directing Agent

To prepare a material comprising a CHA zeolite according to the disclosed methods, an organic structure directing agent (OSDA), also referred to as a "template" or "templating agent" is used. OSDAs are organic molecules which guide or direct the molecular shape and pattern of the framework of the zeolite, e.g., serving as a scaffold around which the zeolite crystals form. After the crystals are formed, the OSDA is removed from the interior structure of the crystals, leaving a molecularly porous aluminosilicate cage. Specifically, the methods provided herein generally involve the use of at least one OSDA conventionally understood to lead to CHA-type frameworks. The specific types of OSDA used can vary. In some embodiments, the OSDA is selected from cyclic amines and/or ammonium compounds. Examples include quaternary ammonium cations with substituents selected from the group consisting of alkyl, adamantyl, cyclohexyl, aromatic, and combinations thereof. As used herein, the term "quaternary ammonium cation" refers to an organic molecule containing a nitrogen atom which bears four substituents, and therefore has a positive (cationic) charge. The quaternary ammonium cations are balanced with anions, for example halide (e.g., $Cl^-$, $Br^-I^-$), hydrogen sulfate ($HSO_4^-$), or hydroxide ($OH^-$) ions, referred to herein as a "quaternary ammonium salt" or a "quaternary ammonium compound", which dissociate in solution to the free quaternary ammonium cations and respective anions. For example, in some embodiments, the CHA organic structure directing agent is selected from an N,N,N-trimethyl-1-adamantammonium, N,N,N-trimethyl-2-adamantammonium, N,N,N-trimethylcyclohexylammonium, tetraethylammonium, benzyltrimethylammonium, N,N-dimethyl-3,3-dimethylpiperidinium, N,N-methylethyl-3,3-dimethylpiperidinium, N,N-dimethyl-2-methylpiperidinium, 1,1,3,5-tetramethylpiperidinium, 1,3,3,6,6-pentamethyl-6-azonio-bicyclo(3.2.1)octane, or trimethyl-2-ammonium exonorbornane compound, or N,N-dimethylcyclohexylamine, choline hydroxide, N-methyl-3-quinuclidinol, a bi- or tricyclic nitrogen containing organic compound, or a combination of any of the preceding amines or ammonium compounds. In some embodiments, the CHA structure directing agent is selected from the group consisting of an N,N,N-trimethyl-1-adamantammonium compound, an N,N,N-trimethyl-2-adamantammonium compound, an N,N,N-trimethylcyclohexylammonium compound, an N,N-dimethyl-3,3-dimethylpiperidinium compound, an N,N-methylethyl-3,3-dimethylpiperidinium compound, an N,N-dimethyl-2-methylpiperidinium compound, a 1,3,3,6,6-pentamethyl-6-azonio-bicyclo(3.2.1)octane compound, N,N-dimethylcyclohexylamine, bi- and tricyclic nitrogen containing organic compounds, and combinations thereof.

Suitable SDAs are disclosed in, for example, *Zeolites and Related Microporous Materials*: State of the Art 1994, Studies of Surface Science and Catalysis, Vol. 84, p 29-36; *Novel Materials in Heterogeneous Catalysis* (ed. Baker and Murrell), Chapter 2, p 14-24, May 1990, J. Am. Chem. Soc., 2000, 122, p 263-273 and U.S. Pat. Nos. 4,544,538 and 6,709,644, which are incorporated herein by reference. In some embodiments, the quaternary ammonium cation is balanced with an anion selected from bromide, iodide and hydroxide. In certain embodiments, the OSDA is N,N,N-trimethyl-1-adamantylammonium hydroxide (TMAdaOH).

The quantity of the OSDA present in the synthesis gel may vary. In some embodiments, the quantity of OSDA present may be expressed by a molar ratio with respect to silicon. In some embodiments, the molar ratio of TMAdaOH to silicon is from about 0.01 to about 0.2, for example, from about 0.01, about 0.02, about 0.03, about 0.04, about 0.05, about 0.06, about 0.07, about 0.08, about 0.09, or about 0.1, to about 0.11, about 0.12, about 0.13, about 0.14, about 0.15, about 0.16, about 0.17, about 0.18, about 0.19, or about 0.2.

Inorganic Structure Directing Agent

The source of inorganic structure directing agent (SDA) can vary and, in some embodiments, may be an alkali metal cation such as sodium or potassium.

In certain embodiments, the inorganic structure directing agent (SDA) comprises potassium cations. In certain embodiments, the inorganic SDA is potassium cations.

In specific embodiments, the source of potassium cations ($K^+$) is potassium hydroxide, for example, an aqueous solution of potassium oxide ($K_2O$). The quantity of inorganic structure directing agent (e.g., potassium hydroxide) added can vary. Notably, hydroxide ions are the only necessary mineralizing agent needed in the reaction mixture, and the amount of hydroxide needed in the synthesis gel can be provided from the organic or inorganic structure directing agent. In some embodiments, the potassium hydroxide serves as the inorganic SDA and the hydroxide ion source, and is provided in a quantity so as to ensure that the synthesis gel has a pH within a particular range. For example, in some embodiments, the pH is advantageously basic, e.g., about 12 to about 13. If desired, hydroxide ion content can be supplemented with an additional hydroxide ion source, e.g., sodium hydroxide (NaOH), a quaternary ammonium hydroxide such as tetramethylammonium hydroxide, or a combination thereof.

Surprisingly, it was discovered according to the present disclosure that CHA zeolites were able to crystallize from synthesis media containing more than an order-of-magnitude higher inorganic-to-organic SDA ratio with $K^+$ ($K^+$/TMAda$^+$<50) than with $Na^+$ ($Na^+$/TMAda$^+$<2). In some embodiments, the ratio of potassium cations to TMAda in the synthesis gel is from about 1, or about 2, to about 5, about 10, about 15, about 20, or about 50. In some embodiments, the ratio is from about 2 to about 10.

In some embodiments, the potassium to TMAdaOH molar ratio of the synthesis gel is from about 10 to about 50, for example, from about 10, about 15, about 20, or about 25, to about 30, about 25, about 40, about 45, or about 50.

In particular embodiments, the OH/Si molar ratio of the synthesis gel is about 0.5, and the potassium to TMAdaOH molar ratio of the synthesis gel is from about 10 to about 50.

In some embodiments, the hydroxide to silica (OH/Si) molar ratio of the synthesis gel is from about 0.2 to about 0.5, for example, from about 0.2 or about 0.3, to about 0.4, or about 0.5.

In some embodiments, the potassium to silicon (K/Si) molar ratio of the synthesis gel is from about 0.2 to about 0.5, for example, from about 0.2 or about 0.3, to about 0.4, or about 0.5.

The methods outlined herein advantageously do not employ any halide-containing compounds (e.g., fluorides or compounds containing fluorine). Hydrofluoric acid (HF) has been employed in reaction mixtures for the provision of AEI-CHA intergrowths. In the present embodiments, the methods of the present disclosure do not employ halogens or halide-containing compounds, e.g., do not employ fluorine or fluoride-containing compounds.

Aluminum Source

The aluminum source may vary. In some embodiments, the aluminum source is zeolitic. In other embodiments, the aluminum source is non-zeolitic. As such, in some embodiments, the methods provided herein advantageously do not employ a zeolite for the production of the materials of the present disclosure (although the method is not limited thereto, and in some embodiments, a zeolite can be used as the alumina source).

In some embodiments, the aluminum source is non-crystalline. For example, in certain embodiments, the aluminum source may be a non-crystalline source selected from an aluminum salt (e.g., aluminum triisopropoxide or other alkoxides, aluminum hydroxides, aluminum nitrate, aluminum chloride, aluminum phosphate), aluminum metal, a non-crystalline aluminum oxide, or a non-crystalline aluminosilicate. In other embodiments, the source of aluminum is crystalline, such as a crystalline alumina or a zeolite. In certain embodiments, the aluminum source may be selected from aluminum triisopropoxide or other alkoxides, aluminum hydroxides, aluminum nitrate, aluminosilicate, aluminum chloride, aluminum phosphate, aluminum oxides, or aluminum metal. In some embodiments, the aluminum source is aluminum triisopropoxide or aluminum hydroxide. In some embodiments, the aluminum source is aluminum hydroxide.

Silicon Source

The silicon source may vary as well. In various embodiments, the silicon is provided by one or more of precipitated silica, colloidal silica, silica gels, silicon hydroxides, silicon alkoxides, amorphous silica, aluminosilicate, fumed silica, or silicates, such as alkali metal silicates. In some embodiments, the silicon source is colloidal silica.

In some embodiments, the amounts of the silicon and the aluminum present in the synthesis gel are chosen such that the calculated SAR of the starting composition ranges between about 1 and about 100, for example, from about 2 to 60. In some embodiments, the SAR of the starting composition ranges from about 10 to about 40. In some embodiments, the SAR of the starting composition ranges from about 20 to about 35. The skilled person knows that the SAR in the synthesis and the SAR in the final zeolite are not necessarily identical, and will also know how to choose SAR values in the synthesis in order to obtain a desired SAR in the final zeolite. In some embodiments, a target SAR for the CHA zeolite is from about 2 to about 60, from about 10 to about 30, or from about 15 to about 25.

In one embodiment, the amounts of the silica and the alumina present in the synthesis gel are chosen in a way that the calculated SAR of the starting composition ranges between about 10 and about 100, for example, between about 50 and about 80. The skilled person knows that the SAR in the synthesis and the SAR in the final zeolite are not necessarily identical, and will also know how to choose SAR values in the synthesis in order to obtain a desired SAR in the final zeolite. In some embodiments, a target ratio for the CHA zeolite is Si/Al=15.

In some embodiments, the ratio of the silicon source to the aluminum source to TMAda to the potassium cation source to the water may be represented by the formula $1SiO_2/0.033Al_2O_3/X\ TMAdaOH/0.5*(0.5-X)\ K_2O/44H_2O$, where the ratio of inorganic SDA ($K^+$) to organic SDA ($TMAda^+$) may be controlled by varying the value of X between about 0.01 and about 0.25. For example, X may be from about 0.01, about 0.02, about 0.03, about 0.04, about 0.05, about 0.06, about 0.07, about 0.08, or about 0.09, to about 0.1, about 0.15, about 0.2, or about 0.25.

Mixing

As described herein above, the method generally comprises forming a reaction mixture comprising water, an aluminum source, a silicon source, an organic structure-directing agent (OSDA), and an inorganic structure directing agent to form to form an aluminosilicate-containing solution, referred to herein as a "synthesis gel" or "gel"). and subjecting the synthesis gel to a crystallization process to crystallize the zeolite. Generally, the synthesis gel has a high solids content (e.g., about 15% or greater or about 20% or greater).

In some embodiments, the method of synthesizing a zeolite having the CHA crystalline framework comprises a first mixing step comprising adding the source of the organic structure-directing agent, the source of the inorganic structure-directing agent, and the source of aluminum to the water to form an aluminum-containing aqueous solution and mixing the aqueous solution for a first time period.

The mixing step can be performed for varying periods of time. The time period for mixing can be in the range of from 1 second to about 24 hours. For example, the time period can be from about 1 second to about 1 minute; or from about 1 minute, about 5 minutes, about 10 minutes, or about 15 minutes, to about 30 minutes, about 45 minutes, or about 1 hour; or from about 1 hour, about 2 hours, about 3 hours, about 4 hours, about 5 hours, or about 6 hours, to about 12 hours, or about 24 hours. In some embodiments, the time period is about 2 hours.

In some embodiments, the mixing can be performed in separate, discrete steps. Accordingly, in some embodiments, the method comprises a first mixing step comprising adding the OSDA, the SDA, and the source of aluminum to the water to form an aluminum-containing aqueous solution and mixing the aqueous solution for a first time period.

The first time period can be in the range of 1 second to about 24 hours. For example, the first time period can be in the range of from about 1 second to about 1 minute; or from about 1 minute, about 5 minutes, about 10 minutes, or about 15 minutes, to about 30 minutes, about 45 minutes, or about 1 hour; or from about 1 hour, about 2 hours, about 3 hours, about 4 hours, about 5 hours, or about 6 hours, to about 12 hours, or about 24 hours. In some embodiments, the first time period is about 15 minutes.

The first mixing step can be done at varying temperatures; in some embodiments, the mixing is done at room temperature. In some embodiments, the mixing is conducted at an elevated temperature (e.g., greater than room temperature, such as from about 25° C. to about 100° C.).

In some embodiments, the method comprises a second mixing step comprising adding the source of silicon to the aluminum-containing aqueous solution and mixing for a second time period to form the synthesis gel.

The second time period can be in the range of from 1 second to about 24 hours. For example, the second time period can be from about 1 second to about 1 minute; or from about 1 minute, about 5 minutes, about 10 minutes, or about 15 minutes, to about 30 minutes, about 45 minutes, or about 1 hour; or from about 1 hour, about 2 hours, about 3 hours, about 4 hours, about 5 hours, or about 6 hours, to about 12 hours, or about 24 hours. In some embodiments, the second time period is about 2 hours.

The second mixing step can be done at varying temperatures; in some embodiments, the mixing is done at room temperature. In some embodiments, the mixing is conducted at an elevated temperature (e.g., greater than room temperature, such as from about 25° C. to about 100° C.).

In some embodiments, the first and second time periods are each independently from about 1 second to about 24 hours. In some embodiments, the first time period is from about 5 minutes to about 1 hour. In some embodiments, the second time period is from about 5 minutes to about 1 hour.

In some embodiments, the first and second mixing steps are performed at a temperature of from about 20° C. to about 100° C. In some embodiments, the first and second mixing steps are performed at a temperature of from about 20° C. to about 50° C. In some embodiments, the first and second mixing steps are performed at a temperature of from about 20° C. to about 30° C.

Crystallization

In some embodiments, the synthesis gel is then subjected to a crystallization process to crystallize a chabazite zeolite having a controlled aluminum distribution. The crystallizing conditions are generally selected so as to promote the formation of a solid precipitate containing zeolite crystals. Typically, the crystallization process comprises mixing the synthesis gel at an elevated temperature for a period of time. Generally, the reaction mixture as described herein above is heated in a pressure vessel with stirring to yield the desired CHA crystalline product.

In some embodiments, the time period can be in the range of from about 24 hours to about 6 days. For example, the time period can be in the range of from about 24 hours, about 30 hours, or about 36 hours, to about 2 days, about 3 days, about 4 days, about 5 days, or about 6 days. In some embodiments, the third time period is about 3 days. In some embodiments, the time period is about 6 days. The crystallization process can be done at varying temperatures; in some embodiments, the crystallization process is in the range of from about 100° C. to about 200° C., for instance from about 140° C. to about 200° C., or from about 140° C. to about 180° C., with corresponding autogenous pressure. In some embodiments, the temperature is from about 140° C. to about 160° C.

After cooling the synthesis gel, the precipitate comprising the zeolite material is then filtered off, and optionally subjected to further processing. Optionally, the product may be centrifuged. Organic additives may be used to help with the handling and isolation of the solid product. The precipitate is filtered off and the remaining mother liquor is either discarded or can be recycled, e.g., as disclosed in U.S. Patent Application Publication No. 2015/118150 to Yang et al., which is incorporated herein by reference. Spray-drying is an optional step in the processing of the product.

In other embodiments, the synthesis gel is then subjected to a crystallization process to crystallize a CHA zeolite having a predominantly flake-like morphology. The crystallizing conditions are generally selected so as to promote the formation of a solid precipitate containing CHA zeolite crystals. Typically, the crystallization process comprises mixing the synthesis gel at an elevated temperature for a period of time. Generally, the reaction mixture as described herein above is heated in a pressure vessel with stirring to yield the desired CHA crystalline product. In some embodiments, the crystallization optionally further comprises adding zeolite seed crystal to the synthesis gel promote formation of the desired crystal structure. In some embodiments, the seed crystal has the CHA framework. In some embodiments, the seed crystal is a CHA zeolite which has been calcined, and is in the Na$^+$ form.

In some embodiments, the time period can be in the range of from about 12 hours to about 6 days. For example, the time period can be in the range of from about 12 hours, about 18 hours, about 24 hours, about 30 hours, or about 36 hours, to about 2 days, about 3 days, about 4 days, about 5 days, or about 6 days. In some embodiments, the third time period is about 3 days. In some embodiments, the time period is about 6 days. The crystallization process can be done at varying temperatures; in some embodiments, the crystallization process is in the range of from about 100° C. to about 200° C., for instance from about 140° C. to about 200° C., or from about 140° C. to about 180° C., with corresponding autogenous pressure. In some embodiments, the temperature is from about 140° C. to about 160° C.

After cooling the synthesis gel, the precipitate comprising the zeolite material is then filtered off, and optionally subjected to further processing. Optionally, the product may be centrifuged. Organic additives may be used to help with the handling and isolation of the solid product. The precipitate is filtered off and the remaining mother liquor is either discarded or can be recycled, e.g., as disclosed in U.S. Patent Application Publication No. 2015/118150 to Yang et al., which is incorporated herein by reference. Spray-drying is an optional step in the processing of the product.

Further Processing

The solid CHA zeolite product may be thermally treated or calcined in air or nitrogen. Typical calcination temperatures are from about 400° C. to about 850° C. (e.g., about 500° C. to about 700° C.) over a period of 1 to 10 hours. Following initial calcination, the CHA zeolite product is primarily in the alkali metal form (e.g., K$^+$ form).

The zeolite obtained after calcination may be ion-exchanged in order to reduce the amount of alkali or to exchange with, e.g., ammonium ions. In some embodiments, single or multiple ammonia ion exchanges can be used to yield the NH$_4^+$ form of the zeolite, which may optionally be further calcined to form the form. Ion-exchange methods are well known in the state of the art and may be applied without departing from the scope of the claims. Ion exchange may be achieved, for instance, by treatment with aqueous ammonium chloride solutions.

CHA Zeolite Properties

In some embodiments, the CHA zeolite crystals resulting from the crystallization may be from about 50 to about 100% crystalline. In some embodiments, the CHA zeolite crystals resulting from the crystallization may be from about 80% to about 99% crystalline, or from about 90% to about 97% crystalline. The CHA zeolite product resulting from the disclosed method typically has an average crystal size of from about 0.1 µm up to about 15 µm, for example 0.1 µm to about 2 µm, or from about 2 µm to about 5 µm, or from about 4 µm to about 8 µm, or from about 10 µm to about 15 µm. Average crystal sizes can be measured, for example, using microscopy, e.g., scanning electron microscopy (SEM).

The CHA zeolite products resulting from the disclosed method generally have unit cell volumes consistent with those reported in the literature (e.g., in the range of 2338 Å$^3$ as reported for silica-rich CHA (M.-J. Diaz-Cabañas et al., Chemical Communications, 1998, pp 1881-1882) to 2489 Å$^3$ as reported for aluminum-rich CHA (O. V. Yakubovich et al., Crystallography Reports, Vol. 50, No. 4, 2005, pp. 544-553)).

The CHA zeolite product can also be characterized by a silica-to-alumina molar ratio (SAR). In one embodiment, the silica to alumina molar ratio of the CHA zeolite ranges from 2 to 60. In certain embodiments, the CHA zeolite product has a SAR of about 10 to about 30. In certain embodiments, the CHA zeolite product has a SAR of from about 10 to about 15.

Depending on the amount of inorganic structure-directing agent added during crystallization of zeolite as described in this disclosure, non-aluminum inorganic cations can be present in extra-framework positions of the zeolite. For purposes of this disclosure, an extra-framework position is to be understood to mean a position that is not covalently bonded to four atoms in the crystalline zeolite lattice. Atoms, ions and complexes located in extra-framework positions of a zeolite typically refer to those found in the pore spaces of the solid, and not those incorporated into the lattice framework itself. These non-aluminum inorganic cations can include, but are not limited to sodium cations, calcium cations, potassium cations, magnesium cations, cobalt cations, copper cations, and lithium cations, and combinations thereof. In such a scenario, only a fraction of the aluminum atoms in the crystal lattice framework positions of the zeolite are in an isolated configuration and this fraction cannot exchange a divalent cation in an extra-framework position.

Thus, it is yet another objective of this disclosure to describe a different class of chabazite zeolite structures with controlled aluminum distribution, wherein by virtue of non-aluminum inorganic cations being present in extra-framework positions of the zeolite, only a fraction of the aluminum atoms in the crystal lattice framework positions of the zeolite framework are in an isolated configuration and this fraction cannot bind with a divalent cation in an extra-framework position. Surprisingly, according to the present disclosure, it has been found that CHA zeolites crystallized from mixtures of $K^+$ and $TMAda^+$ showed that $K^+$ cations displaced $TMAda^+$ from CHA cages, leading to the formation of predominantly isolated Al sites within the same composition range.

In some embodiments, CHA zeolites of the present disclosure have predominantly isolated Al sites, which may be defined by the formula Al—O(—Si—O)$_x$—Al, where x≥3. In some embodiments, CHA zeolites of the present disclosure, the fraction of the aluminum atoms in the crystal lattice framework positions of the CHA zeolite framework in an isolated configuration is in the range of from 0.90 to 1.00. In some embodiments, the fraction of the aluminum atoms in the crystal lattice framework positions of the CHA zeolite framework in an isolated configuration is in the range of from 0.95 to 1.00.

In other embodiments, CHA zeolites of the present disclosure have predominantly paired Al sites, which may be defined by the formula Al—O(—Si—O)$_x$—Al, where x=1 or 2.

Intergrowths

According to the present disclosure, it was surprisingly found that the organic and inorganic cations cooperated or competed for occupancy within void spaces of CHA zeolites, and in some embodiments, resulted in intergrowths (mixed domains) of crystalline phases. Accordingly, in some embodiments are provided zeolitic materials comprising intergrowths, and the synthesis method disclosed herein may be characterized as a method of preparing zeolites containing such intergrowths. Typically, the character of the zeolite materials comprising intergrowths as disclosed herein can be described as being primarily one type of framework. For example, in some embodiments, the disclosed zeolite materials comprising intergrowths have the CHA framework character and comprise a plurality of intergrown phases, each having the CHA framework and a different silica-to-alumina ratio.

The presence of intergrowths may be determined, e.g., via powder diffraction patterns. Specifically, experimental powder diffraction patterns for the intergrowths disclosed herein can be compared against simulated powder diffraction patterns, e.g., using DIFFax, which is a computer program based on a mathematical model for simulating powder diffraction patterns from crystals containing planar faults, selected by and available from the International Zeolite Association to simulate XRD powder patterns for intergrown phases of zeolites. See Treacy et al., Proceedings of the Royal Chemical Society 1991, 433:499-520, and Treacy and Higgins, Collection of Simulated XRD Powder Patterns for Zeolites, Fifth Edition Elsevier 2007, which are incorporated herein by reference in their entirety.

In some embodiments, as compared to the physical mixture of the two phases, peak broadening is observed in the XRD patterns. Such peak broadening may be observed as evidence of intergrowth (rather than mixtures) of two phases. The presence of intergrowths having the CHA framework can further, in some embodiments, be confirmed via scanning electron microscopy (SEM) or transmission electron microscopy (TEM).

In some embodiments, the CHA zeolite product resulting from the disclosed method is an intergrowth zeolite comprising a mixture of two distinct crystalline CHA phases, differing from each other in size and composition.

In some embodiments, the intergrowth zeolite comprises a first and a second CHA phase, wherein the first CHA phase and the second CHA phase each independently have a unit cell volume of from about 2338 Å$^3$ to 2489 Å$^3$; and the unit cell volume of the first CHA phase is different from the unit cell volume of the second CHA phase. In some embodiments, the unit cell volumes for first CHA phase and the second CHA phase are in the range from 2353 Å$^3$ to 2411 Å$^3$.

The ratios of these phases may vary. In some embodiments, the first CHA phase represents from about 5% to about 95% of the intergrowth zeolite. In one embodiment, the first CHA phase is about 20-30% of the intergrowth zeolite, and the second CHA second phase is about 70-80% of the intergrowth zeolite. In some embodiments, the first CHA phase represents from about 5% to about 95% of the intergrowth zeolite; the first CHA phase has a potassium cation to aluminum ratio greater than 0.5; and the second CHA phase has a potassium cation to aluminum ratio less than about 0.5. In some embodiments, the first CHA phase has a potassium cation to aluminum ratio of from about 0.5 to about 1.6, for example, from about 0.5, about 0.6, about 0.7, about 0.8, about 0.9, or about 1.0, to about 1.1, about 1.2, about 1.3, about 1.4, or about 1.5. In some embodiments, the second CHA phase has a potassium cation to aluminum ratio of from about 0.1 to about 0.5, for example, from about 0.1, about 0.15, about 0.2, about 0.25, or about 0.3, to about 0.35, about 0.4, about 0.45, or about 0.5, about 0.5.

In some embodiments, the intergrowth zeolite comprises a first and a second CHA phase, wherein the first and second CHA phase each independently have a silica-to-alumina ratio (SAR) of from about 4 to about 100, and wherein the SAR of the first CHA phase is different from the SAR of the second CHA phase.

In some embodiments, the first CHA phase comprises a higher SAR than the second CHA phase. In some embodiments, the SAR of the first CHA phase is from about 10 to about 40, and the SAR of the second CHA phase is from about 6 to about 8. In some embodiments, the SAR of the first CHA phase is from about 10 to about 20. In some embodiments, the SAR of the first CHA phase is from about 10 to about 15.

In some embodiments, the first CHA phase comprises primarily potassium ions and the second CHA phase comprises primarily the organic directing agent.

In some embodiments, the first CHA phase and the second CHA phase have different lattice parameters $a_0$, $c_0$, and unit cell volume, as determined from an X-ray powder diffraction pattern.

In some embodiments, the first CHA phase, the second CHA phase, or both, comprise a silicoaluminophosphate (SAPO) composition. In some embodiments, the SAPO composition is SAPO-34 or SAPO-44.

In some embodiments, the intergrowth zeolite crystal size is from about 0.1 to about 15 μm.

Flake-Like Morphology

In some embodiments, the CHA zeolite, prepared as disclosed herein, has a predominantly flake-like morphology. By "flake-like" is meant that the CHA zeolite crystal is much longer and wider than it is thick. This morphology may be distinguished from a plate-like morphology in that flake-like crystals are capable of, and are often observed in, a folded configuration, which is not the case for the plate-like morphology. See, e.g., U.S. Pat. No. 9,981,852 to Choi et al., incorporated by reference herein in its entirety, for disclosure of CHA zeolites having a plate-like morphology. The CHA zeolite product resulting from method disclosed herein typically has an average crystal length of from about 0.3 µm up to about 1.5 µm, for example, from about 0.3 to about 1 µm, or from about 0.3 to about 0.5 µm. The CHA zeolite product resulting from the disclosed method typically has an average crystal width of from about 0.3 µm up to about 1.5 µm, for example, from about 0.3 to about 1 µm, or from about 0.3 to about 0.5 µm. For example, the thickness of flake-like CHA zeolite crystals may be less than about 0.05 □m, such as from about 0.01 to about 0.03 □□m, or from about 0.02 to about 0.025 □m. Average crystal dimensions can be measured, for example, using microscopy, e.g., scanning electron microscopy (SEM), alone or with Energy Dispersive X-ray Spectroscopy (EDS. In some embodiments, the aspect ratio (the ratio of the longest dimension to the thickness) is greater than about 10, such as greater than about 20, or greater than about 30. In some embodiments, the aspect ratio is from about 20 to about 40. In some embodiments, the aspect ratio is about 10, about 15, about 20, about 25, about 30, about 35, or about 40.

By "predominantly flake-like" is meant that greater than about 40% of the crystals present in a sample of the CHA zeolite, prepared as disclosed herein, have a flake-like morphology on the basis of average measurements obtained from e.g., SEM/EDS. For example, in some embodiments, at least about 50%, at least about 60%, at least about 70%, at least about 80%, at least about 90%, at least about 95%, or at least about 99% of the crystals have a flake-like morphology.

The CHA zeolite product having the flake-like morphology can also be characterized by a silica-to-alumina molar ratio (SAR). In one embodiment, the SAR molar ratio of the CHA zeolite ranges from 2 to 60. In certain embodiments, the CHA zeolite product has a SAR of about 10 to about 30. In certain embodiments, the CHA zeolite product has a SAR of from about 15 to about 25.

The CHA zeolite product having the flake-like morphology can also be characterized by a silica-to-potassium (Si/K) molar ratio. In one embodiment, the Si/K molar ratio of the CHA zeolite is less than about 20. In certain embodiments, the CHA zeolite product has a Si/K molar ratio of from about 20 to about 10, for example, from about 20, about 19, about 18, about 17, about 16, or about 15, to about 14, about 13, about 12, about 11, or about 10. In certain embodiments, the CHA zeolite product has a Si/K molar ratio of from about 12 to about 17.

Promoted CHA Zeolites

In some embodiments, the CHA zeolite as disclosed herein is further treated with a promoter metal to form a metal-promoted zeolite catalyst (e.g., ion-exchanged). As used herein, the term "promoted" refers to a metal component ("promoter metal") that is intentionally added to the molecular sieve material, as opposed to impurities inherent in the molecular sieve. Thus, a promoter is intentionally added to enhance activity of a catalyst compared to a catalyst that does not have promoter intentionally added. The promoter metal actively participates in the promotion of a chemical reaction, e.g., copper participates in the conversion of nitrogen oxides, and is therefore often referred to as the active metal. In order to promote the selective catalytic reduction of nitrogen oxides in the presence of ammonia, in one or more embodiments, a suitable metal(s) is independently exchanged into the disclosed CHA zeolite.

In some embodiments, the disclosed zeolite is promoted with a promoter metal selected from the group consisting of alkali metals, alkaline earth metals, transition metals in Groups IIIB, IVB, VB, VIB, VIIB, VIIIB, IB, and IIB, Group IIIA elements, Group IVA elements, lanthanides, actinides, and combinations thereof. In some embodiments, further promoter metals that can be used to prepare a promoted zeolite of the disclosed catalyst compositions include, but are not limited to, copper (Cu), cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations thereof. In some embodiments, the promoter metal is copper, manganese, iron, or a combination thereof. In some embodiments, the promoter metal is copper, iron, or a combination thereof. For example, copper and/or iron can be ion-exchanged to form Cu-Chabazite, Fe-Chabazite, or Cu/Fe-Chabazite. When copper acetate is used, the copper concentration of the liquid copper solution used in the copper ion-exchange is, in specific embodiments, in the range from about 0.01 to about 0.4 molar, more specifically in the range from about 0.05 to about 0.3 molar.

A promoter metal can be exchanged into the zeolite by a liquid phase exchange process, where the soluble metal ions exchange with the proton or ammonium or sodium ions located within the pores of the zeolite. The exchange can also be carried out by a solid-state process, where promoter metal oxide or metal salt solid particles are mixed with a zeolite powder and processed under certain temperature and gas environments that may or may not contain steam. The exchange process can also be accomplished via an in-situ process during slurry preparation, where fine metal oxide particles are suspended in a zeolite slurry under conditions suitable for solid-liquid interaction. In some embodiments, prior to the exchange of a promoter metal into the CHA zeolite disclosed herein, the zeolites must be $NH_4^+$ exchanged and calcined, as known in the art to obtain the form of the respective material.

For additional promotion of SCR of oxides of nitrogen, in some embodiments, the zeolite can be promoted with two or more metals (e.g., copper in combination with one or more other metals). Where two or more metals are to be included in a promoted zeolitic material, multiple metal precursors (e.g., copper and iron precursors) can be ion-exchanged at the same time or separately. In certain embodiments, the second metal can be exchanged into a zeolite material that has first been promoted with the first metal (e.g., a second metal can be exchanged into a copper-promoted zeolite material).

The promoter metal content, calculated as the oxide, in one or more embodiments, independently ranges from about 0.01 wt % to about 15 wt %, from about 0.5 wt % to about 12 wt %, or from about 1.0 wt % to about 10 wt %, based on the total weight of the corresponding calcined zeolite (including the promoter metal) and reported on a volatile-free basis. In some embodiments, promoter metal content, calculated as the oxide is at least about 0.1 wt %, based on the total weight of the calcined zeolite (including promoter) and reported on a volatile-free basis. In specific embodiments, the promoter metal of the zeolite comprises Cu, and the Cu content, calculated as CuO is in the range of about 0.1 wt % to about 20 wt %, including about 0.5 wt % to about 17 wt %, about 2 wt % to about 15 wt %, or about 2 wt % to about 10 wt %, in each case based on the total weight of the calcined zeolite reported on a volatile free basis.

In some embodiments, the zeolite (including promoter metal) can be defined by the ratio of promoter metal to aluminum within the promoted zeolite. For example, in some embodiments, the promoter metal to aluminum weight ratio is in the range of from about 0.002 to about 0.5. In specific embodiments, the promoter metal of the zeolite comprises Cu the copper to aluminum atomic ratio of the zeolites is from about 0.1 to about 0.5 (e.g., the Cu/Al ratio is about 0.1 to about 0.5).

SCR Catalyst Compositions

The present disclosure provides a selective catalytic reduction (SCR) catalyst composition effective to catalyze the reduction of $NO_x$ from an engine exhaust gas, such as from a lean burn engine, in the presence of a reductant, the catalyst composition comprising a promoted CHA zeolite as disclosed herein.

Without wishing to be bound by theory, CHA crystals having a predominantly flake-like morphology may exhibit different behavior during coating, which might prove advantageous in terms of SCR performance. In addition to different coating and packing behavior, the flake-like morphology may allow for more efficient mass transfer of reactants and products across the CHA crystals, thus reducing the possibility of mass transport limitations in the coated catalysts. Accordingly, the present disclosure provides a selective catalytic reduction (SCR) catalyst composition effective to catalyze the reduction of $NO_x$ from an engine exhaust gas, such as from a lean burn engine, in the presence of a reductant, the catalyst composition comprising the promoted CHA zeolite as disclosed herein.

In some embodiments, the SCR catalyst composition may further comprise a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher and high water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica. Other exemplary binders include boehemite, gamma-alumina, or delta/theta alumina, as well as silica sol. When present, the binder is typically used in an amount of about 1-5 wt % of the total washcoat loading. Alternatively, the binder can be zirconia-based or silica-based, for example zirconium acetate, zirconia sol or silica sol. When present, the alumina binder is typically used in an amount of about 0.05 g/in$^3$ to about 1 g/in$^3$.

$NO_x$ Absorber Composition

A CHA zeolite of the present disclosure may have utility in certain $NO_x$ adsorber composition, such as, for example, a Low-Temperature $NO_x$ Adsorber (LT-NA). One relatively new LT-NA which is useful for low-temperature trapping of $NO_x$ utilizes a palladium-exchanged zeolite to trap NO without catalytic pre-oxidation to $NO_2$, such as that described in U.S. Patent Application Publication No. 2017/0096922, which is incorporated herein by reference. Accordingly, in another aspect is provided a LT-NA catalyst composition effective for the abatement of nitrogen oxides ($NO_x$) in an exhaust gas stream, the LT-NA catalyst comprising the CHA zeolite material as disclosed herein, promoted with a platinum group metal.

As used herein, "platinum group metal component" or "PGM component" refers to platinum group metals or oxides thereof, including platinum (Pt), palladium (Pd), ruthenium (Ru), rhodium (Rh), osmium (Os), iridium (Ir), and mixtures thereof. In some embodiments, the PGM component comprises palladium, platinum, rhodium, rhenium, ruthenium, iridium, or a combination thereof. In some embodiments, the PGM component comprises palladium, platinum, or a mixture thereof. In other embodiments, the platinum group metal component comprises two platinum group metals, e.g., in a weight ratio of about 1:10 to about 10:1. For example, in some embodiments, the platinum group metal component comprises platinum and palladium. In some embodiments, the $NO_x$ absorber composition expressly excludes platinum.

The concentration of platinum group metal component can vary, but will typically be from about 0.01 wt % to about 10 wt % relative to the total weight of the impregnated zeolite. In some embodiments, the $NO_x$ adsorber composition is substantially free of platinum. As used herein, the term "substantially free of platinum" means that there is no additional platinum intentionally added to the $NO_x$ absorber composition, and that there is less than about 0.01 wt % of platinum metal by weight present in the $NO_x$ absorber composition.

Other Catalyst Compositions and Methods

Zeolites of the present disclosure may have utility in catalyzing a number of other chemical reactions, such as olefin formation, including the conversion of alcohols to olefins, hydrocarbon cracking, formation of methylamine, and the partial oxidation of methane to methanol.

Accordingly, in another aspect is provided a catalyst composition effective for one or more transformations selected from olefin formation, hydrocarbon cracking, elimination of an alcohol to form an olefin, formation of methylamine from methanol and ammonia, and the partial oxidation of methane to methanol, the catalyst composition comprising an intergrowth zeolite having the CHA framework structure as disclosed herein.

Zeolites having the CHA framework have been reported as methanol-to-olefin catalysts (see, e.g., Deimund, et al., ACS Catalysis 2016, 6, 542-550; Corma et al., Chemistry—A European Journal 2018; and Nishitoba et al., Industrial & Engineering Chemistry Research 2018, 57, 3914-3922, the disclosure of each of which is incorporated by reference herein). Zeolites having the CHA framework have been reported as partial methane oxidation (PMO) to methanol (see, e.g., Snyder et al., Chemical Reviews 2018, 118, 2718-2768; Li et al., ACS Catalysis 2018, 8, 10119-10130; and Newton et al., Journal of the American Chemical Society 2018, 140, 10090-10093, the disclosure of each of which is incorporated by reference herein).

In one embodiment the intergrowth zeolite is in the form. In other embodiments the intergrowth zeolite is promoted with one or more metals, such as a transition metal.

In one embodiment is provided a catalyst composition effective for the partial oxidation of methane to methanol, the catalyst comprising an intergrowth zeolite having the CHA framework structure as disclosed herein, promoted with copper, iron, or a combination thereof.

In another aspect is provided a method for treating a gaseous stream comprising one or more of an alcohol, a hydrocarbon, ammonia, or a combination thereof, the method comprising contacting the gaseous stream with an intergrowth zeolite having the CHA framework structure as disclosed herein, for a time and at a temperature effective to catalyze one or more reactions selected from oxidization, reduction, elimination, and carbon-carbon bond breakage.

Catalytic Articles

In another aspect is provided an SCR article effective to catalyze the reduction of $NO_x$ from an engine exhaust gas, such as from a lean burn engine, in the presence of a reductant, the SCR article comprising a substrate having an inlet end and an outlet end defining an overall length, and the SCR catalyst composition as disclosed herein disposed on at least a portion thereof.

Substrate

In one or more embodiments, the present catalyst compositions (e.g., an SCR or LT-NA composition) are disposed on a substrate to form a catalytic article. Catalytic articles comprising the substrates are generally employed as part of an exhaust gas treatment system (e.g., catalyst articles including, but not limited to, articles including the SCR or LT-NA compositions disclosed herein). Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed composition(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punch-outs" in the channel walls. The metallic substrates may be employed in various shapes such as pellets, compressed metallic fibers, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt % (weight percent) of the alloy, for instance, about 10 to about 25 wt % chromium, about 1 to about 8 wt. % of aluminum, and from 0 to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith.

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety.

In some embodiments, the catalyst substrate comprises a honeycomb substrate in the form of a wall-flow filter or a flow-through substrate. In some embodiments, the substrate is a wall-flow filter. In some embodiments, the substrate is a flow-through substrate. Flow-through substrates and wall-flow filters will be further discussed herein below.

Flow-Through Substrates

In some embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on or in which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 $in^3$ to about 1200 $in^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes. The wall-flow filter substrate can be ceramic or metallic as described above.

Figure 2:
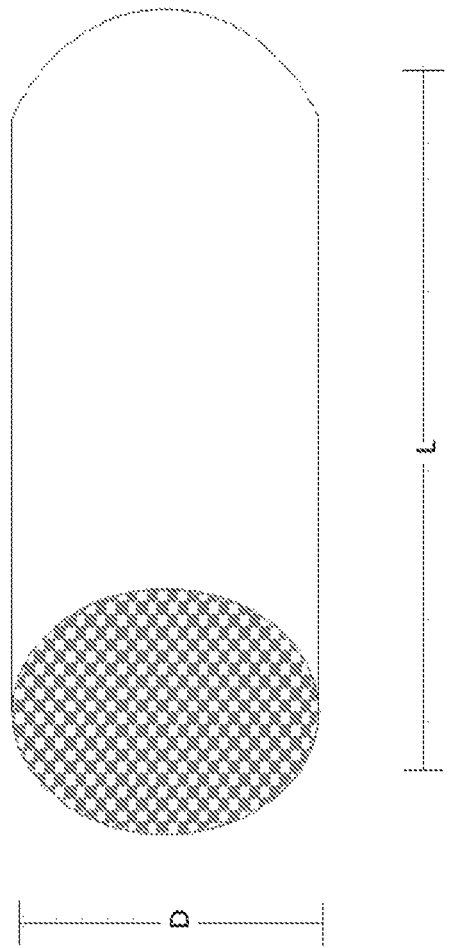
FIG. 2 is a perspective view of a honeycomb-type substrate which may comprise a catalyst (e.g., a selective catalytic reduction catalyst) washcoat composition in accordance with the present disclosure.
Figure 3A:
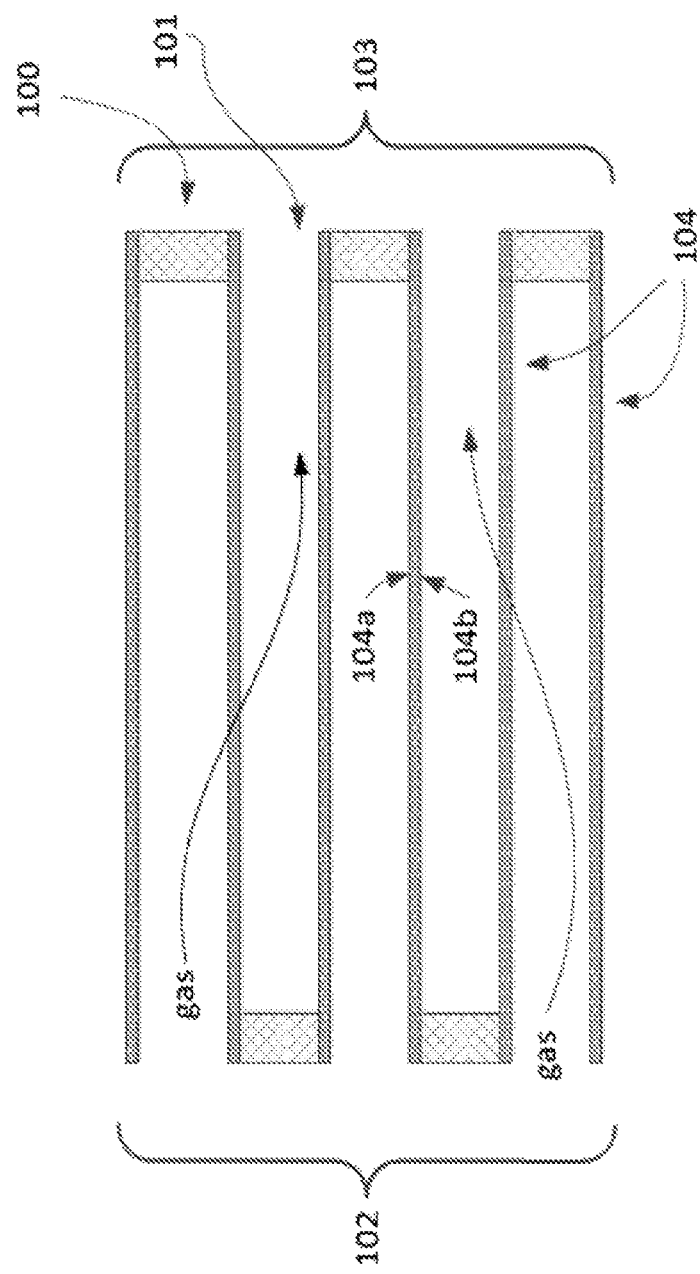
FIG. 3a is a cutaway view of a section enlarged relative to FIG. 2, wherein the honeycomb-type substrate in FIG. 2 represents a wall-flow filter.

Referring to FIG. 2, the exemplary wall-flow filter substrate has a cylindrical shape and a cylindrical outer surface having a diameter D and an axial length L. A cross-section view of a monolithic wall-flow filter substrate section is illustrated in FIG. 3a, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls.

The wall-flow filter article substrate may have a volume of, for instance, from about 50 cm$^3$, about 100 in$^3$, about 200 in$^3$, about 300 in$^3$, about 400 in$^3$, about 500 in$^3$, about 600 in$^3$, about 700 in$^3$, about 800 in$^3$, about 900 in$^3$ or about 1000 in$^3$ to about 1500 in$^3$, about 2000 in$^3$, about 2500 in$^3$, about 3000 in$^3$, about 3500 in$^3$, about 4000 in$^3$, about 4500 in$^3$ or about 5000 in$^3$. Wall-flow filter substrates typically have a wall thickness from about 50 microns to about 2000 microns, for example from about 50 microns to about 450 microns or from about 150 microns to about 400 microns.

The walls of the wall-flow filter are porous and generally have a wall porosity of at least about 40% or at least about 50% with an average pore diameter of at least about 10 microns prior to disposition of the functional coating. For instance, the wall-flow filter article substrate in some embodiments will have a porosity of ≥40%, ≥50%, ≥60%, ≥65% or ≥70%. For instance, the wall-flow filter article substrate will have a wall porosity of from about 50%, about 60%, about 65% or about 70% to about 75% and an average pore diameter of from about 10, or about 20, to about 30, or about 40 microns prior to disposition of a catalytic coating. The terms "wall porosity" and "substrate porosity" mean the same thing and are interchangeable. Porosity is the ratio of void volume (or pore volume) divided by the total volume of a substrate material. Pore size and pore size distribution are typically determined by Hg porosimetry measurement.

Substrate Coating Process

To produce catalytic articles of the present disclosure, a substrate as described herein is coated with a catalyst composition (e.g., an SCR or LT-NA catalyst composition) as disclosed herein. The coatings are "catalytic coating compositions" or "catalytic coatings." A "catalyst composition" and a "catalytic coating composition" are synonymous.

Generally, the catalyst composition is prepared and coated on a substrate as described herein. This method can comprise mixing the catalyst composition (or one or more components of the catalyst composition) as generally disclosed herein with a solvent (e.g., water) to form a slurry for purposes of coating a catalyst substrate. In addition to the catalyst composition, the slurry may optionally contain various additional components. Typical additional components include, but are not limited to, binders as described herein above, additives to control, e.g., pH and viscosity of the slurry. Additional components can include hydrocarbon (HC) storage components (e.g., zeolites), associative thickeners, and/or surfactants (including anionic, cationic, non-ionic or amphoteric surfactants). A typical pH range for the slurry is about 3 to about 6. Addition of acidic or basic species to the slurry can be carried out to adjust the pH accordingly. For example, in some embodiments, the pH of the slurry is adjusted by the addition of aqueous acetic acid.

The slurry can be milled to reduced particle size and to enhance mixing of the particles and formation of a homogenous material. The milling can be accomplished in a ball mill, continuous mill, or other similar equipment, and the solids content of the slurry may be, e.g., about 20-60 wt %, more particularly about 20-40 wt %. In one embodiment, the post-milling slurry is characterized by a $D_{90}$ particle size of about 1 to about 40 microns, preferably 2 to about 20 microns, more preferably about 4 to about 15 microns The present catalyst compositions may typically be applied in the form of one or more washcoats containing the catalyst composition as disclosed herein. A washcoat is formed by preparing a slurry containing a specified solids content (e.g., about 10 to about 60% by weight) of catalyst composition (or one or more components of the catalyst composition) in a liquid vehicle, which is then applied to a substrate using any washcoat technique known in the art and dried and calcined to provide a coating layer. If multiple coatings are applied, the substrate is dried and/or calcined after each washcoat is applied and/or after the number of desired multiple washcoats are applied. In one or more embodiments, the catalytic material(s) are applied to the substrate as a washcoat.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat layer (coating layer) can be repeated as needed to build the coating to the desired loading level or thickness, meaning more than one washcoat may be applied.

Coating Configurations

The present catalytic coating may comprise one or more coating layers, where at least one layer comprises the present catalyst composition or one or more components of the catalyst composition. The catalytic coating may comprise one or more thin, adherent coating layers disposed on and in adherence to least a portion of a substrate. The entire coating comprises the individual "coating layers".

In some embodiments, the present catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. The catalytic coating may be on the substrate wall surfaces and/or in the pores of the substrate walls, that is "in" and/or "on" the substrate walls. Thus, the phrase "a washcoat disposed on the substrate" means on any surface, for example on a wall surface and/or on a pore surface.

The washcoat(s) can be applied such that different coating layers may be in direct contact with the substrate. Alternatively, one or more "undercoats" may be present, so that at least a portion of a catalytic coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Alternatively, the present catalyst composition may be in a top coating layer over a bottom coating layer. The catalyst composition may be present in a top and a bottom layer. Any one layer may extend the entire axial length of the substrate, for instance a bottom layer may extend the entire axial length of the substrate and a top layer may also extend the entire axial length of the substrate over the bottom layer. Each of the top and bottom layers may extend from either the inlet or outlet end.

For example, both bottom and top coating layers may extend from the same substrate end where the top layer partially or completely overlays the bottom layer and where the bottom layer extends a partial or full length of the substrate and where the top layer extends a partial or full length of the substrate. Alternatively, a top layer may overlay a portion of a bottom layer. For example, a bottom layer may extend the entire length of the substrate and the top layer may extend about 10%, about 20%, about 30%, about 40%, about 50%, about 60%, about 70%, about 80% or about 90% of the substrate length, from either the inlet or outlet end.

Alternatively, a bottom layer may extend about 10%, about 15%, about 25%, about 30%, about 40%, about 45%, about 50%, about 55%, about 60%, about 65%, about 70%, about 75%, about 80%, about 85% or about 95% of the substrate length from either the inlet end or outlet end and a top layer may extend about 10%, about 15%, about 25%, about 30%, about 40%, about 45%, about 50%, about 55%, about 60%, about 65%, about 70%, about 75%, about 80%, about 85% or about 95% of the substrate length from either the inlet end of outlet end, wherein at least a portion of the top layer overlays the bottom layer. This "overlay" zone may for example extend from about 5% to about 80% of the substrate length, for example about 5%, about 10%, about 20%, about 30%, about 40%, about 50%, about 60% or about 70% of the substrate length.

The catalytic coating may advantageously be "zoned," comprising zoned catalytic layers, that is, where the catalytic coating contains varying compositions across the axial length of the substrate. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones.

For instance, an SCR catalytic article may comprise an upstream zone comprising the first washcoat layer; and a downstream zone comprising the second washcoat layer comprising a different catalyst material or component. Alternatively, an upstream zone may comprise the second washcoat layer and a downstream zone may comprise the first washcoat layer.

In some embodiments, the first washcoat is disposed on the catalyst substrate from the inlet end to a length of from about 10% to about 50% of the overall length; and the second washcoat is disposed on the catalyst substrate from the outlet end to a length of from about 50% to about 90% of the overall length. In some embodiments, the first washcoat is disposed on the catalyst substrate from the outlet end to a length of from about 10% to about 50% of the overall length; and wherein the second washcoat is disposed on the catalyst substrate from the inlet end to a length of from about 50% to about 90% of the overall length.

Figure 3B:
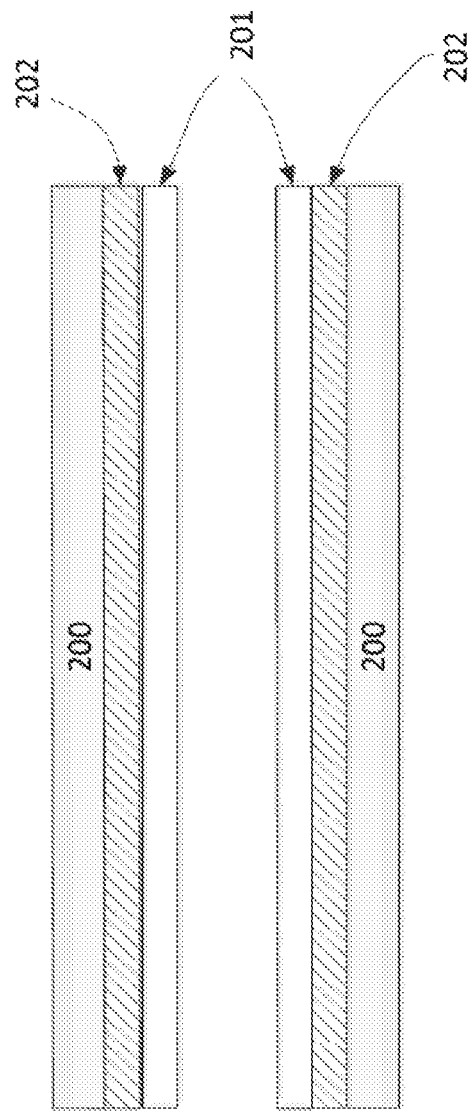
FIG. 3b is a cross-sectional view of an embodiment of a layered catalytic article of the present disclosure.
Figure 3C:
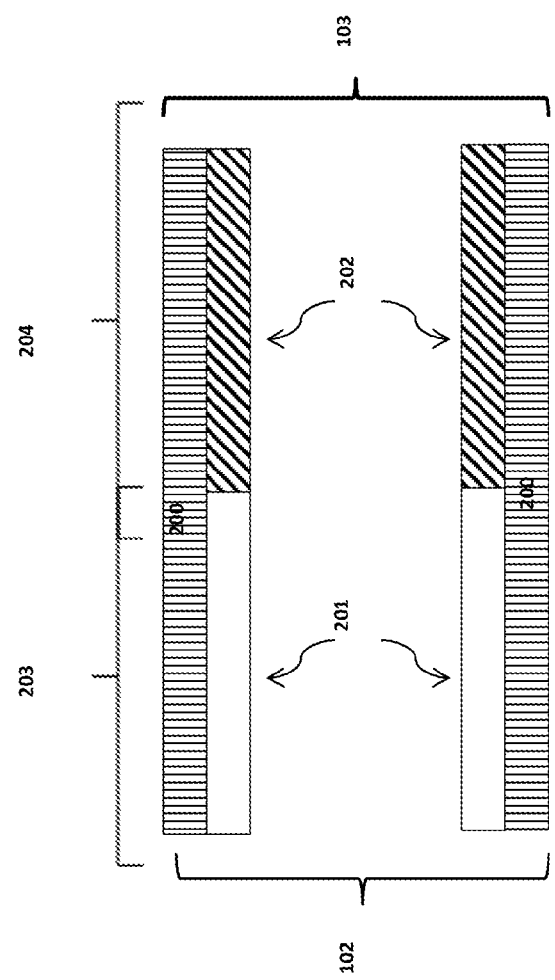
FIG. 3c is a cross-sectional view of an embodiment of a zoned catalytic article of the present disclosure.
Figure 3D:
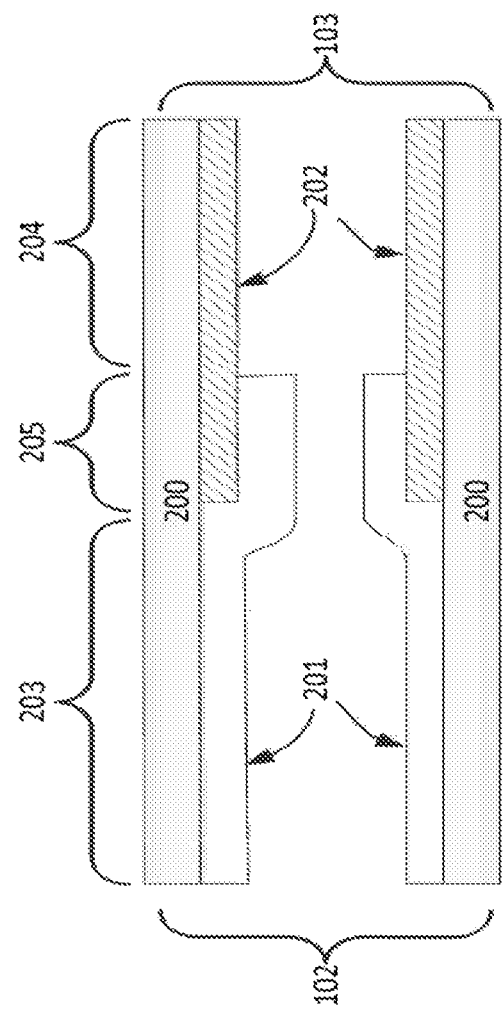
FIG. 3d is a cross-sectional view of an embodiment of a layered and zoned catalytic article of the present disclosure.

FIGS. 3b, 3c, and 3d show some possible coating layer configurations with two coating layers. Shown are substrate walls 200 onto which coating layers 201 (top coat) and 202 (bottom coat) are disposed. This is a simplified illustration, and in the case of a porous wall-flow substrate, not shown are pores and coatings in adherence to pore walls and not shown are plugged ends. In FIG. 3b, coating layers 201 and 202 each extend the entire length of the substrate with top layer 201 overlaying bottom layer 202. The substrate of FIG. 3b does not contain a zoned coating configuration. FIG. 3c is illustrative of a zoned configuration having a coating layer 202 which extends from the outlet about 50% of the substrate length to form a downstream zone 204, and a coating layer 201 which extends from the inlet about 50% of the substrate length, providing an upstream zone 203. In FIG. 3d, bottom coating layer 202 extends from the outlet about 50% of the substrate length and top coating layer 201 extends from the inlet greater than 50% of the length and overlays a portion of layer 202, providing an upstream zone 203, a middle overlay zone 205 and a downstream zone 204. FIGS. 3b, 3c, and 3d may be useful to illustrate catalyst composition coatings on a wall-through substrate or a flow-through substrate.

In some embodiments, the substrate is a honeycomb substrate. In some embodiments, the honeycomb substrate is a flow-through substrate or a wall-flow filter. In certain embodiments, the SCR catalyst composition as disclosed herein, when incorporated into an SCR catalytic article as disclosed herein, is effective to catalyze the reduction of $NO_x$ from an engine exhaust gas, such as exhaust from a lean burn engine, in the presence of a reductant. Present articles are effective to catalyze the reduction of $NO_x$ over a variety of temperatures. In some embodiments, the effective reduction of $NO_x$ is at a temperature that is above about 150° C. and below about 700° C. In some embodiments, the effective reduction of $NO_x$ is at a temperature of from about 200° C. to about 600° C.

Exhaust Gas Treatment Systems

In a further aspect is provided a system for treatment of an exhaust gas stream from an engine, the system comprising the SCR article as disclosed herein, positioned downstream from and in fluid communication with an engine that produces an exhaust gas stream, such as a lean burn engine. The engine can be, e.g., a diesel engine which operates at combustion conditions with air in excess of that required for stoichiometric combustion, i.e. lean conditions. In other embodiments, the engine can be a gasoline engine (e.g., a lean burn gasoline engine) or an engine associated with a stationary source (e.g., electricity generators or pumping stations). Exhaust gas treatment systems generally contain more than one catalytic article positioned downstream from the engine in fluid communication with the exhaust gas stream. A system may contain, for instance, a selective catalytic reduction catalyst (SCR) as disclosed herein, a diesel oxidation catalyst (DOC) and one or more articles containing a reductant injector, a soot filter, an ammonia oxidation catalyst (AMOx) or a lean $NO_x$ trap (LNT). An article containing a reductant injector is a reduction article. A reduction system includes a reductant injector and/or a pump and/or a reservoir, etc. The present treatment system may further comprise a soot filter and/or an ammonia oxidation catalyst. A soot filter may be uncatalyzed or may be catalyzed (CSF). For instance, the present treatment system may comprise, from upstream to downstream—an article containing a DOC, a CSF, an urea injector, a SCR article and an article containing an AMOx. A lean $NO_x$ trap (LNT) may also be included.

The relative placement of the various catalytic components present within the emission treatment system can vary. In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

Figure 4:
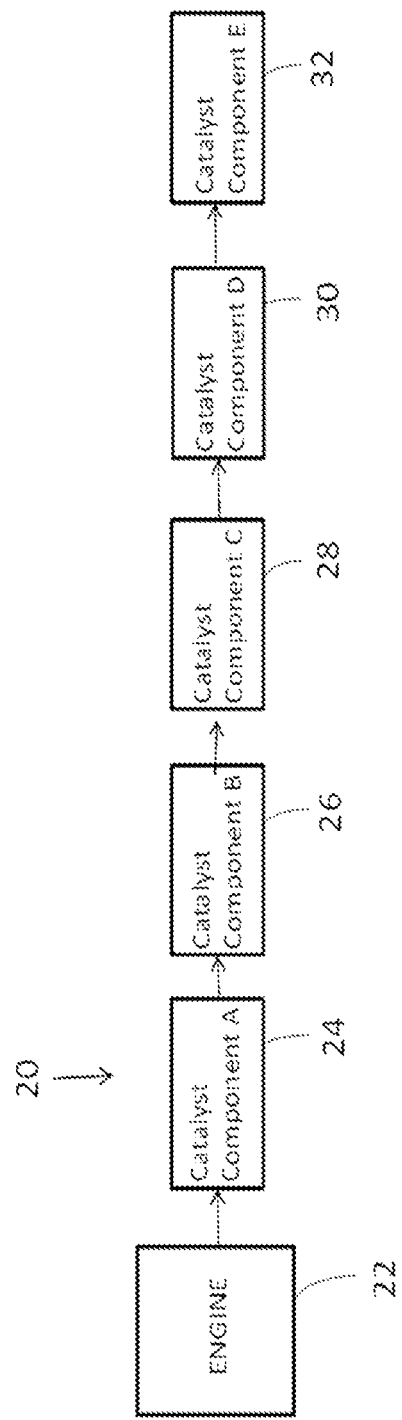
FIG. 4 is a schematic depiction of an embodiment of an emission treatment system in which a catalyst article of the present disclosure is utilized.
Figures 5A, 5B, 5C, 5D:
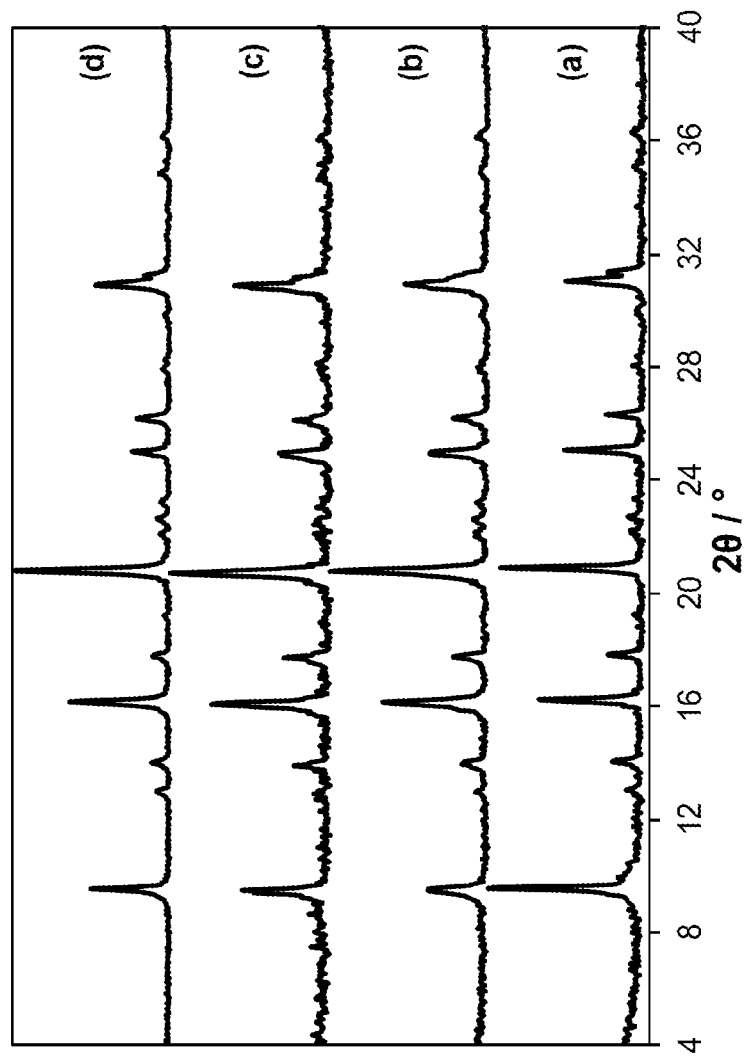
FIGS. 5a-d are X-Ray diffraction patterns of CHA zeolites synthesized using Al(O-i-Pr)$_3$ at Si/Al=15 and with various ratios of Na$^+$/TMAda$^+$.

One exemplary emission treatment system is illustrated in FIG. 4, which depicts a schematic representation of an emission treatment system 20. As shown, the emission treatment system can include a plurality of catalyst components in series downstream of an engine 22, such as a lean burn engine. At least one of the catalyst components will be the SCR catalyst of the invention as set forth herein. The catalyst composition of the invention could be combined with numerous additional catalyst materials and could be placed at various positions in comparison to the additional catalyst materials. FIG. 4 illustrates five catalyst components, 24, 26, 28, 30, 32 in series; however, the total number of catalyst components can vary and five components is merely one example.

Without limitation, Table 1 presents various exhaust gas treatment system configurations of one or more embodiments. It is noted that each catalyst is connected to the next catalyst via exhaust conduits such that the engine is upstream of catalyst A, which is upstream of catalyst B, which is upstream of catalyst C, which is upstream of catalyst D, which is upstream of catalyst E (when present). The reference to Components A-E in the table can be cross-referenced with the same designations in FIG. 4.

The LNT catalyst noted in Table 1 can be any catalyst conventionally used as a $NO_x$ trap, and typically comprises $NO_x$-adsorber compositions that include base metal oxides (BaO, MgO, $CeO_2$, and the like) and a platinum group metal for catalytic NO oxidation and reduction (e.g., Pt and Rh).

The LT-NA catalyst noted in Table 1 can be any catalyst that can adsorb $NO_x$ (e.g., NO or $NO_2$) at low temperatures (<250° C.) and release it to the gas stream at high temperatures (>250° C.). The released $NO_x$ is generally converted to $N_2$ and $H_2O$ over a downstream SCR or SCRoF catalyst. Typically, a LT-NA catalyst comprises Pd-promoted zeolites or Pd-promoted refractory metal oxides. In some embodiments, the LT-NA comprises a promoted CHA zeolite having the flake like morphology as described herein.

Reference to SCR in the table refers to an SCR catalyst, which may include the SCR catalyst composition of the invention. Reference to SCRoF (or SCR on filter) refers to a particulate or soot filter (e.g., a wall-flow filter), which can include the SCR catalyst composition of the invention. Where both SCR and SCRoF are present, one or both can include the SCR catalyst of the invention, or one of the catalysts could include a conventional SCR catalyst (e.g., SCR catalyst with conventional metal loading level).

Reference to AMOx in the table refers to an ammonia oxidation catalyst, which can be provided downstream of the catalyst of one more embodiments of the invention to remove any slipped ammonia from the exhaust gas treatment system. In specific embodiments, the AMOx catalyst may comprise a PGM component. In one or more embodiments, the AMOx catalyst may comprise a bottom coat with PGM and a top coat with SCR functionality.

As recognized by one skilled in the art, in the configurations listed in Table 1, any one or more of components A, B, C, D, or E can be disposed on a particulate filter, such as a wall flow filter, or on a flow-through honeycomb substrate. In one or more embodiments, an engine exhaust system comprises one or more catalyst compositions mounted in a position near the engine (in a close-coupled position, CC), with additional catalyst compositions in a position underneath the vehicle body (in an underfloor position, UF). In one or more embodiments, the exhaust gas treatment system may further comprise a urea injection component.

TABLE 1

Possible exhaust gas treatment system configurations

| Component A | Component B | Component C | Component D | Component E |
|---|---|---|---|---|
| DOC | SCR | OptionalAMOx | — | — |
| DOC | SCRoF | Optional AMOx | — | — |
| DOC | SCRoF | SCR | Optional AMOx | — |
| DOC | SCR | SCRoF | Optional AMOx | — |
| DOC | CSF | SCR | Optional AMOx | — |
| LNT | CSF | SCR | Optional AMOx | — |
| LNT | SCRoF | SCR | Optional AMOx | — |
| DOC | LT-NA | SCR | Optional AMOx | — |
| DOC | LT-NA | SCR | CSF | Optional AMOx |

Method of Treating Engine Exhaust

Another aspect of the present invention is directed to a method of treating the exhaust gas stream of an engine, such as from a lean burn engine, particularly a lean burn gasoline engine or a diesel engine. The method can include placing a catalyst article according to one or more embodiments of the disclosure downstream from an engine and flowing the engine exhaust gas stream over the catalyst. In one or more embodiments, the method further comprising placing additional catalyst components downstream from the engine as noted above. The present catalyst compositions, articles, systems, and methods are suitable for treatment of exhaust gas streams of internal combustion engines, for example gasoline, light-duty diesel and heavy duty diesel engines. The catalyst compositions are also suitable for treatment of emissions from stationary industrial processes, removal of noxious or toxic substances from indoor air or for catalysis in chemical reaction processes.

The present articles, systems and methods are suitable for treatment of exhaust gas streams from mobile emissions sources such as trucks and automobiles. The present articles, systems and methods are also suitable for treatment of exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. Any ranges cited herein are inclusive.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXPERIMENTAL

I. CHA Zeolites with Controlled Al Siting

Example 1. CHA Preparation Using $Na^+$ and $TMAda^+$ (Comparative)

Comparative CHA zeolites were synthesized using aluminum isopropoxide ($Al(O-i-Pr)_3$), colloidal silica (AS-40; 40 wt. % $SiO_2$), $Na^+$ as the inorganic structure directing agent (as NaOH), and trimethyl-1-adamantylammonium hydroxide ($TMAda^+$) as the organic structure directing agent (OSDA) according to the procedure disclosed in U.S. Patent Application Publication No. 2017/0107114, which is incorporated by reference herein in its entirety. After crystallization, each material was filtered, washed with deionized water and calcined in air at 540° C.

Figure 6:
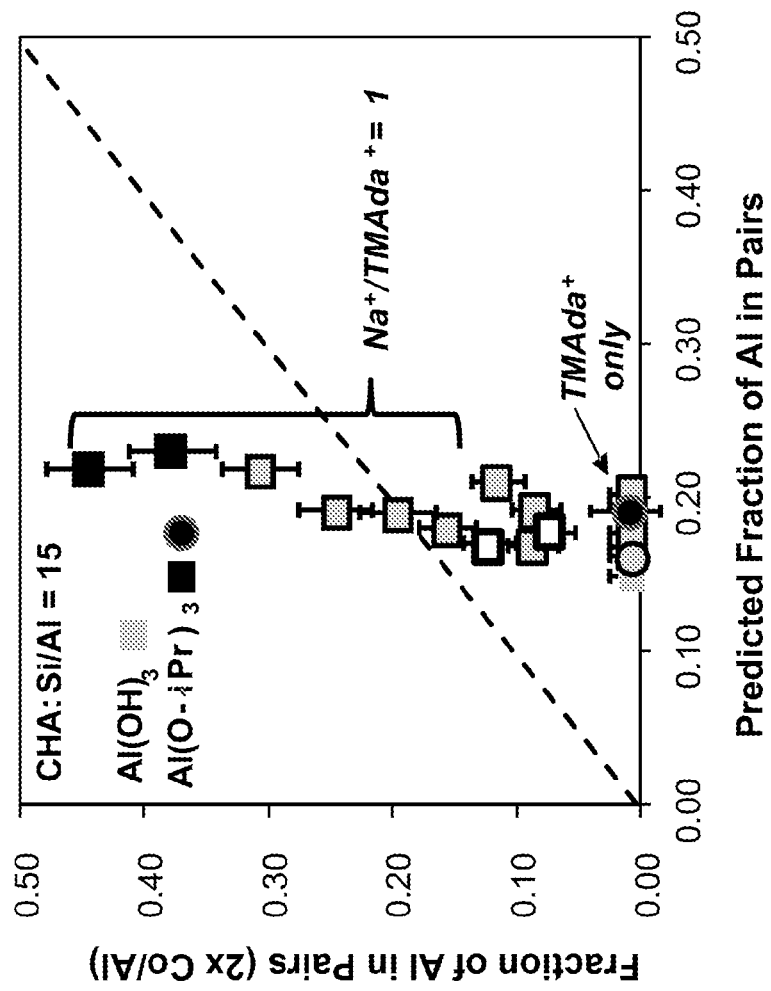
FIG. 6 is a graph of the fraction of Al in pairs, measured by Co$^{2+}$ exchange, as a function of the number of Al in pairs predicted for a random Al distribution subject to Lowenstein's Rule.
Figures 7A, 7B, 7C, 7D, 7E, 7F, 7G, 7H:
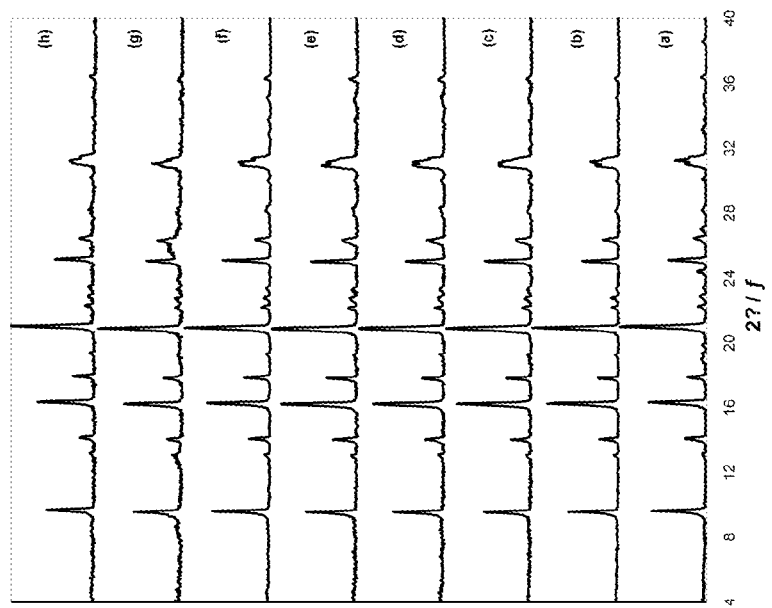
FIGS. 7a-7h are X-ray diffraction patterns of CHAs synthesized with various K$^+$/TMAda$^+$ ratios.

FIGS. 5a-5d provide X-Ray diffraction patterns of CHA zeolites synthesized using a Si/Al=15 and a ratio of $Na^+$/$TMAda^+$ of 0 or 1. Typical syntheses in the presence of $Na^+$ and $TMAda^+$ indicated that the crystallized zeolites had a significant fraction of paired aluminum present in the structure. These samples corroborated the finding that using $Al(O-i-Pr)_3$ as the Al precursor results in CHA zeolites that contain nearly 40% of their Al atoms in paired arrangements, which is nearly twice the number that would be expected for a statistically random Al distribution in CHA zeolites of this composition (Si/Al=15). CHA zeolites crystallized in synthesis media containing only $TMAda^+$ as the SDA, but in the presence of $Al(O-i-Pr)_3$, did not contain paired Al sites (FIG. 6), consistent with previous observations of CHA synthesized using only $TMAda^+$ and aluminum hydroxide ($Al(OH)_3$) as the Al source (Di Iorio, J. R.; Gounder, R. Chem. Mater. 2016, 28, 2236-2247). $Co^{2+}$ ions were used to determine whether Al atoms occurred as pairs (in the 6MR) or as isolated ions (FIG. 6). Referring to FIG. 6, the fraction of Al in pairs, measured by $Co^{2+}$ exchange, as a function of the number of Al in pairs predicted for a random Al distribution subject Lowenstein's Rule is illustrated ($Al(OH)_3$ and $Na^+$/$TMAda^+$=0-2 in $OH^-$ media (gray squares); $Al(O-i-Pr)_3$ and $Na^+$/$TMAda^+$=1 (black squares); $Na^+$/$TMAda^+$=0 in $F^-$ media (gray circle); and $Na^+$/$TMAda^+$=0 (black circle)).

Thus, the presence of $Na^+$ in CHA synthesis media lead to the formation of paired Al sites regardless of Al precursor (Co/Al<0.01 when $Na^+$/$TMAda^+$=0 for $Al(OH)_3$ or $Al(O-i-Pr)_3$) or mineralizing agent (e.g., $OH^-$ or $F^-$), suggesting that the structure of the cations used to facilitate zeolite crystallization predominantly affected Al siting. Without wishing to be bound by any particular theory, these results when taken together suggest cooperative interactions between organic $TMAda^+$ molecules and inorganic alkali cations (e.g., $Na^+$) stabilize paired Al sites, guiding the formation of paired Al sites during CHA crystallization. This is consistent with prior experimental observations that the number of paired Al sites in CHA increases with $Na^+$ co-incorporation with $TMAda^+$ within crystallized CHA zeolitic products.

Example 2. CHA Preparation Using $K^+$ and $TMAda^+$ (Inventive)

The above hypothesis was further probed by utilizing $K^+$ instead of $Na^+$ as the alkali SDA cation, together with $TMAda^+$ during CHA synthesis. $K^+$ is known to suppress the formation of certain crystal phases (e.g., BEA, MFI), and also to facilitate the crystallization of low-silica CHA (Si/Al<5) from FAU precursors in the absence of organic SDAs, a transformation that is inaccessible using only $Na^+$ without using high concentrations of seed crystals (~10 wt % $SiO_2$ seed). These observations suggest that $K^+$ may guide crystallization towards the CHA framework, but perhaps with different consequences than $Na^+$ regarding their role in influence Al arrangements. The influence of $K^+$ on the arrangement of Al in high-silica CHA (Si/Al=15) crystallized in the presence of $TMAda^+$ was investigated by adapting previously reported procedures to synthesize CHA using different $Na^+$/$TMAda^+$ ratios (Di Iorio, J. R.; Gounder, R. Chem. Mater. 2016, 28, 2236-2247, incorporated by reference herein in its entirety) but by substituting KOH for NaOH in the synthesis solution.

A synthesis molar ratio of $1SiO_2/0.033Al_2O_3/X$ TMAdaOH/0.5*(0.5–X) $K_2O/44H_2O$ was used for a CHA zeolite SAR of 15. The ratio of $K^+$ to $TMAda^+$ was controlled by varying the value of X between 0 and 0.5. A typical synthesis involved adding the desired amount of an aqueous TMAdaOH solution (25 wt %, Sachem) to deionized $H_2O$ (18.2 MΩ) to a perfluoroalkoxy alkane (PFA) jar and stirring the solution, covered, under ambient conditions for 5 minutes. Next, $Al(OH)_3$ (98 wt %, SPI Pharma) and a 5M potassium hydroxide solution (KOH: 21.9 wt % KOH in deionized water; KOH pellets 98 wt %, Alfa Aesar) was added to the aqueous TMAdaOH solution and the mixture was stirred, covered, under ambient conditions for 15 minutes to homogenize the contents. Finally, colloidal silica (Ludox HS40, 40 wt %, Sigma Aldrich) was added to the mixture and stirred, covered, for 2 h under ambient conditions. All synthesis reagents were used without further purification. The synthesis solution was then transferred to a 45 ml Teflon-lined stainless-steel autoclave (Parr Instruments) and placed in a forced convection oven (Yamato DKN-402C) at 160° C. and rotated at ~40 RPM for 6 days.

Figures 8A, 8B, 8C, 8D, 8E:
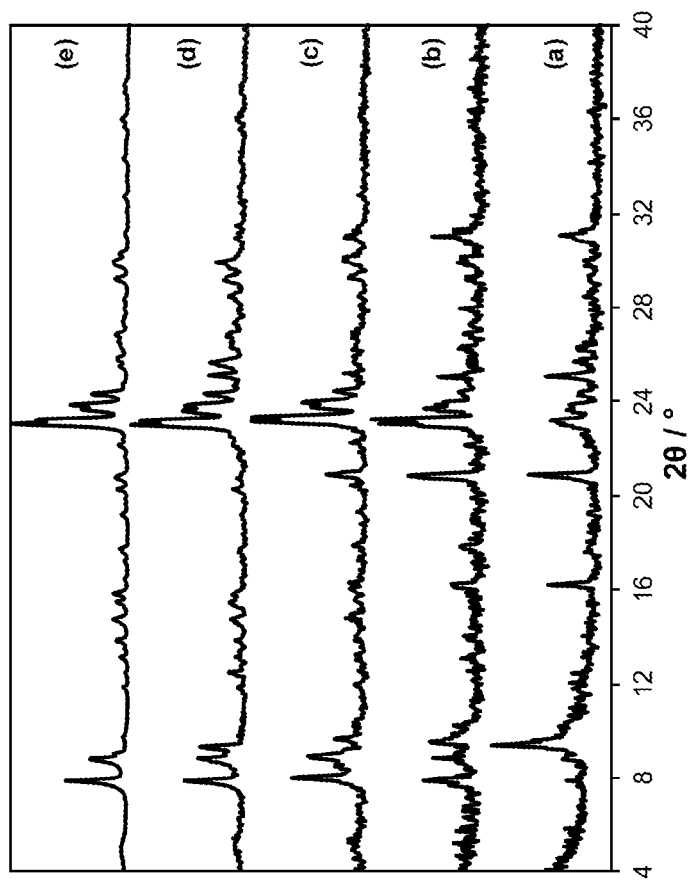
FIGS. 8a-d are X-Ray diffraction patterns of zeolites synthesized using Al(O-i-Pr)$_3$ at Si/Al=15 and various ratios of K$^+$/TMAda$^+$.
FIG. 8e is an X-Ray diffraction pattern of a commercial MFI zeolite with Si/Al of 43.
Figures 9A, 9B, 9C, 9D, 9E, 9F, 9G, 9H:
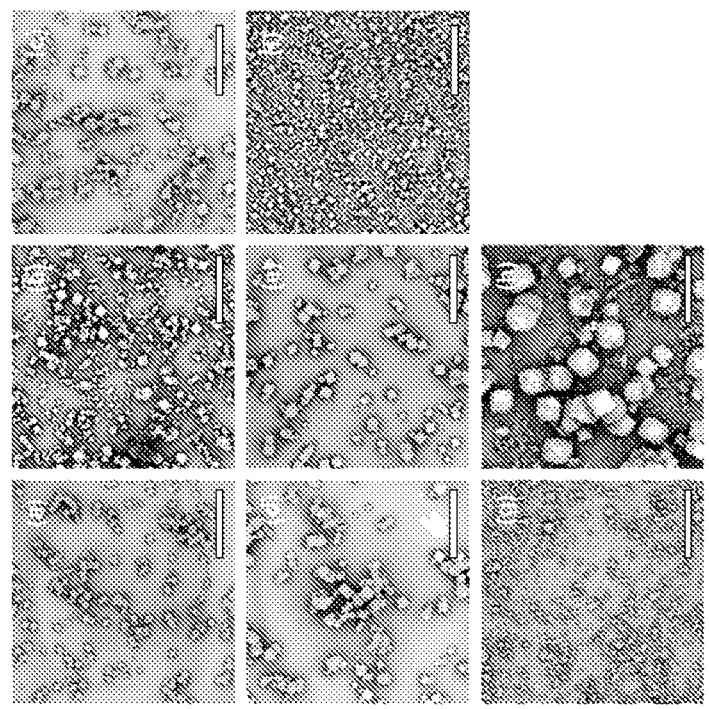
FIGS. 9a-9h are scanning electron micrographs at 1330× magnification of CHAs synthesized with various K$^+$/TMAda$^+$ ratios.

Synthesis media containing $K^+$/$TMAda^+$≤20 resulted in CHA zeolites without detectable phase impurities from X-ray diffraction (XRD) data (FIGS. 7a-h), but increasing the $K^+$/$TMAda^+$ beyond 20 resulted in the formation of MFI ($K^+$/$TMAda^+$ up to ∞). Specifically, FIGS. 7a-7h provide X-ray diffraction patterns of CHA embodiments synthesized with $K^+$/TMAda$^+$ ratios of (a) 1, (b) 2, (c) 3, (d) 4, (e) 5, (f) 10, (g) 15, and (h) 20. FIGS. 8a-d provide XRD patterns of zeolites synthesized using Al(O-i-Pr)$_3$ at Si/Al=15 and ratios of $K^+$/TMAda$^+$ of 30, 50, 100, and infinity. FIG. 8e provides the XRD of a MFI zeolite for comparison.

This reflected the role of TMAda$^+$ to assist in directing toward the CHA phase, and that $K^+$ alone was unable to crystallize CHA under the synthesis conditions disclosed herein. Unexpectedly, the use of $K^+$ enabled CHA to crystallize from solutions containing an order of magnitude higher alkali/TMAda$^+$ ratios than when Na$^+$ was used as the alkali source (MOR was observed at Na/TMAda>2). These results highlight the capacity of different alkali cations to act as co-SDAs (Lobo, R. F.; Zones, S. I.; Davis, M. E. Journal of Inclusion Phenomena and Molecular Recognition in Chemistry 1995, 21, 47-78) with TMAda$^+$, and appear to reflect the tendency of $K^+$ to suppress the formation of other undesired phases, as previously suggested for the synthesis of IFR zeolites from mixtures of $K^+$ and benzyl mono- and di-azabicyclo complexes (Muraoka et al., Angewandte Chemie International Edition 2018, 130, 3804-3808).

SEM micrographs of CHA zeolites (FIGS. 9a-9h) synthesized with $K^+$/TMAda$^+$<10 were comprised of cubic crystals ranging in size from 4-8 μm and were of similar composition (Table 2). Referring to FIGS. 9a-9h, provided are SEM micrographs taken at 1300× magnification of CHA synthesized with $K^+$/TMAda$^+$ ratios of (a) 1, (b) 2, (c) 3, (d) 4, (e) 5, (f) 10, (g) 15, and (h) 20. CHA synthesized with $K^+$/TMAda$^+$>10, however, was comprised of a mixture of two distinct crystalline CHA phases that differed markedly in size and composition (Table 2), indicating that a low-silica K-rich CHA phase (Si/Al<7, $K^+$/Al>1.5) begins to form in parallel to the high-silica CHA phase that are dominant crystal products from synthesis solutions containing $K^+$/TMAda$^+$<10 (Si/Al>10, $K^+$/Al<0.70).

TABLE 2

Elemental analysis of CHA synthesized with $K^+$/TMAda$^+$ = 1-20.

| | AAS | | SEM/EDX | | | | | |
|---|---|---|---|---|---|---|---|---|
| $K^+$/TMAda$^{+a}$ | Si/Al | $K^+$/Al | Si/Al (1)$^b$ | $K^+$/Al (1) | Size (1) (μm) | Si/Al (2)$^c$ | $K^+$/Al (2) | Size (2) (μm) |
| 1 | 15 | 0.37 | 12 | 0.68 | 3-5 | — | — | — |
| 2 | 16 | 0.51 | 14 | 0.50 | 3-6 | — | — | — |
| 3 | 14 | 0.53 | — | — | 4-8 | — | — | — |
| 4 | 13 | 0.56 | — | — | 4-8 | — | — | — |
| 5 | 11 | 0.43 | 10 | 0.52 | 4-8 | — | — | — |
| 10 | 11 | 0.71 | 11 | 0.56 | 2-5 | — | — | <0.5 |
| 15 | 10 | 1.43 | 12.1 | 0.71 | 2-4 | 6.8 | 1.5 | <0.5 |
| 20 | 10 | 1.21 | 10.2 | 0.60 | 10-15 | 7.5 | 1.6 | <0.5 |

$^a$$K^+$/TMAda$^+$ ratio in the synthesis solution.
$^b$(1) represents the primary CHA crystal phase (large cubes)

Figure 10:
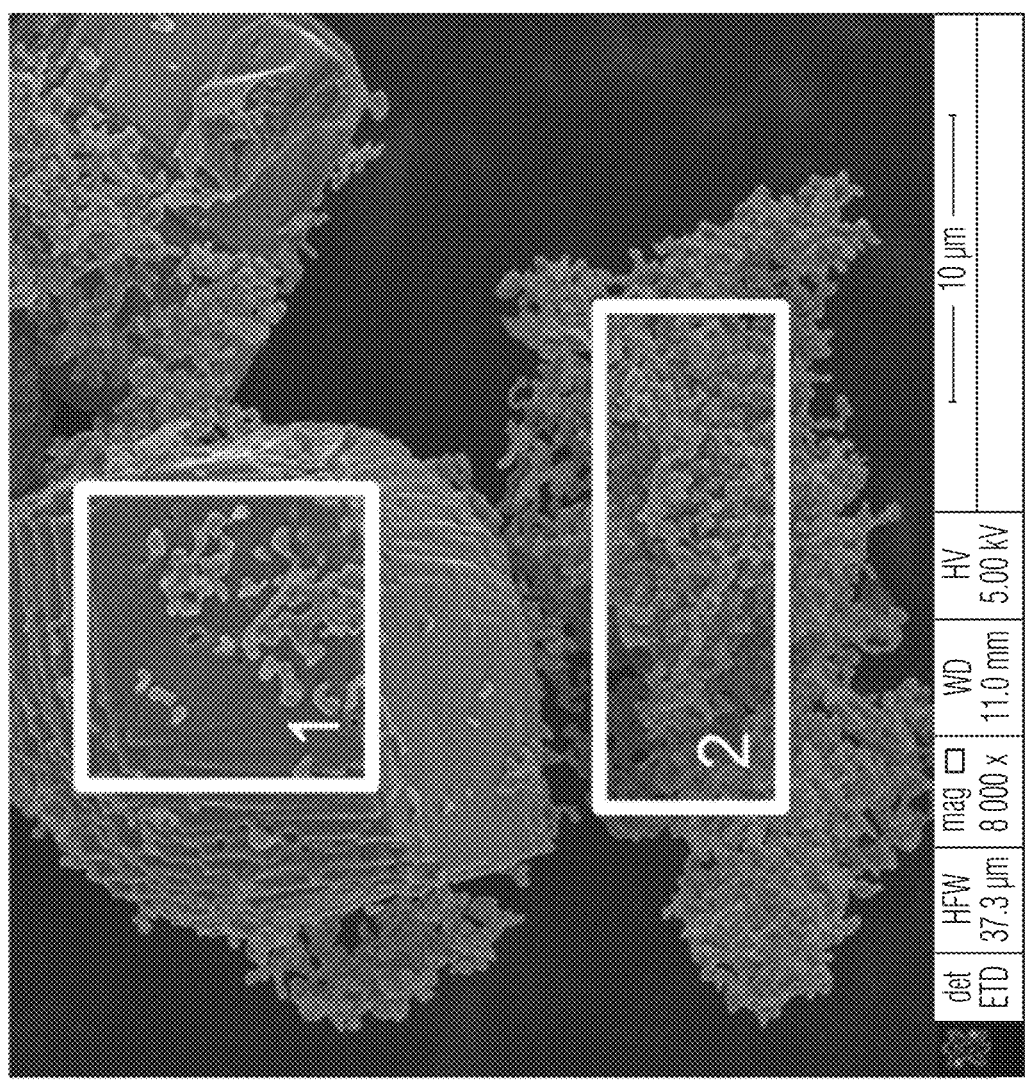
FIG. 10 is an energy dispersive X-Ray spectrogram illustrating the elemental analysis the two distinct high-silica (1) and low-silica (2) phases observed for one embodiment of the disclosure synthesized with K$^+$/TMAda$^+$=20.
Figure 11B:
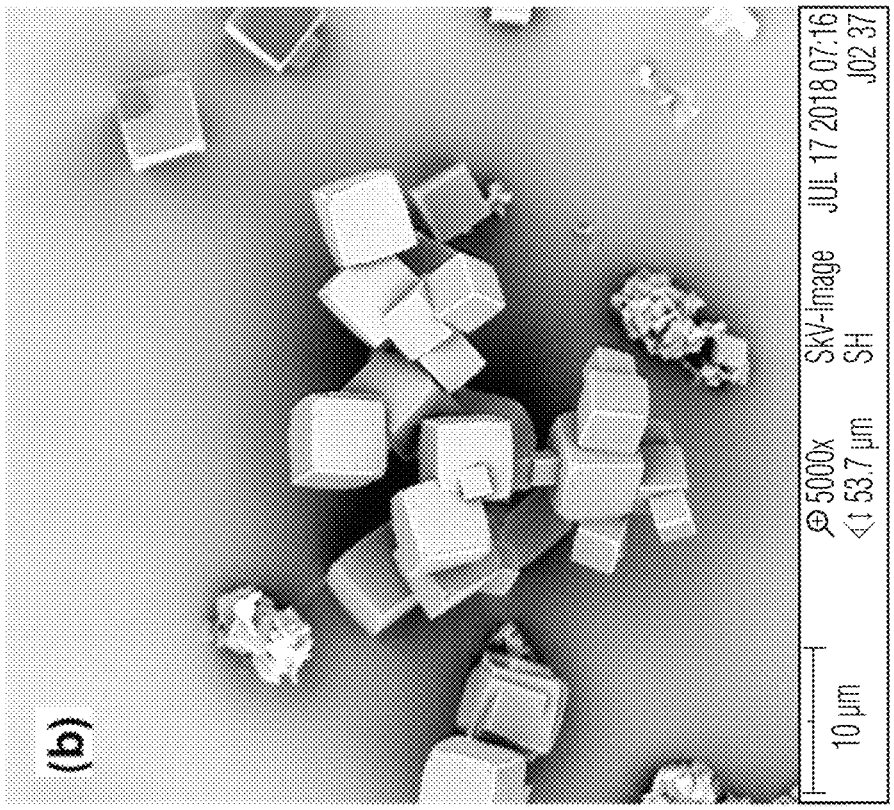
FIGS. 11a and 11b are SEM micrographs of one embodiment of the disclosure with K$^+$/TMAda$^+$=1 taken at (a) 1300× and (b) 5000× magnification.
Figure 11A:
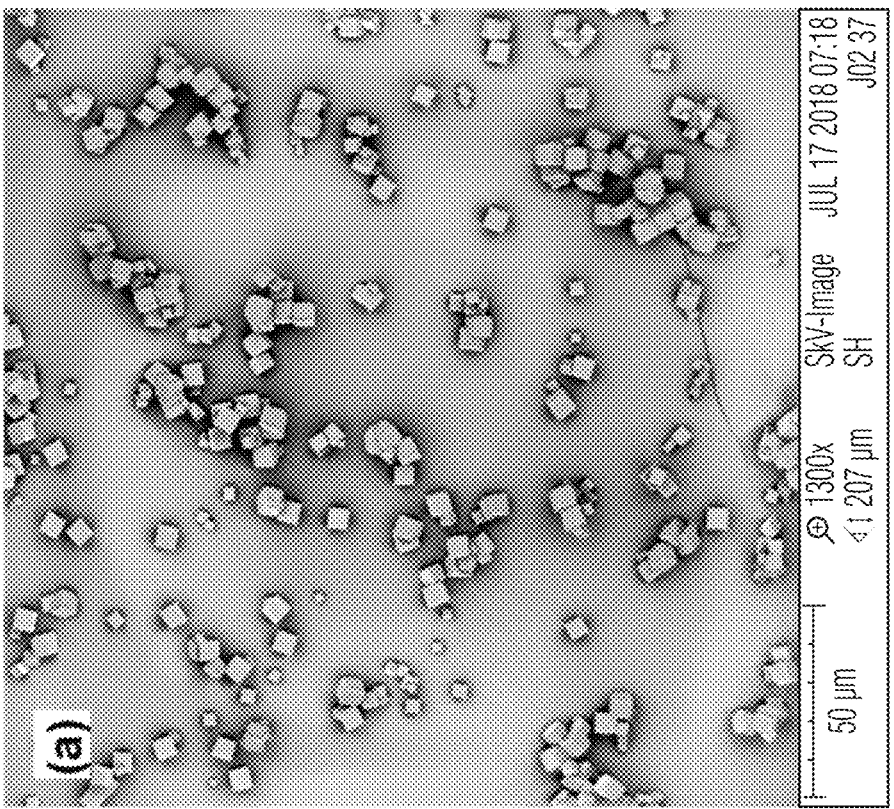
Figure 12B:
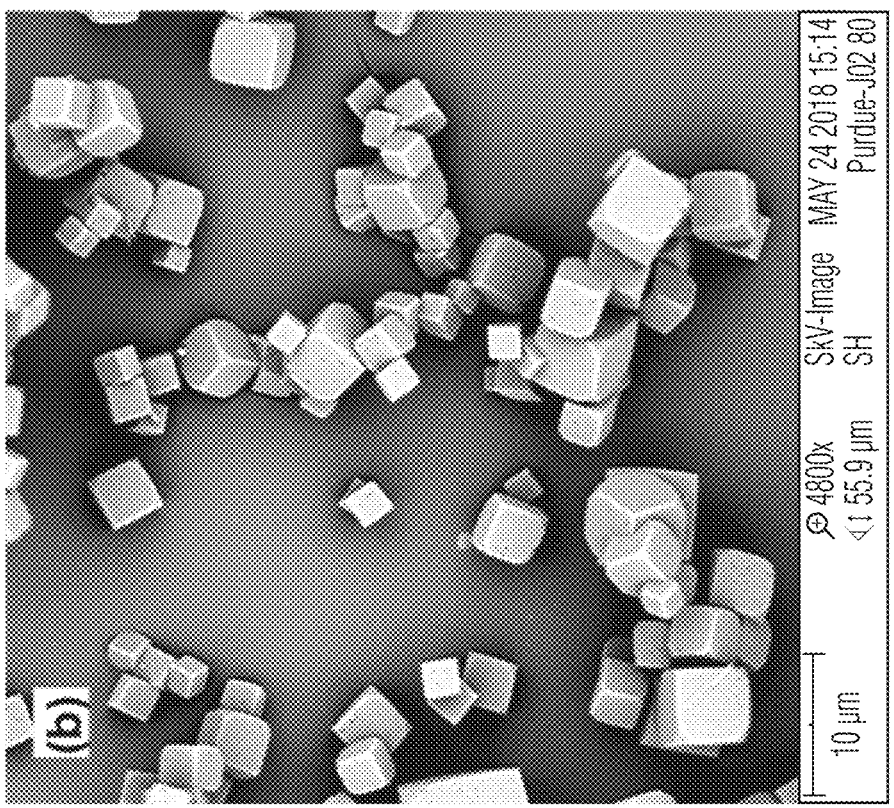
FIGS. 12a and 12b are SEM micrographs of one embodiment of the disclosure synthesized with K$^+$/TMAda$^+$=2 taken at (a) 1250× and (b) 4800× magnification.
Figure 12A:
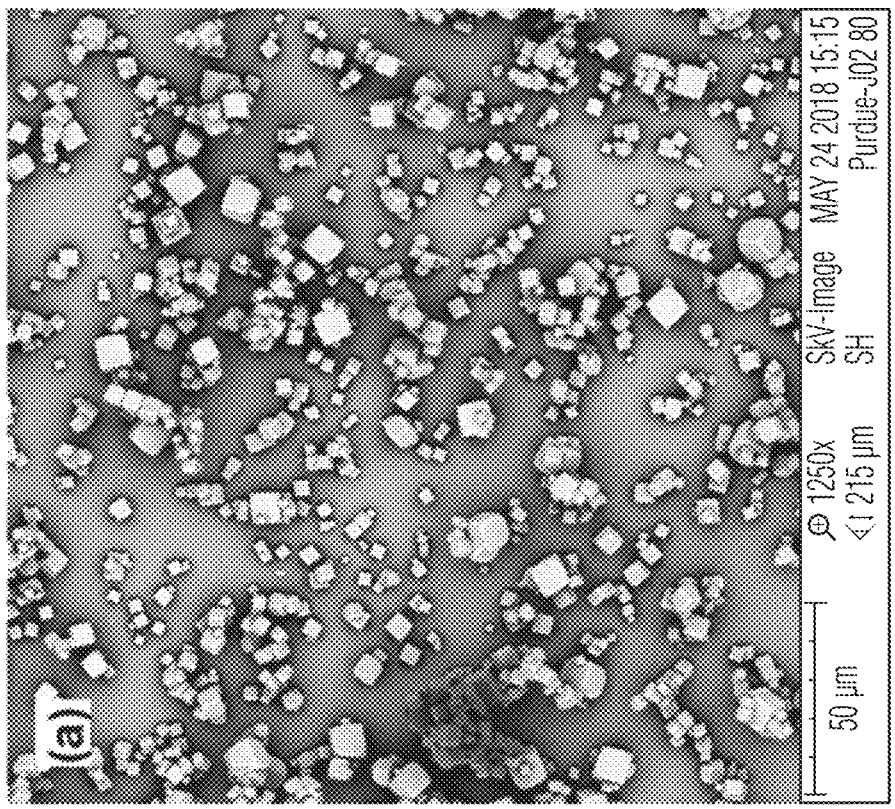
Figure 13B:
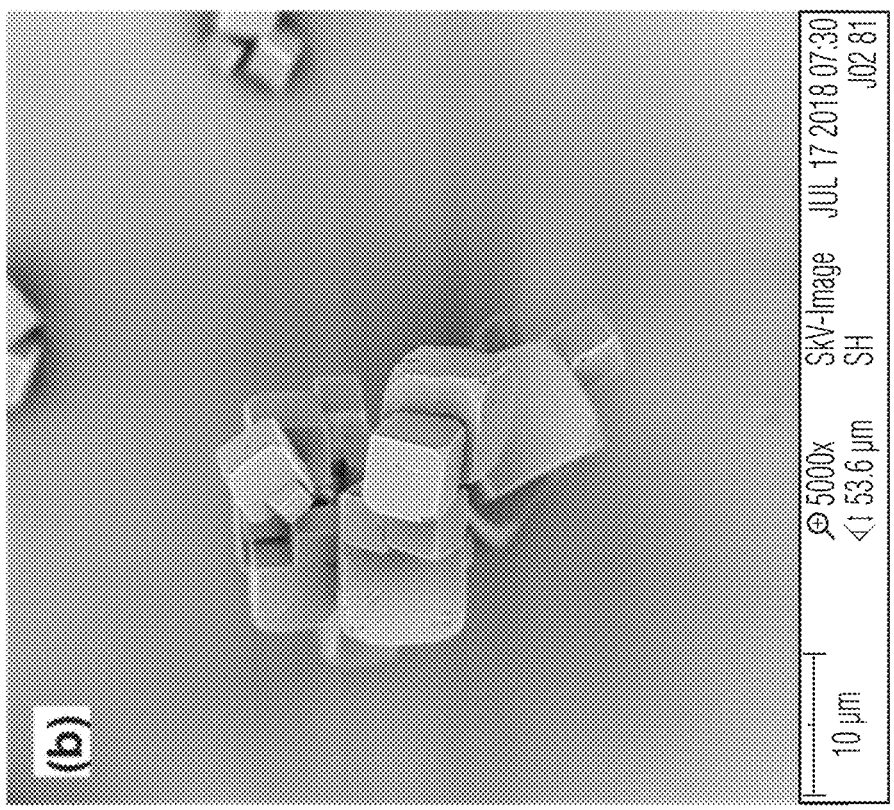
FIGS. 13a and 13b are SEM micrographs of one embodiment of the disclosure synthesized with K$^+$/TMAda$^+$=3 taken at (a) 1250× and (b) 5000× magnification.
Figure 13A:
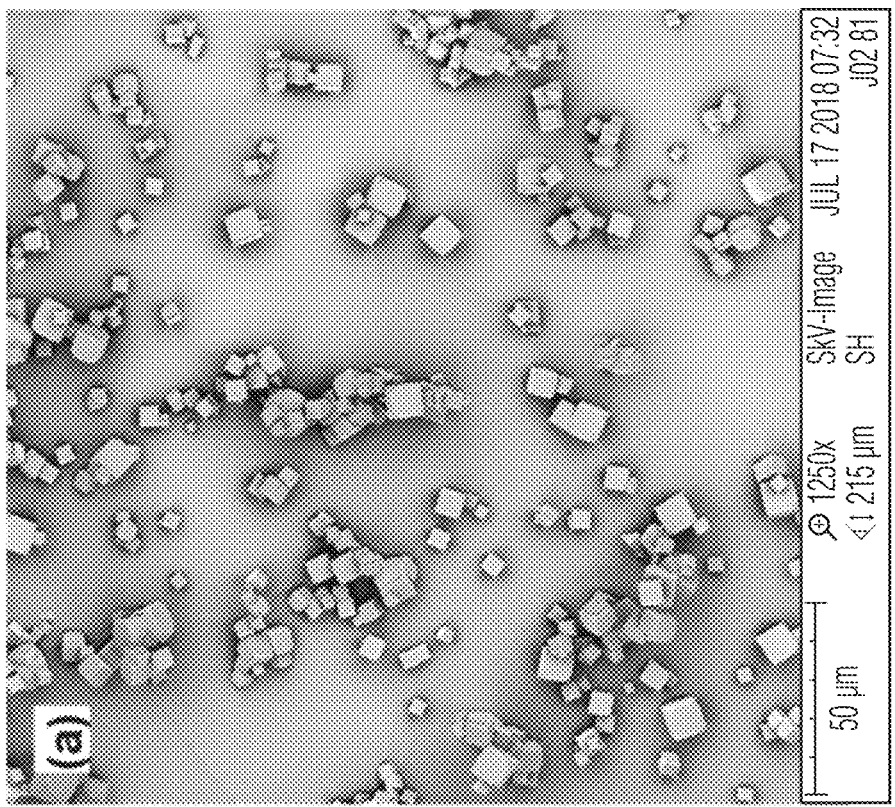
Figure 14B:
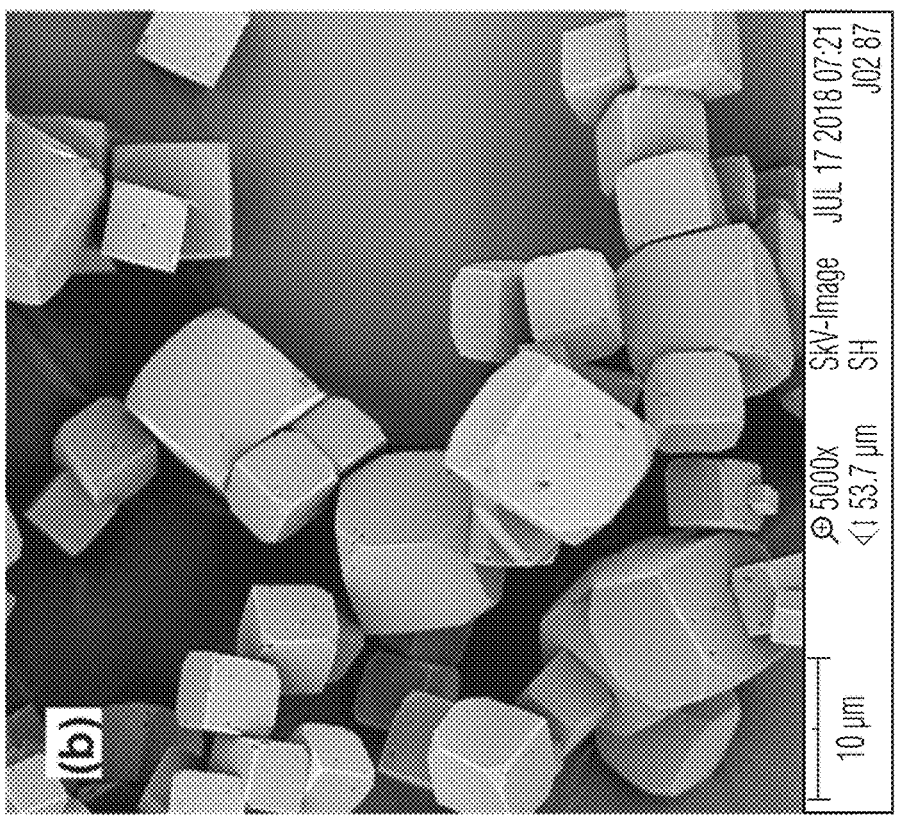
FIGS. 14a and 14b are SEM micrographs of one embodiment of the disclosure synthesized with K$^+$/TMAda$^+$=4 taken at (a) 1250× and (b) 5000× magnification.
Figure 14A:
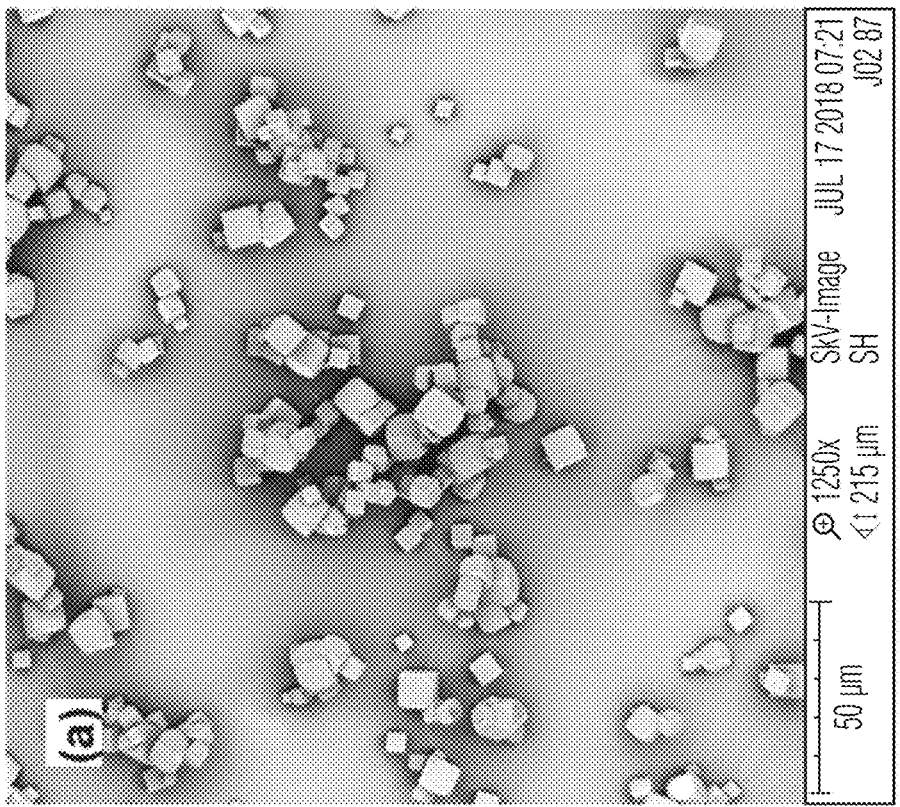
Figure 15B:
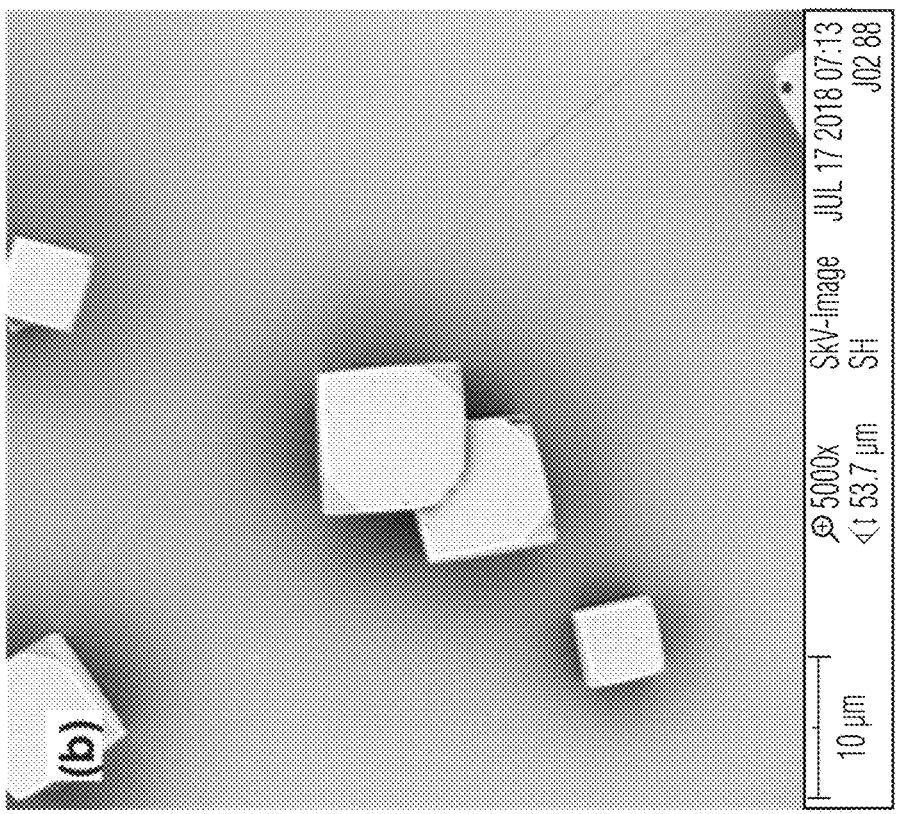
FIGS. 15a and 15b are SEM micrographs of one embodiment of the disclosure synthesized with K$^+$/TMAda$^+$=5 taken at (a) 1250× and (b) 5000× magnification.
Figure 15A:
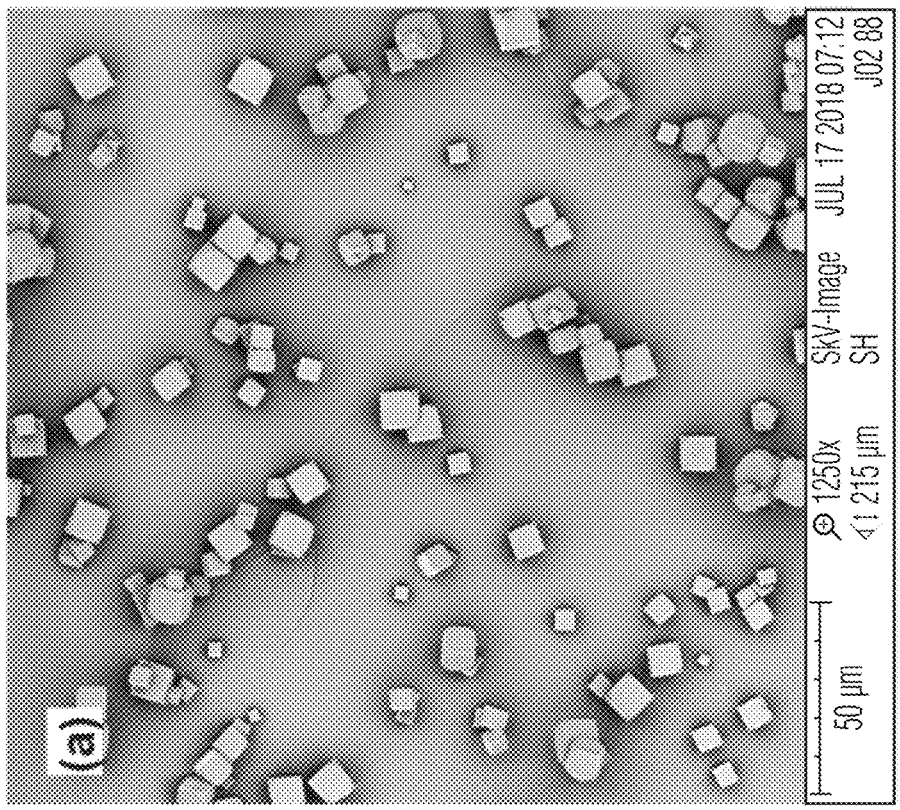
Figure 16B:
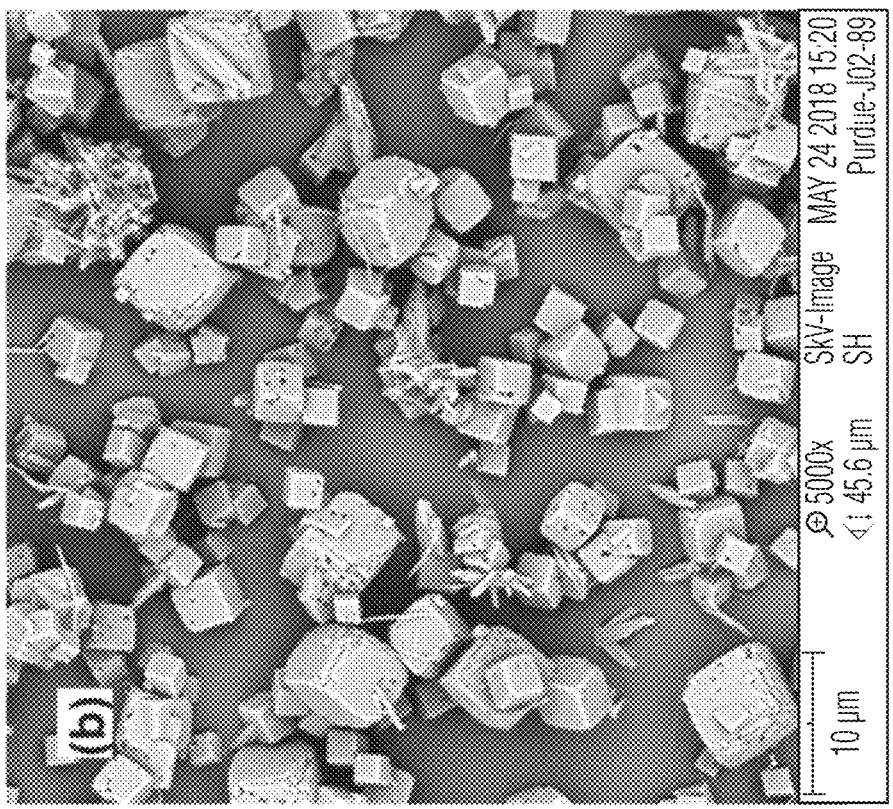
FIGS. 16a and 16b are SEM micrographs of one embodiment of the disclosure synthesized with K$^+$/TMAda$^+$=10 taken at (a) 1400× and (b) 5900× magnification.
Figure 16A:
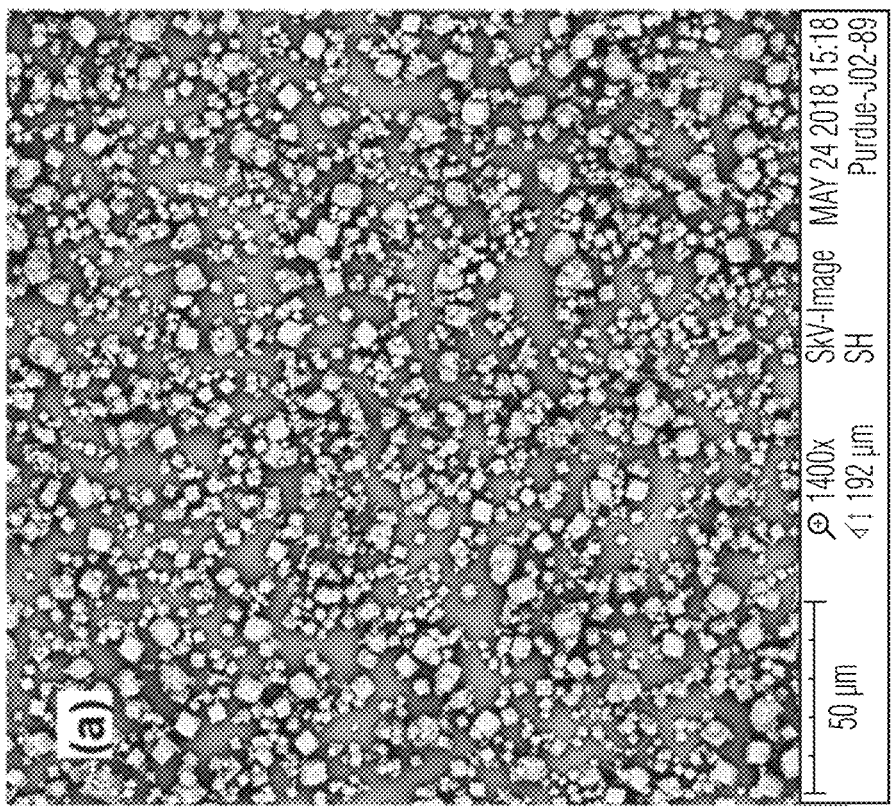
Figure 17B:
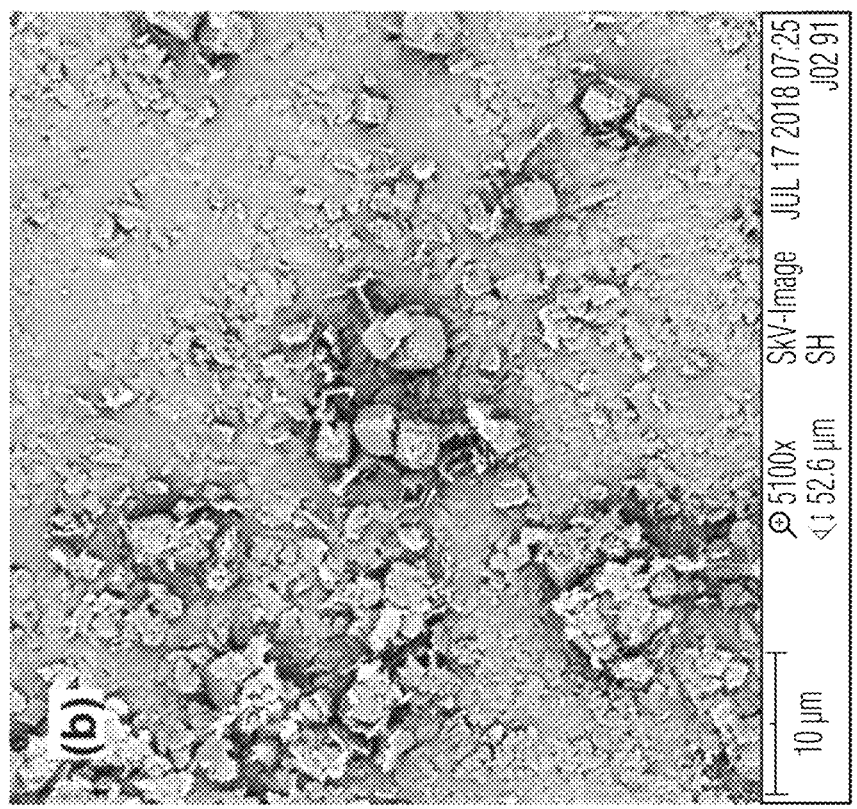
FIGS. 17a and 17b are SEM micrographs of one embodiment of the disclosure synthesized with K$^+$/TMAda$^+$=15 taken at (a) 1300× and (b) 5100× magnification.
Figure 17A:
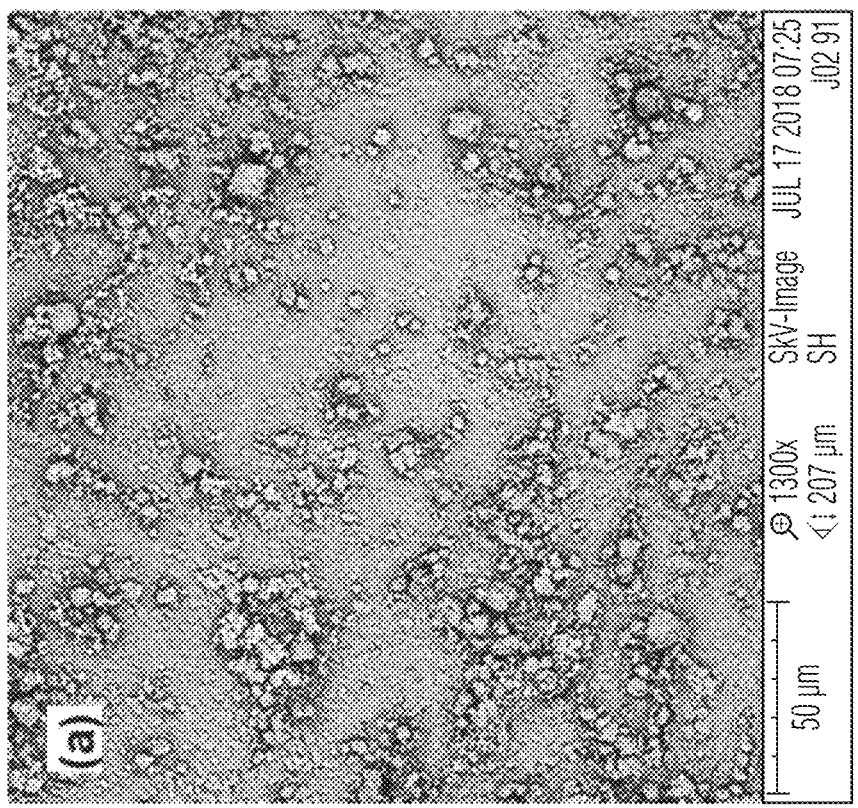
Figure 18B:
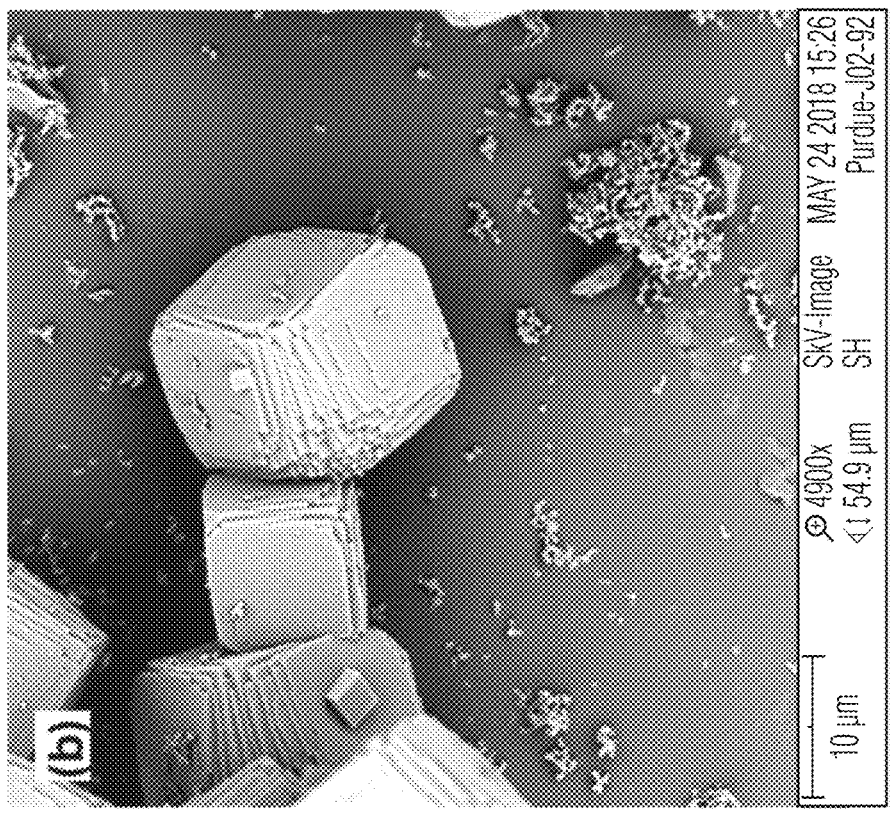
FIGS. 18a and 18b are SEM micrographs of one embodiment of the disclosure synthesized with K$^+$/TMAda$^+$=20 taken at (a) 1700× and (b) 4900× magnification.
Figure 18A:
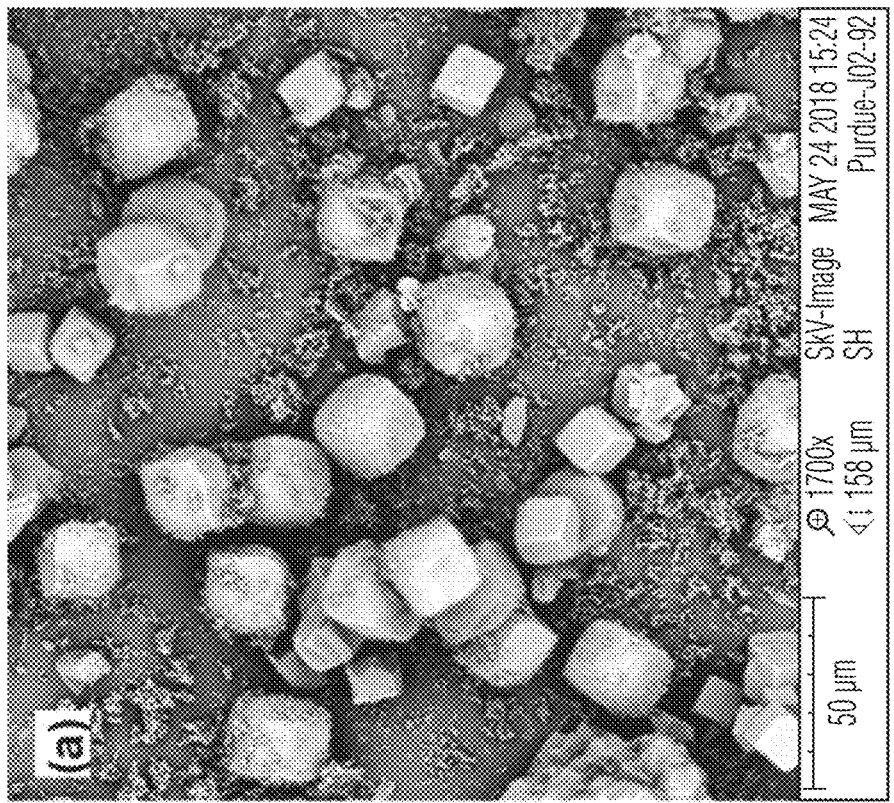

This observation was consistent with refinement of X-Ray diffraction (XRD) data indicating that CHA synthesized with $K^+$/TMAda$^+$<10 was nearly phase-pure high-silica CHA, but that only 67% of the material synthesized from solutions containing a $K^+$/TMAda$^+$=20 was comprised of a high-silica CHA phase. Table 3 provides parameters determined for embodiments with $K^+$/TMAda$^+$ ratios of 2, 10, and 20 as determined by powder X-Ray diffraction. Elemental analysis of these two distinct CHA phases by EDX showed that the high-silica CHA phase had an elemental composition similar to other CHA samples synthesized with $K^+$/TMAda$^+$<10 (Table 2 and FIG. 10).

TABLE 3

Phase analysis of CHA embodiments.

| $K^+$/TMAda$^{+a}$ | $a_0$/Å | $c_0$/Å | Unit Cell Volume$^b$/ Å$^3$ | % High silica CHA$^c$ |
|---|---|---|---|---|
| 2 | 13.584 | 14.795 | 2364 | 88 |
| 10 | 13.595 | 14.811 | 2371 | 91 |
| 20 | 13.580 | 14.805 | 2365 | 67 |

$^a$$K^+$/TMAda$^{+a}$ ratio in the synthesis solution.
$^b$Unit cell volume calculated for a trigonal unit cell of space group R-3m with a0 = b0 ≠ c0, and α = β = 90°, γ = 120°.
$^c$Percent determined from a two-component fitting of XRD data into a high-silica and low-silica phase.

Figure 19:
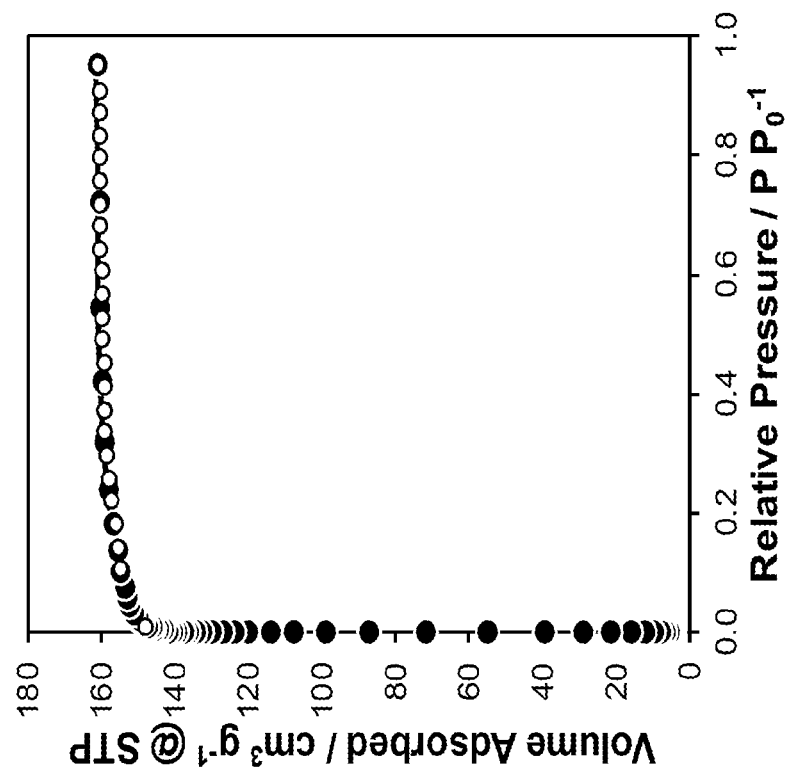
FIG. 19 is a graph showing Ar adsorption (closed circles) and desorption isotherms (open circles) at 87K for one embodiment of the disclosure synthesized with K$^+$/TMAda$^+$=2.

Nearly all CHA zeolites synthesized using $K^+$ contained visible defects (FIGS. 11a and 11b to 18a and 18b) that appeared to be the formation of large mesopores, which were not observed in CHA synthesized without alkali (TMAda$^+$-only) or with mixtures of Na$^+$ and TMAda$^+$. Ar adsorption-desorption isotherms (87° K) revealed that CHA synthesized with $K^+$/TMAda$^+$=2 had a micropore volume similar to CHA synthesized with different mixtures of TMAda$^+$ and Na$^+$ (0.19 cm$^3$ g$^{-1}$), and did not contain mesopores, evident in the lack of desorption hysteresis (FIG. 19).

Figure 20:
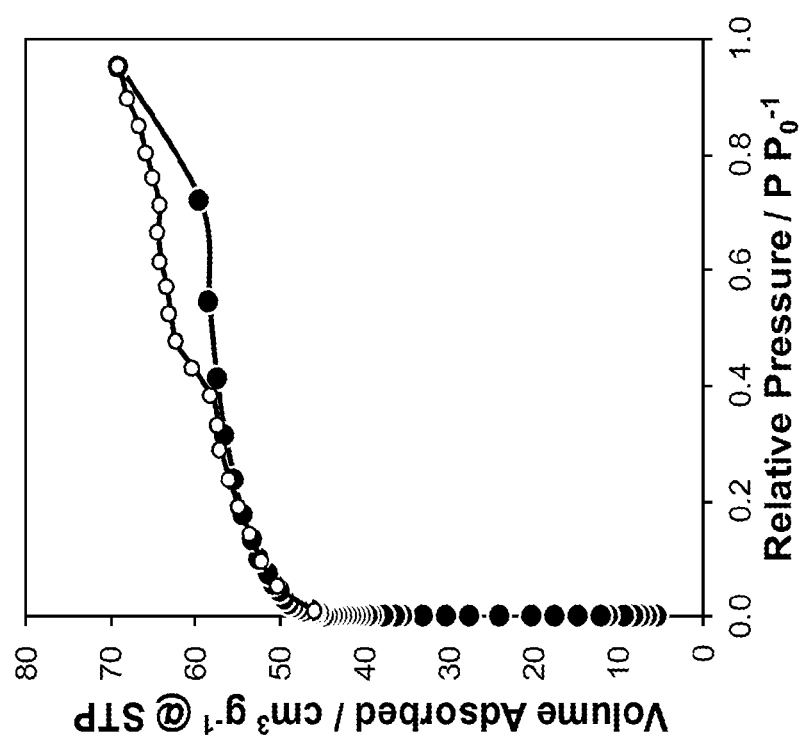
FIG. 20 is a graph showing Ar adsorption (closed circles) and desorption isotherms (open circles) at 87K for one embodiment of the disclosure synthesized with K$^+$/TMAda$^+$=15.

CHA synthesized with $K^+$/TMAda$^+$=15 had an Ar micropore volume significantly lower than expected for CHA (0.06 cm$^3$ g$^{-1}$) and displayed Type-H4 desorption hysteresis (step-down at P/P$_0$~0.4; FIG. 20), which indicated the presence of disordered mesopores, possibly formed by defects introduced from an excessive cationic charge density ($K^+$/Al>1; Table 3) or from adsorption within the secondary phase. This set of data suggested that the role of $K^+$ during crystallization of CHA zeolites was different than that of Na$^+$, whose occlusion during crystallization did not displace TMAda$^+$ (FIG. 21a), and was likely reflected in the Al arrangement of the crystalline product. FIG. 21a graphically illustrates the number of TMAda$^+$ per CHA cage (squares), measured by thermogravimetric analysis (TGA), and amount of Na$^+$ retained per CHA cage (circles), measured by AAS, as a function of the Na$^+$/TMAda$^+$ ratio in the synthesis media.

Comparative CHA zeolites crystallized from mixtures of Na$^+$ and TMAda$^+$ contained one TMAda$^+$ per cage (~20-22 wt % organic), independent of the amount of residual Na$^+$ retained within crystalline products (FIG. 21a), yet inventive zeolites crystallized from mixtures of $K^+$ and TMAda$^+$ showed that the occupancy of TMAda$^+$ per CHA cage systematically decreased as the amount of $K^+$ retained on crystalline CHA product increased (FIG. 21b; Table 2). FIG. 21b provides a graphical illustration of the number of TMAda$^+$ per CHA cage (squares and amount of $K^+$ retained per CHA cage (circles) as a function of the $K^+$/TMAda$^+$ ratio in the synthesis media.

Without wishing to be bound by theory, the negative correlation observed between TMAda$^+$ and $K^+$ in the crystalline CHA products suggests that three $K^+$ cations displaced a single TMAda$^+$ from the CHA cage and that $K^+$ assisted in the stabilization of the CHA framework up to a limit of approximately 2 TMAda$^+$ per unit cell (FIG. 21c). FIG. 21c provides a graphical illustration of the number of TMAda$^+$ per CHA cage as a function of the amount of $K^+$ (squares) or Na$^+$ (circles) retained on the crystalline CHA product. The dashed (slope~⅓) and dotted (slope~0) lines are regressions to $K^+$ (squares) and Na$^+$ (circles) data sets, respectively.

While the total Al content did increase with increasing $K^+$ content (Table 2), the presence of excess cationic charge, relative to the anionic charge of the framework (e.g., ($K^+$+ $TMAda^+$)/Al>1; Table 4), suggests that the formation of anionic lattice defects was required to compensate for the excess extra-framework charge in CHA synthesized using $K^+$ cations (Table 4). Table 4 provides the total $K^+$ and $TMAda^+$ content per Al, the total cationic charge of the crystalline zeolite product (($K^+$+$TMAda^+$)/Al), the $H^+$/Al ratio, and the estimated number of lattice defects on CHA zeolites synthesized with $K^+$/$TMAda^+$=1-20. Titration of protons by aqueous $NH_4^+$ ion-exchange showed that CHA zeolites synthesized with $K^+$/$TMAda^+$<10 contained nearly all of their Al in framework positions, but that further increasing the $K^+$/$TMAda^+$ ratio resulted in higher fractions of Al that are inaccessible to hydrated $NH_4^+$ cations, possibly reflecting pore-blockage in CHA synthesized with $K^+$/$TMAda^+$>10 or the formation of extra-framework Al sites (Table 4).

TABLE 4

Properties of CHA zeolites synthesized with $K^+$/$TMAda^+$ = 1-20.

| $K^+$/$TMAda^{+a}$ | Si/Al | $K^+$/Al | $TMAda^+$/Al | ($K^+$ + $TMAda^+$)/Al | $H^+$/Al[b] | Co/Al | Defects per unit cell[c] |
|---|---|---|---|---|---|---|---|
| 1 | 15 | 0.37 | 1.23 | 1.60 | 0.98 | 0.05 | 1.35 |
| 2 | 16 | 0.51 | 1.18 | 1.69 | 1.01 | 0.03 | 1.46 |
| 3 | 14 | 0.53 | 0.98 | 1.50 | 1.05 | 0.01 | 1.20 |
| 4 | 13 | 0.56 | 0.89 | 1.45 | 1.00 | <0.01 | 1.15 |
| 5 | 11 | 0.43 | 0.88 | 1.31 | 0.96 | 0.01 | 0.36 |
| 10 | 11 | 0.71 | 0.78 | 1.49 | 1.02 | 0.01 | 1.11 |
| 15 | 10 | 1.43 | 0.55 | 1.97 | 0.82 | <0.01 | 1.80 |
| 20 | 10 | 1.21 | 0.66 | 1.88 | 0.41 | 0.01 | 1.23 |

[a]$K^+$/$TMAda^+$ ratio in the synthesis media.
[b]$H^+$/Al measured by $NH_3$ TPD.
[c]Number of defects per unit cell estimated from a charge balance on the as-synthesized zeolite: [$K^+$ + $TMAda^+$]—$AlO_2$—

It has previously been reported that the number of paired Al sites (2 Al in a 6-MR), quantified by $Co^{2+}$ titration, in CHA synthesized with $Na^+$ increased as the total amount of $Na^+$ retained on the crystalline product increased (Di Iorio, J. R.; Gounder, R. Chem. Mater. 2016, 28, 2236-2247; et al., ACS Catal. 2017, 7, 6663-6674). In contrast, the total amount of $K^+$ retained after crystallization did not correlate with the number of Al pairs (Table 2). At low $K^+$/TMAda ratios in the synthesis media ($K^+$/TMAda<2), the occlusion of $K^+$ resulted in the formation of a minority amount of paired Al sites, but in lower amounts (Co/Al=0.05) than previously reported for CHA synthesized with mixtures of Na+ and $TMAda^+$ (Co/Al=0.10). As the $K^+$/$TMAda^+$ ratio in the synthesis solution increased, the ratio of $K^+$ to $TMAda^+$ in the crystalline product systematically increased (FIG. 21b), suggesting that $K^+$ competed with $TMAda^+$ for similar voids in CHA and favored the formation of isolated Al sites. This behavior was markedly different than that of $Na^+$, which appeared to reflect the occlusion of $Na^+$ within void spaces that are unoccupied by $TMAda^+$ so as to stabilize the two anionic charges in a paired Al configuration. These results reflect the preference of extra-framework cationic SDAs to stabilize different Al arrangements during CHA crystallization, consistent with prior findings that extra-framework $Cu^{2+}$ and $H^+$ cations preferentially stabilize different Al arrangements in CHA.

Example 3. Large Scale Preparation of CHA Zeolites with $Na^+$ and $TMAda^+$ (Comparative)

Larger scale syntheses (300 ml reactor volume) were conducted using $Na^+$ as the inorganic SDA (as NaOH) and $TMAda^+$ as the organic SDA. A typical synthesis involved adding the desired amount of sodium hydroxide to deionized water that was weighed out in a PTFE liner of an autoclave. This solution was stirred for 5 minutes. Next, the desired amount of 20 wt % TMAdaOH solution (Sachem) was added and the mixture stirred for 5 minutes. The aluminum source (aluminum hydroxide) was added to this mixture, which was stirred for 30 minutes. Finally, the desired amount of colloidal silica (Ludox AS-40) was added to this mixture and stirred for 60 minutes. The PTFE liner with this mixture was placed in the autoclave, which was then sealed and maintained at 160° C. for 72 h while being stirred at 250 rpm. Table 5 provides OH/Si ratios, inorganic/organic SDA ratios, Si/Al ratio in the synthesis gel, water/Si ratio, and phase results determined by XRD for the products of each experiment.

TABLE 5

CHA synthesis conditions and XRD results (Comparative)

| Expt. # | OH/Si | Na/TMAda | Gel Si/Al Ratio | $H_2O$/Si | XRD result |
|---|---|---|---|---|---|
| 1 | 0.4 | 7 | 32.7 | 44 | Mixture of 2 CHA phases + Significant amorphous material |
| 2 | 0.5 | 10 | 32.7 | 44 | CHA + MOR |

Example 4. Large Scale Preparation of CHA Zeolites with $K^+$ and $TMAda^+$ (Inventive)

Large scale syntheses (300 ml or 2 L reactor) were conducted using $K^+$ as the inorganic SDA (as KOH) and $TMAda^+$ as the organic SDA. A typical synthesis involved adding the desired amount of 45 wt % potassium hydroxide solution to deionized water that was weighed out in a PTFE liner of an autoclave. This solution was stirred for 5 minutes. Next, the desired amount of 20 wt % TMAdaOH solution (Sachem) was added and the mixture stirred for 5 minutes.

The aluminum source (AH=aluminum hydroxide; AIP=aluminum isopropoxide) was added to this mixture, which was stirred for 30 minutes. Finally, the desired amount of colloidal silica (Ludox AS-40) was added to this mixture and stirred for 60 minutes. The PTFE liner with this mixture was placed in the autoclave, which was then sealed and maintained at 160° C. for 72 h while being stirred at 250 rpm. Table 6 provides OH/Si ratios, K/TMAda ratios, Si/Al ratio in the synthesis gel, water/Si ratio, and phase results determined by XRD for the products of each experiment.

TABLE 6

CHA synthesis conditions and XRD results.

| Expt. # | OH/Si | K/TMAda | Al source | Gel Si/Al Ratio | $H_2O$/Si | XRD result |
|---|---|---|---|---|---|---|
| 3 | 0.5 | 15 | AIP | 30.64 | 44 | Intergrowth of templated CHA and K-CHA phases |
| 4 | 0.5 | 15 | AH | 32.7 | 44 | Intergrowth of templated CHA and K-CHA phases |
| 5 | 0.5 | 10 | AH | 32.7 | 44 | Intergrowth of templated CHA and K-CHA phases |
| 6 | 0.5 | 5 | AH | 32.7 | 44 | Intergrowth of templated CHA and K-CHA phases |
| 7 | 0.5 | 49 | AH | 32.7 | 44 | Intergrowth of template CHA and K-CHA phases |
| 8* (no liner) | 0.5 | 10 | AIP | 32.7 | 44 | Mixture of 2 CHA phases + Significant amorphous material |
| 9 | 0.17 | 1.5 | AIP | 32.7 | 10 | CHA + significant amorphous material |
| 10 | 0.18 | 1.25 | AIP | 32.7 | 10 | CHA |
| 11 | 0.17 | 1.7 | AIP | 32.7 | 10 | CHA (<50% crystallinity) |
| 12 | 0.18 | 1.9 | AIP | 32.7 | 10 | CHA (63% crystallinity) |
| 13 | 0.18 | 3.4 | AIP | 32.7 | 10 | CHA + significant amorphous material |
| 14 | 0.18 | 7.8 | AIP | 32.7 | 10 | CHA + significant amorphous material |
| 15* (with liner) | 0.5 | 5 | AH | 33 | 44 | CHA + unidentified phase |
| 16* (no liner) | 0.5 | 5 | AH | 39.4 | 44 | Intergrowth of templated CHA and K-CHA phases |
| 17* (with liner) | 0.5 | 20 | AIP | 30.64 | 46 | CHA (<50% crystallinity) |

*Conducted on larger scale in 2 L reactor

Generally, the results demonstrated that the organic and inorganic cations cooperated or competed for occupancy within void spaces of the chabazite zeolites, and impacted the framework Al arrangement in the CHA zeolites of essentially fixed composition, in some embodiments resulting in intergrowth (mixed domains) of crystalline phases. In Expt. #3, the percentages of the first phase and second phase in the product were identified as being approximately 20-30% and 70-80%, respectively. The unit cell volume for these phases was in the range from 2353 Å$^3$ to 2411 Å$^3$.

The results disclosed herein highlight how CHA zeolites with similar microscopic arrangements of framework Al atoms can be prepared from synthetic protocols that use different alkali cations together with organic TMAda$^+$, which modifies the dominant SDA-framework interactions that influence Al siting. Na$^+$ preferentially occupies 6-MR voids in CHA and stabilizes paired Al sites in the presence of TMAda$^+$, which are occluded within larger CHA cages, suggesting cooperative interactions that stabilize regions of locally higher anionic charge densities (i.e., paired Al) than can be stabilized with TMAda$^+$ alone.

K$^+$ cations competed with TMAda$^+$ for occupancy within CHA cages and eventually caused the displacement of TMAda$^+$ at high K$^+$ concentrations (K$^+$/TMAda$^+$>2), which assisted in stabilizing the CHA framework at higher alkali concentrations in the synthesis media (K$^+$/TMAda$^+$ up to 20) more than possible with Na$^+$ (MOR formed at Na$^+$/TMAda$^+$ >2). These observations likely reflect the different roles that cationic SDAs play in stabilizing zeolite frameworks that contain high anionic charge densities. K$^+$ cations favor the formation of isolated Al sites, a consequence of their competition with TMAda$^+$ for occupancy within large CHA cages, in contrast to Na$^+$ that does not compete with TMAda$^+$ and causes the formation of paired Al sites. These findings provide a methodology to probe cooperative and competitive interactions of mixtures of organic and inorganic SDAs during zeolite crystallization, and provide opportunities to design zeolitic materials with tailored adsorption and catalytic function.

Example 5. Cu-Exchanged CHA Zeolites and SCR Activity

CHA zeolites synthesized using mixtures of TMAda$^+$ and Na$^+$ or K$^+$ as co-SDAs as described herein were then Cu-exchanged and used to evaluate catalyst performance for the selective catalytic reduction (SCR) of NO$_x$ with NH$_3$. Table 7 provides H$^+$/Al before Cu-exchange; Cu/Al and H$^+$/Al after Cu-exchange; standard NH$_3$—SCR rates (473° K, per Cu); NO, O$_2$, and NH$_3$ reaction orders; and apparent activation energies on Cu-CHA zeolites synthesized without alkali; or with Na$^+$/TMAda$^+$=1 (comparative); K$^+$/TMAda$^+$=2, and K$^+$/TMAda$^+$=15 (inventive).

TABLE 7

Ion-exchanged CHA properties.

| Sample | | $H^+/Al^a$ | Cu/Al | $H^+/Al^b$ | SCR Rate[c] | NO Order | $O_2$ Order | $NH_3$ Order | $E_{app}^{\ d}$ |
|---|---|---|---|---|---|---|---|---|---|
| Alkali-Free | Fresh | 0.96 | 0.28 | 0.67 | 8.5 | 0.7 | 0.4 | −0.3 | 67 |
| (Comparative) | Aged | | | 0.31 | 5.5 | 0.9 | 0.3 | −0.1 | 59 |
| $Na^+/TMAda^+$ = | Fresh | 1.02 | 0.24 | 0.67 | 7.2 | 0.7 | 0.3 | −0.2 | 61 |
| 1 (Comparative) | Aged | | | 0.36 | 5.7 | 0.8 | 0.3 | −0.1 | 56 |
| $K^+/TMAda^+$ = | Fresh | 1.01 | 0.22 | 0.50 | 10.4 | 0.7 | 0.4 | −0.3 | 54 |
| 2 | Aged | | | 0.01 | 4.2 | 0.6 | 0.6 | 0.0 | 49 |
| $K^+/TMAda^+$ = | Fresh | 0.82 | 0.27 | 0.40 | 5.0 | 0.7 | 0.4 | −0.2 | 57 |
| 15 | Aged | | | 0.01 | 2.9 | 0.7 | 0.3 | 0.0 | 38 |

[a]$H^+/Al$ measured on the parent H-form zeolite
[b]$H^+/Al$ measured on the Cu-form before (fresh) and after (aged) hydrothermal aging
[c]SCR rates measured at 473° K. $10^{-3}$ mol NO (mol Cu s)$^{-1}$
[d]Apparent activation energy in units of kJ mol$^{-1}$ Turnover rates of $NO_x$ SCR (per Cu, 473° K) depended on the spatial density of nominally site-isolated Cu cations (Cu per 1000 Å$^3$) and, in turn, the arrangement of anionic framework Al atoms that anchor such cationic Cu complexes. This reflected $O_2$ oxidation steps involving two $[Cu(NH_3)_2]^+$ complexes, which are electrostatically-tethered at anionic framework Al sites with localized mobility, that becomes the rate-limiting process at low temperatures. The stability of Cu-CHA zeolites also depended on the distribution of $Cu^{2+}$ and $[CuOH]^+$ complexes, which respectively exchange at paired and isolated Al sites, because they show differences in their resistance to deactivation by sulfur poisoning and hydrothermal aging. Cu-exchanged CHA zeolites synthesized using TMAda$^+$ with either Na$^+$ or K$^+$ as the alkali co-SDA (prior to hydrothermal aging) showed similar $NO_x$ SCR rates (per Cu, 473° K), apparent reactant orders, and activation energies, which were consistent with previously reported SCR rates (473° K, per Cu) on Cu-CHA with similar Cu densities (Cu per 10$^3$ Å$^3$; Paolucci et al., Science 2017, 357, 898-903).

Cu-CHA synthesized using Na$^+$ or K$^+$/TMAda$^+$<10 deactivated to similar extents after hydrothermal aging (10 vol % $H_2O$, 1073° K, 16 h; Table 7), suggesting that the stability of the CHA framework with similar Al arrangements and total Al incorporation ($H^+/Al$>0.90) was not influenced by the synthesis procedure. Cu-CHA synthesized with K$^+$/TMAda$^+$=15 exhibited more severe deactivation after hydrothermal aging, likely reflecting the highly defective nature of CHA zeolites prepared with K$^+$/TMAda$^+$>10, which contained $H^+/Al$ counts lower than unity and micropore volumes that deviated significantly from CHA prepared with low alkali/TMAda$^+$ ratios or in alkali-free crystallization media.

These results indicated that different alkali cations can be used to synthesize CHA zeolites without detectable change in SCR performance, despite the diverse roles that different alkali appear to play in directing Al incorporation in the presence of organic TMAda$^+$ cations. Ultimately, without wishing to be bound by theory, this result suggests that the primary role of the alkali cation is to modify the interactions between the framework and occluded structure-directing agents that influence Al siting.

II. Flake-Like CHA Zeolites

General CHA Zeolite Synthesis Procedure

Several comparative and inventive CHA zeolites (Examples 6 to 9, below) were synthesized using either aluminum hydroxide (AH) or aluminum isopropoxide (AP) as the aluminum source, colloidal silica (AS-40; 40 wt % $SiO_2$) as the silicon source, sodium or potassium hydroxide as the inorganic structure directing agent (SDA), and trimethyl-1-adamantylammonium hydroxide (TMAdaOH) as the organic structure directing agent (OSDA). The procedure was generally performed according to the disclosure of U.S. Patent Application Publication No. 2017/0107114, which is incorporated by reference herein in its entirety, except that the autoclave contents were stirred throughout the duration of the crystallization.

The composition of each synthesis gel and the crystallization conditions are provided in Table 8. After crystallization, the synthesis gels were filtered, and the zeolite products washed with deionized water and calcined in air at 540° C.

TABLE 8

Composition of gels and crystallization conditions.

| | | Synthesis Gel Composition | | | | | | | Crystallization Conditions | | |
|---|---|---|---|---|---|---|---|---|---|---|---|
| Ex. # | Al Source | $SiO_2/Al_2O_3$ | Na$^+$/Si | K$^+$/Si | R*/Si | M$^†$/R* | OH/Si | $H_2O$/Si | Temp (° C.) | Time (h) | Stir speed (RPM) |
| 6 | AH | 33 | NA | 0.42 | 0.08 | 5.0 | 0.50 | 44 | 160 | 72 | 250 |
| 7 | AP | 20 | 0.13 | NA | 0.07 | 1.9 | 0.20 | 11 | 170 | 30 | 150 |
| 8 | AH | 33 | NA | 0.47 | 0.03 | 15.0 | 0.50 | 44 | 160 | 72 | 250 |
| 9 | AH | 33 | NA | 0.49 | 0.01 | 49.0 | 0.50 | 44 | 160 | 72 | 250 |

*R = OSDA
†M = Na$^+$ or K$^+$

Example 6. CHA Having Cubic Crystals with Truncated Corners (Comparative)

Figure 22A:
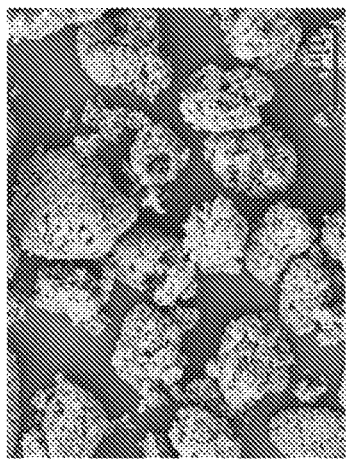
FIG. 22a is a scanning electron microscope (SEM) micrograph for a comparative example having a CHA framework structure.

A comparative CHA zeolite was synthesized according to the general procedure. The SEM image of this CHA zeolite is provided in FIG. 22a, which indicated a morphology of cubic crystals with truncated corners.

Example 7. CHA with Aggregate of Cubic Crystals (Comparative)

Figure 22B:
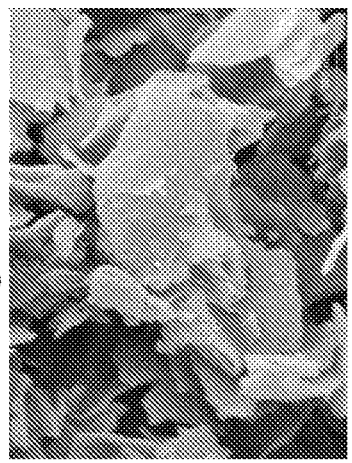
FIG. 22b is a scanning electron microscope (SEM) micrograph for another comparative example having a CHA framework structure.

A comparative CHA zeolite was synthesized according to the general procedure. The SEM image of this CHA zeolite is provided in FIG. 22b, which indicated a morphology of cubic crystals, agglomerated in a spherical morphology.

Example 8. CHA with Predominantly Flake-Like Morphology (Inventive)

Figure 22C:
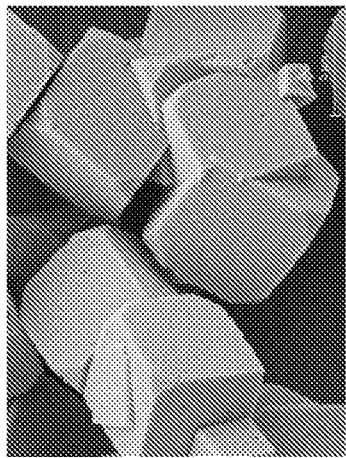
FIGS. 22c and 22d are scanning electron microscope (SEM) micrographs for embodiments of the disclosure.

An inventive CHA zeolite was synthesized according to the general procedure. The SEM image of this CHA zeolite is provided in FIG. 22c, which indicated a flake-like morphology, with some cubic crystals present.

Example 9. CHA with Predominantly Flake-Like Morphology (Inventive)

Figure 22D:
Figure 23:
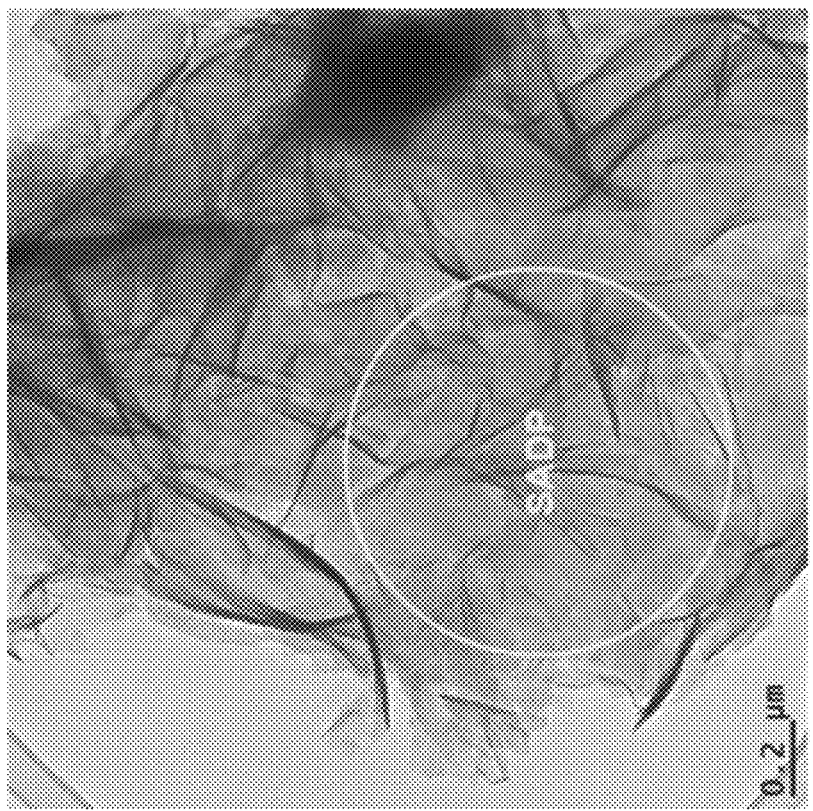
FIG. 23 is a transmission electron microscope (TEM) image for an embodiment of the disclosure.

An inventive CHA zeolite was synthesized according to the general procedure. The SEM image of this CHA zeolite is provided in FIG. 22d, which indicated a flake-like morphology. Both the SEM image (FIG. 22d) and the TEM image (FIG. 23) of a single flake showed that these flakes were not rigid in structure, and can bend/fold over.

Figure 24:
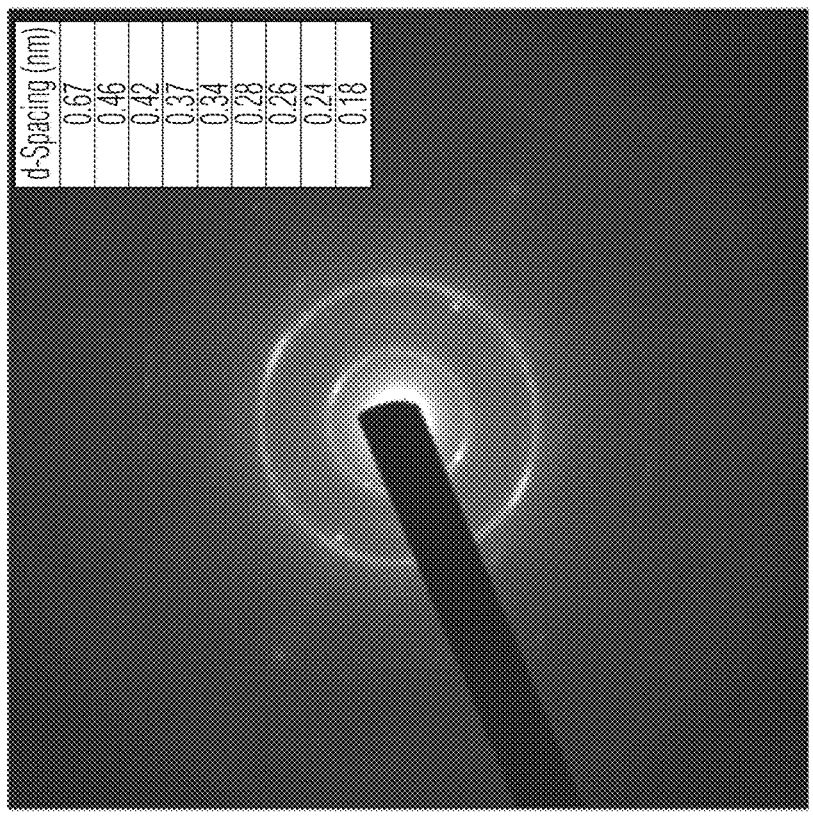
FIG. 24 is a TEM single area diffraction pattern (SADP) for an embodiment of the disclosure.

FIG. 24 provides the TEM single area diffraction pattern (SADP) for the flake-like zeolite, confirming that the material was crystalline. The d-spacings derived from the rings in this pattern are listed in the inset of FIG. 24, and these align with the prominently diffracting d-spacings of the CHA zeolite structure within experimental error of the technique. The ring corresponding to a d-spacing of 0.94 nm (corresponding to the (100) plane of the CHA crystal structure) appears to have been masked by the scattering from the beamstop used in the experiment.

Example 10. X-Ray Diffraction (XRD) Patterns

XRD patterns for the materials described in Examples 6-9 are provided in FIGS. 25a-25d, respectively, confirming the CHA crystal structure of each material. For inventive materials of Examples 8 and 9 (FIGS. 25c and 25d, respectively), the XRD shows peak anisotropy, particularly at higher angles (15-40°).

Example 11. Elemental Composition of Morphologies

Samples of inventive Examples 8 and 9 were analyzed by energy-dispersive X-ray spectroscopy (EDS). Specifically, multiple points on the cubic crystal and flake-like crystals present in each sample were analyzed to provide averaged multipoint relative concentrations of Si, Al, Na, and K. These data are provided in Table 9.

TABLE 9

Elemental concentrations from EDS multipoint analysis of images

| Example # | Morphology | Relative Concentration, % | | | | Calculated molar ratios | |
| --- | --- | --- | --- | --- | --- | --- | --- |
| | | Na | Al | Si | K | $SiO_2/Al_2O_3$ | Si/K |
| 8 | Average cubic crystal | 0.1 | 8.5 | 90.3 | 1.1 | 21.2 | 82.1 |
| | Average flake-like crystal | 0.1 | 8.5 | 86.2 | 5.2 | 20.3 | 16.6 |
| | Overall | 0.2 | 9.1 | 87.6 | 3.1 | 19.3 | 28.3 |
| 9 | Average cubic crystal | 0.1 | 7.6 | 90.8 | 1.4 | 23.9 | 64.9 |
| | Average flake-like crystal | 0.1 | 6.9 | 86.0 | 7.0 | 24.9 | 12.3 |
| | Overall | 0.1 | 7.2 | 87.5 | 5.3 | 24.3 | 16.5 |

As can be seen from these data, silica to alumina ratios were similar across morphologies, but average flake-like crystals of Examples 8 and 9 displayed a high concentration of potassium relative to silicon, which was the opposite of the molar ratio observed for cubic crystals.

Example 12. Dimensions of Flake-Like Crystals

Average dimensions for flake-like crystals for samples of Examples 8 and 9 were determined from multiple measurements obtained from SEM images at high magnification (20,000×). Flake dimensions were highly variable. Flake folding, overlapping, and tearing made measurements difficult to accurately obtain. Average dimensions for each sample are provided in Table 10. These values were estimated, and should not be considered limiting; however, the data generally indicated that the inventive materials possessed a very thin profile relative to the length and width, consistent with flake-like morphology. In both samples, few flakes that were >1.5 µm in the longer dimension were observed.

TABLE 10

Average dimensions of flake-like crystals

| | Average dimension (µm) | |
| --- | --- | --- |
| Direction | Ex. 8 | Ex. 9 |
| X (longer dimension) | 0.771 | 0.496 |
| Y (shorter dimension) | 0.451 | 0.306 |

TABLE 10-continued

Average dimensions of flake-like crystals

| | Average dimension (μm) | |
|---|---|---|
| Direction | Ex. 8 | Ex. 9 |
| Ratio of length/width (X/Y) | 1.9 | 1.85 |
| Z (flake thickness) | 0.021 | 0.025 |
| Aspect ratio (V/Z) | 36.7 | 19.84 |

Average flake thickness (Z) measurements were 0.021 □m and 0.025 □m, respectively, for samples of Examples 8 and 9. The flakes are likely thinner than this data suggests, but the thickness could not be adequately resolved due to orientation, folding, and image resolution.

Example 13. Cubic Crystal Vs. Flake-Like Morphology Distribution

An estimate of the percentage of flakes in the samples of Examples 8 and 9 was made by combining compositional information from SEM-EDS on individual crystals (flakes and cubes) with overall compositional measurements. These data are provided in Table 11.

TABLE 11

Morphology distribution.

| Example # | % Cubic crystals | % Flake-like crystals |
|---|---|---|
| 8 | 51% | 49% |
| 9 | 30% | 70% |

This data indicated that Example 9 was comprised of about 70% flake-like crystals, while Example 8 was comprised of about 49% flake-like crystals. Due to the challenges in obtaining accurate measurements, these data are again non-limiting, but are merely provided to support the general morphological characteristics of these samples.

Example 14. SCR Performance

Figure 26:
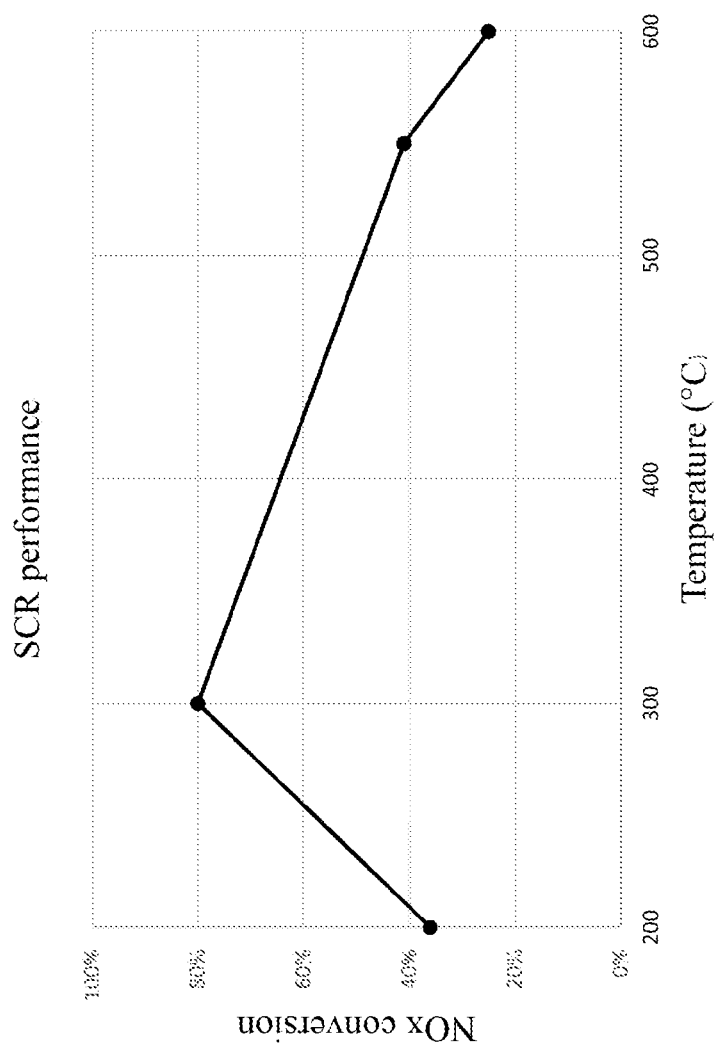
FIG. 26 is a line graph of NO$_x$ conversion versus temperature for an SCR article of the disclosure.

An SCR article was prepared using a washcoat containing the composition of Example 9. The catalytic material was aged for 16 hours in the presence of 10% $H_2O$/air at 800° C. prior to testing. $NO_x$ conversions (FIG. 26) were measured in a laboratory reactor at a gas hourly volume-based space velocity of 80,000 $h^{-1}$ under pseudo-steady state conditions in a gas mixture of 500 ppm NO, 500 ppm $NH_3$, 10% $O_2$, 5% $H_2O$, balance $N_2$ in a temperature ramp of 0.5° C./min from 200° C. to 600° C. Data in FIG. 26 indicate that the material had good $NO_x$ conversion over a range of temperature.

What is claimed is:

1. A method of synthesizing a zeolite having a CHA crystalline framework, the method comprising:
    preparing a mixture of water, an aluminum source, a silica source, a source of an organic structure directing agent, and an inorganic structure-directing agent to form a synthesis gel, wherein the inorganic structure-directing agent is a source of potassium cations; and
    subjecting the synthesis gel to a crystallization process to crystallize the zeolite having the CHA crystalline framework,
    wherein the source of the organic structure-directing agent is N,N,N-trimethyl-1-adamantylammonium hydroxide (TMAda) and an amount of TMAda and an amount of the potassium cation source is such that a molar ratio of potassium cations to N,N,N-trimethyl-1-adamantylammonium cations are in a molar ratio ranging from about 1 to about 20.

2. The method of claim 1, wherein the source of the potassium cations is potassium hydroxide.

3. The method of claim 1, wherein preparing comprises:
    a first mixing step comprising adding the source of the organic structure-directing agent, the source of the inorganic structure-directing agent, and the source of aluminum to the water to form an aluminum-containing aqueous solution;
    mixing the aqueous solution for a first time period; and
    a second mixing step comprising adding the source of silicon to the aluminum-containing aqueous solution and mixing for a second time period to form an aluminosilicate-containing solution.

4. The method of claim 1, wherein the crystallization process comprises mixing the synthesis gel at a temperature ranging from about 140° C. to about 200° C. for a time period of from about 24 hours to about 6 days.

5. The method of claim 1, wherein a OH/Si ratio of the synthesis gel is from about 0.1 to about 0.5.

6. The method of claim 1, wherein a ratio of the silicon source to the aluminum source to TMAda to the potassium cation source to the water is represented by the formula:

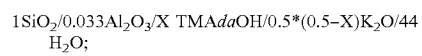

$1SiO_2/0.033Al_2O_3/X$ TMAdaOH/$0.5*(0.5-X)K_2O/44$ $H_2O$;

wherein the value of X is from 0.01 to 0.25.

7. The method of claim 1, wherein:
    the zeolite having the CHA crystalline framework is an intergrowth zeolite comprising a first CHA phase and a second CHA phase;
    the first CHA phase and the second CHA phase each independently have a unit cell volume of from about 2338 $Å^3$ to 2489 $Å^3$; and
    the unit cell volume of the first CHA phase is different from the unit cell volume of the second CHA phase.

8. The method of claim 7, wherein:
    the first CHA phase and the second CHA phase each independently have a silica-to-alumina ratio (SAR) of from about 4 to about 100; and
    the SAR of the first CHA phase is different from the SAR of the second CHA phase.

9. The method of claim 7, wherein:
    the first CHA phase represents from about 5% to about 95% of the intergrowth zeolite;
    the first CHA phase has a potassium cation to aluminum ratio of greater than 0.5; and
    the second CHA phase has a potassium cation to aluminum ratio of less than about 0.5.

10. The method of claim 7, wherein the intergrowth zeolite crystal size ranges from about 0.1 to about 15 μm.

11. A method of synthesizing a zeolite material having a CHA crystalline framework and a predominantly flake-like morphology, the method comprising:
    preparing a mixture of water, an aluminum source, a silicon source, an organic structure directing agent, and an inorganic structure directing agent to form a synthesis gel, wherein the inorganic structure directing agent comprises potassium cations; and
    subjecting the synthesis gel to a crystallization process to crystallize the zeolite material, wherein the inorganic structure directing agent is potassium hydroxide and the organic structure directing agent is N,N,N-trimethyl-1-adamantylammonium hydroxide (TMAdaOH), and an amount of TMAdaOH and an amount of potassium cations present in the synthesis ge I is such that a molar ratio of potassium cations to TMAdaOH is about 10 or greater.

12. The method of claim 11, wherein preparing comprises:
a first mixing step comprising adding the organic structure-directing agent, the inorganic structure-directing agent, and the source of aluminum to the water to form an aluminum-containing aqueous solution;
mixing the aqueous solution for a first time period; and
a second mixing step comprising adding the source of silicon to the aluminum-containing aqueous solution and mixing for a second time period to form an aluminosilicate-containing solution.

13. The method of claim 11, wherein the crystallization process comprises mixing the synthesis gel at a temperature ranging from about 100° C. to about 200° C. for a time period ranging from about 12 hours to about 6 days.

14. The method of claim 13, wherein the temperature ranges from about 160° C. to about 180° C.

15. The method of claim 11, wherein the organic structure-directing agent further comprises at least one selected from the group consisting of trimethylcyclohexylammonium hydroxide, tetraethylammonium hydroxide, benzyltrimethylammonium hydroxide, 1,1,3,5-tetramethylpiperidinium hydroxide, choline hydroxide, N,N-dimethyl piperidinium hydroxide, trimethyl-2-ammonium exo-norbornane, and N-methyl-3-quinuclidinol.

16. The method of claim 11, wherein the source of aluminum selected from the group consisting of a zeolite, aluminum isopropoxide, and aluminum hydroxide.

17. The method of claim 11, wherein the source of silicon is selected from the group consisting of colloidal silica, a silicon alkoxide, fumed silica, amorphous silica, and an aluminosilicate, and combination thereof.

* * * * *